United States Patent
Dilley et al.

(10) Patent No.: US 11,905,462 B2
(45) Date of Patent: Feb. 20, 2024

(54) POLYMER COMPOSITIONS AND FRACTURING FLUIDS MADE THEREFROM INCLUDING A MIXTURE OF CATIONIC AND ANIONIC HYDRATABLE POLYMERS AND METHODS FOR MAKING AND USING SAME

(71) Applicant: PfP INDUSTRIES, LLC, Houston, TX (US)

(72) Inventors: Christopher Dilley, Houston, TX (US); Nikhil Patel, Houston, TX (US); Robert Ray McDaniel, Houston, TX (US)

(73) Assignee: PfP Industries, LLC, Houston, TX (US)

( * ) Notice: Subject to any disclaimer, the term of this patent is extended or adjusted under 35 U.S.C. 154(b) by 0 days.

(21) Appl. No.: 16/850,913

(22) Filed: Apr. 16, 2020

(65) Prior Publication Data
US 2021/0324259 A1    Oct. 21, 2021

(51) Int. Cl.
| | | |
|---|---|---|
| *C09K 8/68* | (2006.01) | |
| *C09K 8/60* | (2006.01) | |
| *E21B 43/26* | (2006.01) | |
| *C09K 8/80* | (2006.01) | |
| *E21B 43/267* | (2006.01) | |

(52) U.S. Cl.
CPC ............... *C09K 8/68* (2013.01); *C09K 8/604* (2013.01); *C09K 8/80* (2013.01); *E21B 43/26* (2013.01); *C09K 2208/28* (2013.01); *E21B 43/267* (2013.01)

(58) Field of Classification Search
CPC . C09K 8/68; C09K 8/604; C09K 8/80; C09K 2208/28; E21B 43/26; E21B 43/267
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,873,251 A | 9/1956 | Jones, Jr. | |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |

(Continued)

FOREIGN PATENT DOCUMENTS

| | | | | |
|---|---|---|---|---|
| EP | 2489715 A1 * | 8/2012 | | F17D 1/17 |
| WO | 2013124003 A1 | 8/2013 | | |

(Continued)

OTHER PUBLICATIONS

U.S. Appl. No. 12/075,461, filed Mar. 11, 2008, Gatlin et al.

*Primary Examiner* — Angela M DiTrani Leff
(74) *Attorney, Agent, or Firm* — Robert W. Strozier

(57) ABSTRACT

Polymer compositions and fracturing fluids derived therefrom including a mixture of cationic hydratable polymers and anionic hydratable polymers, where the polymer composition and a hydrating water composition properties are optimized to afford a similar drag reduction and hydration viscosity compared to fracturing fluids in the absence of hydratable anionic polymers at a lower cost and methods for making and using same.

20 Claims, 22 Drawing Sheets

(56) References Cited

U.S. PATENT DOCUMENTS

| | | | | |
|---|---|---|---|---|
| 3,565,176 | A | 2/1971 | Wittenwyler | 166/270 |
| 3,752,354 | A * | 8/1973 | Demirag | B65D 88/62 |
| | | | | 220/578 |
| 3,856,921 | A | 12/1974 | Shrier et al. | 423/228 |
| 3,867,330 | A * | 2/1975 | Frisque | C08J 3/09 |
| | | | | 524/517 |
| 3,888,312 | A | 6/1975 | Tiner et al. | 166/308.5 |
| 3,933,205 | A | 1/1976 | Kiel | 166/308.1 |
| 3,937,283 | A | 2/1976 | Blauer et al. | 166/307 |
| 3,960,736 | A | 6/1976 | Free et al. | 507/216 |
| 3,965,982 | A | 6/1976 | Medlin | 166/249 |
| 3,990,978 | A | 11/1976 | Hill | 507/235 |
| 4,007,792 | A | 2/1977 | Meister | 166/308.2 |
| 4,052,159 | A | 10/1977 | Fuerst et al. | |
| 4,067,389 | A | 1/1978 | Savins | 166/246 |
| 4,104,226 | A * | 8/1978 | Melzer | C02F 1/54 |
| | | | | 524/521 |
| 4,108,782 | A | 8/1978 | Thompon | 507/205 |
| 4,112,050 | A | 9/1978 | Sartori et al. | 423/223 |
| 4,112,051 | A | 9/1978 | Sartori et al. | 423/223 |
| 4,112,052 | A | 9/1978 | Sartori et al. | 423/223 |
| 4,113,631 | A | 9/1978 | Thompson | 507/202 |
| 4,378,845 | A | 4/1983 | Medlin et al. | 166/297 |
| 4,461,716 | A | 7/1984 | Barbarin et al. | 252/307 |
| 4,462,718 | A | 7/1984 | McLaughlin et al. | |
| 4,479,041 | A | 10/1984 | Fenwick et al. | 200/81 R |
| 4,487,866 | A * | 12/1984 | Almond | C08J 3/07 |
| | | | | 507/211 |
| 4,489,180 | A * | 12/1984 | Lundberg | C09K 8/588 |
| | | | | 525/203 |
| 4,501,834 | A * | 2/1985 | Su | A61K 8/042 |
| | | | | 523/105 |
| 4,506,734 | A | 3/1985 | Nolte | 166/308.1 |
| 4,514,309 | A | 4/1985 | Wadhwa | 507/211 |
| 4,541,935 | A | 9/1985 | Constien et al. | 507/225 |
| 4,549,608 | A | 10/1985 | Stowe et al. | 166/280.1 |
| 4,561,985 | A | 12/1985 | Glass, Jr. | 507/108 |
| 4,623,021 | A | 11/1986 | Stowe | 166/250.1 |
| 4,654,266 | A | 3/1987 | Kachnik | 428/403 |
| 4,657,081 | A | 4/1987 | Hodge | 166/380.5 |
| 4,660,643 | A | 4/1987 | Perkins | 166/283 |
| 4,683,068 | A | 7/1987 | Kucera | 507/201 |
| 4,686,052 | A | 8/1987 | Baranet et al. | 507/244 |
| 4,695,389 | A | 9/1987 | Kubala | 507/244 |
| 4,705,113 | A | 11/1987 | Perkins | 166/302 |
| 4,714,115 | A | 12/1987 | Uhri | 166/308.1 |
| 4,718,490 | A | 1/1988 | Uhri | 166/281 |
| 4,724,905 | A | 2/1988 | Uhri | 166/250.1 |
| 4,725,372 | A | 2/1988 | Teot et al. | 507/129 |
| 4,739,834 | A | 4/1988 | Peiffer et al. | 166/308.4 |
| 4,741,401 | A | 5/1988 | Walles et al. | 166/300 |
| 4,748,011 | A | 5/1988 | Baize | 423/228 |
| 4,779,680 | A | 10/1988 | Sydansk | 166/300 |
| 4,795,574 | A | 1/1989 | Syrinek et al. | 507/238 |
| 4,817,717 | A | 4/1989 | Jennings, Jr. et al. | 166/278 |
| 4,830,106 | A | 5/1989 | Uhri | 166/250.1 |
| 4,846,277 | A | 7/1989 | Khalil et al. | 166/280.1 |
| 4,848,468 | A | 7/1989 | Hazlett et al. | 166/300 |
| 4,852,650 | A | 8/1989 | Jennings, Jr. et al. | 166/250.1 |
| 4,869,322 | A | 9/1989 | Vogt, Jr. et al. | 166/280.1 |
| 4,892,147 | A | 1/1990 | Jennings, Jr. et al. | 166/280.2 |
| 4,926,940 | A | 5/1990 | Stromswold | 166/247 |
| 4,938,286 | A | 7/1990 | Jennings, Jr. | 166/280.1 |
| 4,978,512 | A | 12/1990 | Dillon | 423/226 |
| 4,985,154 | A | 1/1991 | Balzer et al. | |
| 5,005,645 | A | 4/1991 | Jennings, Jr. et al. | 166/280.1 |
| 5,024,276 | A | 6/1991 | Borchardt | 166/308.6 |
| 5,067,556 | A | 11/1991 | Fudono et al. | 62/196.4 |
| 5,074,359 | A | 12/1991 | Schmidt | 166/280.1 |
| 5,074,991 | A | 12/1991 | Weers | 208/236 |
| 5,082,579 | A | 1/1992 | Dawson | 507/211 |
| 5,106,518 | A | 4/1992 | Cooney et al. | 507/21 |
| 5,110,486 | A | 5/1992 | Manalastas et al. | 507/260 |
| 5,169,411 | A | 12/1992 | Weers | 44/421 |
| 5,224,546 | A | 7/1993 | Smith et al. | 166/300 |
| 5,228,510 | A | 7/1993 | Jennings, Jr. et al. | 166/263 |
| 5,246,073 | A | 9/1993 | Sandiford et al. | 166/295 |
| 5,259,455 | A | 11/1993 | Nimerick et al. | 166/308.5 |
| 5,310,002 | A | 5/1994 | Blauch et al. | |
| 5,330,005 | A | 7/1994 | Card et al. | 166/280.2 |
| 5,342,530 | A | 8/1994 | Aften et al. | 252/8.551 |
| 5,347,004 | A | 9/1994 | Rivers et al. | 544/180 |
| 5,363,919 | A | 11/1994 | Jennings, Jr. | 166/308.1 |
| 5,465,792 | A | 1/1995 | Dawson et al. | 166/295 |
| 5,402,846 | A | 4/1995 | Jennings, Jr. et al. | 166/259 |
| 5,411,091 | A | 5/1995 | Jennings, Jr. | 166/280.1 |
| 5,424,284 | A | 6/1995 | Patel et al. | 507/129 |
| 5,439,055 | A | 8/1995 | Card et al. | 166/280.2 |
| 5,462,721 | A | 10/1995 | Pounds et al. | 423/226 |
| 5,472,049 | A | 12/1995 | Chaffe et al. | 166/250.1 |
| 5,482,116 | A | 1/1996 | El-Rabaa et al. | 166/250.1 |
| 5,488,083 | A | 1/1996 | Kinsey, III et al. | 507/211 |
| 5,497,831 | A | 3/1996 | Hainey et al. | 166/308.1 |
| 5,501,275 | A | 3/1996 | Card et al. | 166/280.2 |
| 5,549,840 | A | 8/1996 | Mondin et al. | |
| 5,551,516 | A | 9/1996 | Norman et al. | 166/308.2 |
| 5,552,462 | A * | 9/1996 | Yeh | C08B 37/0033 |
| | | | | 524/55 |
| 5,558,171 | A | 9/1996 | McGlothlin et al. | |
| 5,593,958 | A | 1/1997 | Mondin et al. | |
| 5,599,785 | A | 2/1997 | Mondin et al. | |
| 5,610,130 | A | 3/1997 | Barbara et al. | |
| 5,624,886 | A | 4/1997 | Dawson et al. | 507/217 |
| 5,635,458 | A | 6/1997 | Lee et al. | 507/240 |
| 5,649,596 | A | 7/1997 | Jones et al. | 166/300 |
| 5,669,447 | A | 9/1997 | Walker et al. | 166/300 |
| 5,674,377 | A | 10/1997 | Sullivan, III et al. | 208/208 R |
| 5,688,478 | A | 11/1997 | Pounds et al. | 423/228 |
| 5,693,837 | A | 12/1997 | Smith et al. | 556/148 |
| 5,711,396 | A | 1/1998 | Joerg et al. | 180/444 |
| 5,716,925 | A | 2/1998 | Mondin et al. | |
| 5,722,490 | A | 3/1998 | Ebinger | 166/281 |
| 5,725,470 | A | 3/1998 | Lazarowitz et al. | |
| 5,731,281 | A | 3/1998 | Mondin et al. | |
| 5,741,760 | A | 4/1998 | Mondin et al. | |
| 5,744,024 | A | 4/1998 | Sullivan, III et al. | 208/236 |
| 5,755,286 | A | 5/1998 | Ebinger | 166/281 |
| 5,759,983 | A | 6/1998 | Mondin et al. | |
| 5,763,386 | A | 6/1998 | Mondin et al. | |
| 5,775,425 | A | 7/1998 | Weaver et al. | 166/276 |
| 5,776,880 | A | 7/1998 | Mondin et al. | |
| 5,787,986 | A | 8/1998 | Weaver et al. | 166/280.2 |
| 5,806,597 | A | 9/1998 | Tjon-Joe-Pin et al. | 166/300 |
| 5,807,812 | A | 9/1998 | Smith et al. | 507/238 |
| 5,830,831 | A | 11/1998 | Chan et al. | |
| 5,833,000 | A | 11/1998 | Weaver et al. | 166/276 |
| 5,853,048 | A | 12/1998 | Weaver et al. | 166/279 |
| 5,854,193 | A | 12/1998 | Mondin et al. | |
| 5,861,367 | A | 1/1999 | Blanvalet et al. | |
| 5,871,049 | A | 2/1999 | Weaver et al. | 166/276 |
| 5,874,386 | A | 2/1999 | Chan et al. | |
| 5,877,127 | A | 3/1999 | Card et al. | 507/273 |
| 5,908,073 | A | 6/1999 | Nguyen et al. | 166/276 |
| 5,908,814 | A | 6/1999 | Patel et al. | 507/131 |
| 5,952,281 | A | 9/1999 | Mondin et al. | |
| 5,964,295 | A | 10/1999 | Brown et al. | 166/308.2 |
| 5,977,032 | A | 11/1999 | Chan et al. | |
| 5,979,557 | A | 11/1999 | Card et al. | 166/300 |
| 5,980,845 | A | 11/1999 | Cherry | 423/229 |
| 5,985,814 | A | 11/1999 | Zocchi et al. | |
| 6,000,412 | A | 12/1999 | Chan et al. | |
| 6,016,871 | A | 1/2000 | Burts, Jr. | 166/300 |
| 6,017,868 | A | 1/2000 | Mondin et al. | |
| 6,020,296 | A | 2/2000 | Mertens et al. | |
| 6,035,936 | A | 4/2000 | Whalen | 166/308.5 |
| 6,047,772 | A | 4/2000 | Weaver et al. | 166/276 |
| 6,054,417 | A | 4/2000 | Graham et al. | 507/238 |
| 6,059,034 | A | 5/2000 | Rickards et al. | 166/280.2 |
| 6,060,436 | A | 5/2000 | Synder et al. | 507/266 |
| 6,069,118 | A | 5/2000 | Hinkel et al. | 507/277 |
| 6,090,754 | A | 7/2000 | Chan et al. | |
| 6,112,814 | A | 9/2000 | Chan et al. | |
| 6,123,394 | A | 9/2000 | Jeffrey | 299/16 |

(56) References Cited

U.S. PATENT DOCUMENTS

| | | | |
|---|---|---|---|
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,191,090 B1 | 2/2001 | Mondin et al. | |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,436,880 B1 | 8/2002 | Frenier | |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 6,911,417 B2 | 6/2005 | Chan et al. | |
| 7,012,043 B2 | 3/2006 | Klein et al. | |
| 7,087,554 B2 | 8/2006 | Youngson et al. | |
| 7,140,433 B2 | 11/2006 | Gatlin et al. | 166/250.01 |
| 7,268,100 B2 | 9/2007 | Kippie et al. | 507/244 |
| 7,350,579 B2 | 4/2008 | Gatlin et al. | 166/308.3 |
| 7,601,675 B2 | 10/2009 | Poelker et al. | |
| 7,989,404 B2 | 8/2011 | Kakadjian et al. | 507/261 |
| 8,097,567 B2 | 1/2012 | Wilson, Jr. | |
| 8,419,976 B2 * | 4/2013 | Song | C08L 33/02 252/500 |
| 9,034,801 B2 | 5/2015 | Merli et al. | |
| 9,518,207 B2 * | 12/2016 | Ogle | C09K 8/035 |
| 10,138,334 B2 * | 11/2018 | Reilly, Jr. | C02F 11/148 |
| 10,385,253 B2 * | 8/2019 | Frederick | C09K 8/64 |
| 2002/0049256 A1 | 4/2002 | Bergeron, Jr. | 514/674 |
| 2002/0165308 A1 | 11/2002 | Kinniard et al. | 524/492 |
| 2003/0166472 A1 | 9/2003 | Pursley et al. | |
| 2003/0220204 A1 | 11/2003 | Baran, Jr. et al. | 507/200 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2005/0153846 A1 | 7/2005 | Gatlin | 208/236 |
| 2005/0250666 A1 | 11/2005 | Gatlin et al. | 510/492 |
| 2006/0194700 A1 | 8/2006 | Gatlin et al. | 507/203 |
| 2007/0032693 A1 | 2/2007 | Gatlin et al. | 507/239 |
| 2007/0125536 A1 | 6/2007 | Acock et al. | |
| 2007/0129257 A1 | 6/2007 | Kippie et al. | 507/102 |
| 2007/0131425 A1 | 6/2007 | Gatlin et al. | 166/280.2 |
| 2007/0173413 A1 | 7/2007 | Lukocs et al. | 507/238 |
| 2007/0173414 A1 | 7/2007 | Wilson, Jr. | 507/131 |
| 2008/0039345 A1 | 2/2008 | Kippie et al. | 507/213 |
| 2008/0269082 A1 | 10/2008 | Wilson et al. | |
| 2008/0287323 A1 | 11/2008 | Li et al. | |
| 2010/0224365 A1 | 9/2010 | Adad | |
| 2010/0248997 A1 | 9/2010 | Li et al. | |
| 2010/0307757 A1 | 12/2010 | Blow et al. | |
| 2011/0017677 A1 | 1/2011 | Evans | |
| 2011/0082057 A1 | 4/2011 | Zhang et al. | |
| 2011/0256085 A1 * | 10/2011 | Talingting Pabalan | C08L 5/00 424/70.13 |
| 2012/0035085 A1 * | 2/2012 | Parnell | C09K 8/608 507/213 |
| 2012/0125617 A1 | 5/2012 | Gu et al. | |
| 2012/0305254 A1 | 12/2012 | Chen et al. | |
| 2013/0056213 A1 * | 3/2013 | Medvedev | C09K 8/685 166/308.5 |
| 2013/0153233 A1 | 6/2013 | Bell et al. | |
| 2013/0157905 A1 | 6/2013 | Saini et al. | |
| 2013/0213657 A1 | 8/2013 | Dobson, Jr. et al. | |
| 2013/0333888 A1 | 12/2013 | Rincon-Torres | |
| 2014/0116710 A1 | 5/2014 | Naser-El-Din et al. | |
| 2014/0158354 A1 | 6/2014 | Kumar et al. | |
| 2014/0158355 A1 * | 6/2014 | Wuthrich | E21B 43/16 166/294 |
| 2014/0174742 A1 | 6/2014 | Mirakyan et al. | |
| 2014/0194327 A1 | 7/2014 | Hutchings et al. | |
| 2014/0196904 A1 | 7/2014 | Fontenelle et al. | |
| 2014/0374104 A1 | 12/2014 | Seth et al. | |
| 2015/0013987 A1 | 1/2015 | Underwood et al. | |
| 2015/0068747 A1 | 3/2015 | Hwang et al. | |
| 2015/0129231 A1 | 5/2015 | Vitiur et al. | |
| 2015/0299554 A1 | 10/2015 | Pakulski et al. | |
| 2015/0344767 A1 | 12/2015 | Lei et al. | |
| 2015/0353807 A1 | 12/2015 | Witham et al. | |
| 2017/0313930 A1 * | 11/2017 | Patel | C09K 8/68 |
| 2018/0030335 A1 | 2/2018 | Mcewen et al. | |
| 2019/0241796 A1 * | 8/2019 | Mast | E21B 43/267 |

FOREIGN PATENT DOCUMENTS

| | | |
|---|---|---|
| WO | 2014191389 A1 | 4/2014 |
| WO | 2018025010 A1 | 2/2018 |

* cited by examiner

POLYMER COMPOSITIONS AND FRACTURING FLUIDS MADE THEREFROM INCLUDING A MIXTURE OF CATIONIC AND ANIONIC HYDRATABLE POLYMERS AND METHODS FOR MAKING AND USING SAME

RELATED APPLICATIONS

This application is related to U.S. patent application Ser. No. 15/142,896, filed Apr. 29, 2016 (29 Apr. 2016).

BACKGROUND OF THE DISCLOSURE

1. Field of the Disclosure

Embodiments of the present disclosure relate to downhole fluid compositions and to methods for making and using same.

In particular, embodiments of the present disclosure relate to downhole fluid compositions including a polymer composition including a mixture of one or more hydratable cationic polymers and one or more hydratable anionic polymers designed and a water composition having an effective amount of ions sufficient to reduce gelling interactions between the oppositely charged polymers in the polymer composition, wherein the polymer composition is optimized to afford a similar drag reduction compared to a fracturing fluid in the absence of the one or more hydratable anionic polymers at a lower cost, and to methods for making and using same.

2. Description of the Related Art

Fluids to treating downhole formations to increase oil and gas production are commonly used today and are commonplace in most oil producing fields. There are many different fluid formulations that have been used to stimulate oil and/or gas production.

While many fracturing fluid systems have been formulated, there is still and continues to be a need in the art for fracturing fluids that work effectively and efficiently in high total solid waters, such as waters recovered from oil and/or gas production.

SUMMARY OF THE DISCLOSURE

Polymer Compositions

Embodiments of the present disclosure provide polymer compositions including a mixture of one or more hydratable cationic polymers and one or more hydratable anionic polymers, wherein the polymer composition is designed to be added to a water composition having an effective amount of ions sufficient to reduce gelling interactions between the oppositely charged polymers in the polymer composition to form a fracturing fluid and wherein properties of the polymer compositions are optimized to afford a similar drag reduction and hydration viscosity compared to a fracturing fluid in the absence of the one or more hydratable anionic polymers at a lower cost for the water composition. In certain embodiments, the properties of the polymer composition and the water composition are optimized to afford a similar drag reduction and hydration viscosity compared to a fracturing fluid in the absence of the one or more hydratable anionic polymers at a lower cost for the water composition.

In certain embodiments, the polymer compositions may be collectively or individually dry particulate cationic polymers and anionic polymers, collectively or individually water-in-oil emulsions including cationic polymers and/or anionic polymers, or collectively or individually oil-based slurries including particulate cationic polymer and anionic polymers.

In certain embodiments, the polymer compositions may comprise any combination one or more of the following: (1) an oil based slurry including an oil based carrier, a first amount of one or more particulate hydratable cationic polymers and a second amount of one or more particulate hydratable anionic polymers, (2) an oil based slurry including an oil based carrier and a first amount of one or more particulate hydratable cationic polymers, (3) an oil based slurry including an oil based carrier and a second amount of one or more particulate hydratable anionic polymers, (4) a water-in-oil emulsion including: (a) a discrete water or aqueous phase comprising a first amount of one or more hydratable cationic polymers, a second amount of one or more hydratable anionic polymers, and about 0.3 wt. % to about 2.0 wt. % dissolved solids, and (b) a continuous oil phase comprising one or more hydrocarbon solvents, (5) a water-in-oil emulsion including: (a) a discrete water or aqueous phase comprising a first amount of one or more hydratable cationic polymers, and (b) a continuous oil phase comprising one or more hydrocarbon solvents, and, (6) a water-in-oil emulsion including: (a) a discrete water or aqueous phase comprising a second amount of one or more hydratable anionic polymers and (b) an oil phase comprising one or more hydrocarbon solvents, (7) a dry composition including a mixture of a first amount of one or more particulate hydratable cationic polymers and a second amount of one or more particulate hydratable anionic polymers, (8) a dry composition including a first amount of one or more particulate hydratable cationic polymers, or (9) a dry composition including a second amount of one or more particulate hydratable anionic polymers.

In certain embodiments, the oil-based slurries comprise the polymer compositions suspended in an oil-based vehicle or carrier, wherein the oil-based vehicle or carrier includes one or more hydrocarbon solvents, one or more surfactants, and one or more carrier soluble polymeric suspension agents.

Downhole Fluid Compositions

Embodiments of the present disclosure provide downhole fluid compositions including (A) a polymer composition including one or more hydratable cationic polymers and one or more hydratable anionic polymers, and (B) a water composition having an effective amount of total dissolved solids (TDS) sufficient to reduce gelling interactions between oppositely charged polymers in the polymer composition, wherein properties of the polymer composition and the water composition are optimized to afford a similar drag reduction and hydration viscosity compared to a fracturing fluid in the absence of the one or more hydratable anionic polymers at a lower cost.

In certain embodiments, the downhole fluid compositions include: (A) a polymer composition comprising any combination one or more of the following: (1) an oil based slurry including an oil based carrier, a first amount of one or more particulate hydratable cationic polymers and a second amount of one or more particulate hydratable anionic polymers, (2) an oil based slurry including an oil based carrier and a first amount of one or more particulate hydratable cationic polymers, (3) an oil based slurry including an oil based carrier and a second amount of one or more particulate hydratable anionic polymers, (4) a water-in-oil emulsion including: (a) a discrete water or aqueous phase comprising a first amount of one or more hydratable cationic polymers, a second amount of one or more hydratable anionic polymers, and about 0.3 wt. % to about 2.0 wt. % dissolved solids, and (b) a continuous oil phase comprising one or more hydrocarbon solvents, (5) a water-in-oil emulsion including: (a) a discrete water or aqueous phase comprising a first amount of one or more hydratable cationic polymers, and (b) a continuous oil phase comprising one or more hydrocarbon solvents, and, (6) a water-in-oil emulsion including: (a) a discrete water or aqueous phase comprising a second amount of one or more hydratable anionic polymers and (b) an oil phase comprising one or more hydrocarbon solvents, (7) a dry composition including a mixture of a first amount of one or more particulate hydratable cationic polymers and a second amount of one or more particulate hydratable anionic polymers, (8) a dry composition including a first amount of one or more particulate hydratable cationic polymers, or (9) a dry composition including a second amount of one or more particulate hydratable anionic polymers; and (B) a water composition having an effective amount of total dissolved solids (TDS) sufficient to reduce gelling interactions between oppositely charged polymers in the polymer composition, wherein properties of the polymer composition and the water composition are optimized to afford a similar drag reduction compared to a fracturing fluid in the absence of the one or more hydratable anionic polymers at a lower cost.

Methods of Making the Compositions

Embodiments of the present disclosure provide methods of optimizing a fracturing fluid composition including identifying a water source, determining a total dissolved solids (TDS) and monovalent and polyvalent ions in the water source, if needed, adding a salt composition to the water source to increase the TDS and amount of monovalent and polyvalent ions in the water source, optimizing an amount of a polymer composition and the composition of the polymer compositions for the water source, mixing the polymer composition into the water source with or without one or more proppants, and injecting the fracturing fluid into a formation, wherein properties of the polymer composition and the water composition are optimized to afford a similar drag reduction compared to a fracturing fluid in the absence of the one or more hydratable anionic polymers at a lower cost.

Methods of Using the Compositions

One Step

Embodiments of the present disclosure provide methods of treating a subterranean formation including: (I) forming a fracturing fluid comprising: (A) a polymer composition including: (I) an oil based slurry including an oil based carrier, a first amount of one or more particulate hydratable cationic polymers and a second amount of one or more particulate hydratable anionic polymers, (2) an oil based slurry including an oil based carrier and a first amount of one or more particulate hydratable cationic polymers, (3) an oil based slurry including an oil based carrier and a second amount of one or more particulate hydratable anionic polymers, (4) a water-in-oil emulsion including: (a) a discrete water or aqueous phase comprising a first amount of one or more hydratable cationic polymers, a second amount of one or more hydratable anionic polymers, and about 0.3 wt. % to about 2.0 wt. % dissolved solids, and (b) a continuous oil phase comprising one or more hydrocarbon solvents, (5) a water-in-oil emulsion including: (a) a discrete water or aqueous phase comprising a first amount of one or more hydratable cationic polymers, and (b) a continuous oil phase comprising one or more hydrocarbon solvents, and, (6) a water-in-oil emulsion including: (a) a discrete water or aqueous phase comprising a second amount of one or more hydratable anionic polymers and (b) an oil phase comprising one or more hydrocarbon solvents, (7) a dry composition including a mixture of a first amount of one or more particulate hydratable cationic polymers and a second amount of one or more particulate hydratable anionic polymers, (8) a dry composition including a first amount of one or more particulate hydratable cationic polymers, or (9) a dry composition including a second amount of one or more particulate hydratable anionic polymers; (B) one or more proppant; and (C) a water composition including an effective amount of total dissolved solids (TDS) sufficient to reduce gelling interactions between oppositely charged polymers in the polymer composition; and (II) delivering or injecting the fracturing fluid into the subterranean formation under fracturing conditions, wherein properties of the polymer composition and the water composition are optimized to afford a similar drag reduction and hydration viscosity compared to a fracturing fluid in the absence of the one or more hydratable anionic polymers at a lower cost.

Alternatively, the methods include (I) hydrating the polymer composition in the water composition to form the fracturing fluid, and (II) delivering or injecting the fracturing fluid into the subterranean formation under fracturing conditions.

Embodiments of the present disclosure provide methods of treating a subterranean formation including: (I) forming a proppant carrier fluid comprising (A) a polymer composition including: (1) an oil based slurry including an oil based carrier, a first amount of one or more particulate hydratable cationic polymers and a second amount of one or more particulate hydratable anionic polymers, (2) an oil based slurry including an oil based carrier and a first amount of one or more particulate hydratable cationic polymers, (3) an oil based slurry including an oil based carrier and a second amount of one or more particulate hydratable anionic polymers, (4) a water-in-oil emulsion including: (a) a discrete water or aqueous phase comprising a first amount of one or more hydratable cationic polymers, a second amount of one or more hydratable anionic polymers, and about 0.3 wt. % to about 2.0 wt. % dissolved solids, and (b) a continuous oil phase comprising one or more hydrocarbon solvents, (5) a water-in-oil emulsion including: (a) a discrete water or aqueous phase comprising a first amount of one or more hydratable cationic polymers, and (b) a continuous oil phase comprising one or more hydrocarbon solvents, and, (6) a water-in-oil emulsion including: (a) a discrete water or aqueous phase comprising a second amount of one or more hydratable anionic polymers and (b) an oil phase comprising one or more hydrocarbon solvents, (7) a dry composition including a mixture of a first amount of one or more particulate hydratable cationic polymers and a second amount of one or more particulate hydratable anionic polymers, (8) a dry composition including a first amount of one or more particulate hydratable cationic polymers, or (9) a dry composition including a second amount of one or more particulate hydratable anionic polymers; and (B) a water composition including an effective amount of total dissolved solids (TDS) sufficient to reduce gelling interactions between oppositely charged polymers in the polymer composition; (II) adding one or more proppants to the proppant carrier fluid to form a fracturing fluid; and (III) delivering or injecting the fracturing fluid into the subterranean formation under fracturing conditions, wherein properties of the polymer composition and the water composition are optimized to afford a similar drag reduction compared to a fracturing fluid in the absence of the one or more hydratable anionic polymers at a lower cost. Alternatively, the methods include (I) hydrating the polymer composition in the water composition to form the proppant carrying fluid, (II) adding one or more proppants to the proppant carrier fluid to form a fracturing fluid, and (III) delivering or injecting the fracturing fluid into the subterranean formation under fracturing conditions.

Two Step

Embodiments of the present disclosure provide methods of treating a subterranean formation including (I) forming a first fracturing fluid excluding one or more proppants, (ID) delivering or injecting the first fracturing fluid into a subterranean formation under fracturing conditions, (III) forming a second fracturing fluid including one or more proppants, and (IV) delivering or injecting the second fracturing fluid into the subterranean formation under fracturing conditions. The two fracturing fluid may include the same or different fluid components; provided at least one of the fracturing fluids comprising (A) a polymer composition including: (1) an oil based slurry including an oil based carrier, a first amount of one or more particulate hydratable cationic polymers and a second amount of one or more particulate hydratable anionic polymers, (2) an oil based slurry including an oil based carrier and a first amount of one or more particulate hydratable cationic polymers, (3) an oil based slurry including an oil based carrier and a second amount of one or more particulate hydratable anionic polymers, (4) a water-in-oil emulsion including: (a) a discrete water or aqueous phase comprising a first amount of one or more hydratable cationic polymers, a second amount of one or more hydratable anionic polymers, and about 0.3 wt. % to about 2.0 wt. % dissolved solids, and (b) a continuous oil phase comprising one or more hydrocarbon solvents, (5) a water-in-oil emulsion including: (a) a discrete water or aqueous phase comprising a first amount of one or more hydratable cationic polymers, and (b) a continuous oil phase comprising one or more hydrocarbon solvents, and, (6) a water-in-oil emulsion including: (a) a discrete water or aqueous phase comprising a second amount of one or more hydratable anionic polymers and (b) an oil phase comprising one or more hydrocarbon solvents, (7) a dry composition including a mixture of a first amount of one or more particulate hydratable cationic polymers and a second amount of one or more particulate hydratable anionic polymers, (8) a dry composition including a first amount of one or more particulate hydratable cationic polymers, or (9) a dry composition including a second amount of one or more particulate hydratable anionic polymers; and (B) a water composition including an effective amount of total dissolved solids (TDS) sufficient to reduce gelling interactions between oppositely charged polymers in the polymer composition, wherein properties of the polymer composition and the water composition are optimized to afford a similar drag reduction and hydration viscosity compared to a fracturing fluid in the absence of the one or more hydratable anionic polymers at a lower cost.

Alternative, the methods of treating a subterranean formation including: (I) forming a first polymer composition excluding one or more proppants, (II) hydrating the polymer composition in a first water composition to form a first fracturing fluid, (III) delivering or injecting the first fracturing fluid into a subterranean formation under fracturing conditions, (IV) forming a second polymer composition including one or more proppants, (V) hydrating the second polymer composition and the one or more proppants in a water composition to form a second fracturing fluid, and (VI) delivering or injecting the second fracturing fluid into the subterranean formation under fracturing conditions.

BRIEF DESCRIPTION OF THE DRAWINGS OF THE DISCLOSURE

The disclosure may be better understood with reference to the following detailed description together with the appended illustrative drawings in which like elements are numbered the same:

DEFINITIONS USED IN THE DISCLOSURE

Figure 1:
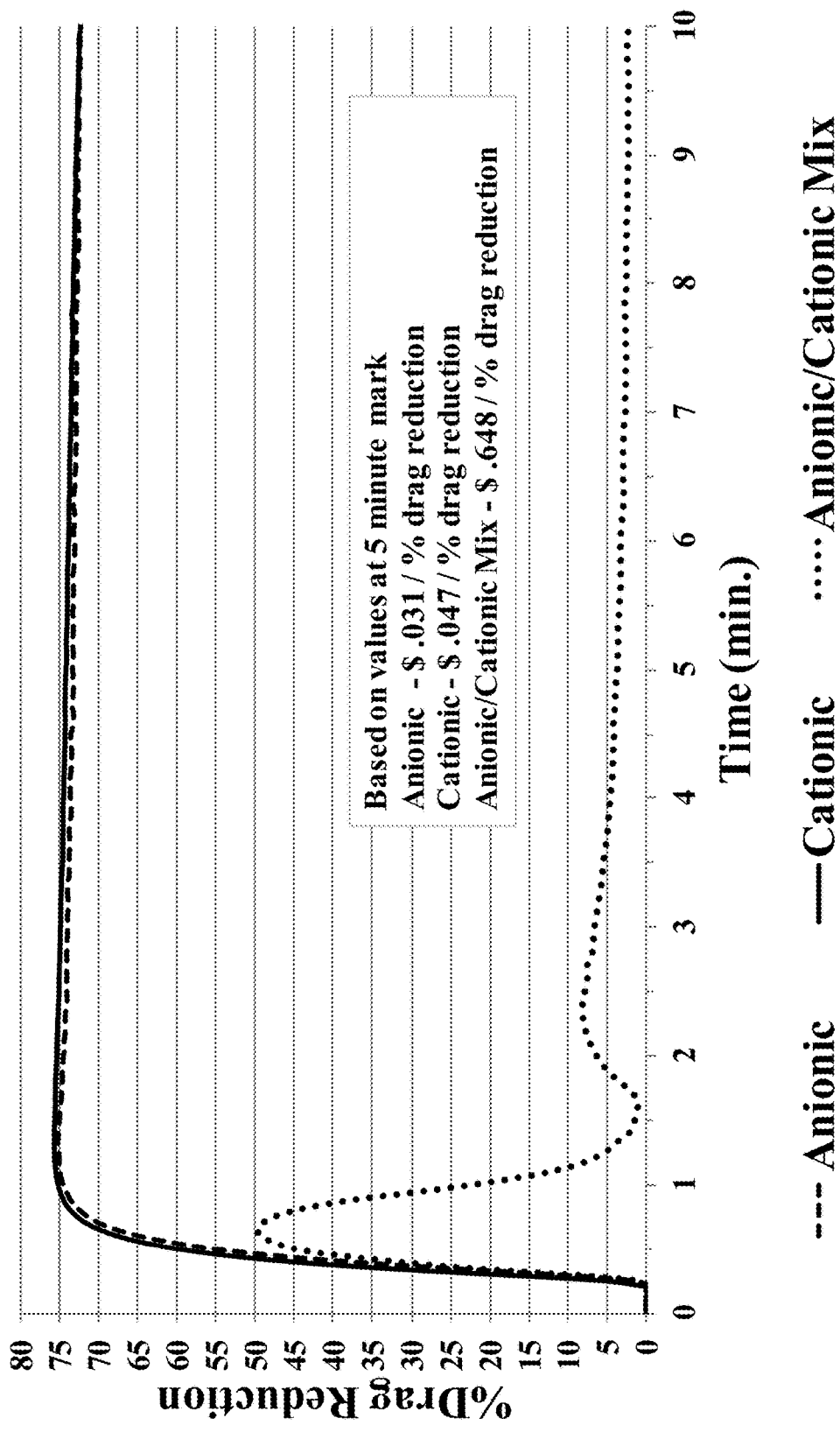
FIG. 1 depicts a plot comparing % Drag Reduction versus time for 0.25 gpt of three fluids: Fluid A, Fluid B and Fluid C int tap water.

The term "at least one" means one or more or one or a plurality, additionally, these three terms may be used interchangeably within this application. For example, at least one device means one or more devices or one device and a plurality of devices.

The term "one or a plurality" means one item or a plurality of items.

The term "about" means that a value of a given quantity is within ±10% of the stated value. In other embodiments, the value is within +5% of the stated value. In other embodiments, the value is within ±2.5% of the stated value. In other embodiments, the value is within ±1% of the stated value.

The term "substantially" means that a value of a given quantity is within ±5% of the stated value. In other embodiments, the value is within ±2.5% of the stated value. In other embodiments, the value is within ±2% of the stated value. In other embodiments, the value is within ±1% of the stated value. In other embodiments, the value is within +0.5% of the stated value. In other embodiments, the value is within +0.1% of the stated value.

The term "gpt" or "gptg" means gallons per thousand gallons.

The term "pptg" or "ppt" means pounds per thousand gallons.

The term "wt. %" means weight percent.

The term "w/w" means weight per weight.

The term "vol. %" means volume percent.

The term "v/v" means volume per volume.

The term "w/v" means weight per volume.

The term "v/w" means volume per weight.

The term "fracturing" refers to the process and methods of breaking down a geological formation, i.e., the rock formation around a well bore, by pumping fluid at very high pressures, in order to increase production rates from a hydrocarbon reservoir. The fracturing methods of this disclosure use otherwise conventional techniques known in the art.

The term "under fracturing conditions" means injecting or pumping a fracturing fluid into a formation at a sufficient pressure, at a sufficient temperature (normally not an issue), and for a time sufficient to form fractures or fissures in the formation.

The term "proppant" refers to a granular substance suspended in the fracturing fluid during the fracturing operation, which serves to keep the formation from closing back down upon itself once the pressure is released. Proppants envisioned by the present disclosure include, but are not limited to, conventional proppants familiar to those skilled in the art such as sand, 20-40 mesh sand, resin-coated sand, sintered bauxite, glass beads, and similar materials.

The term "acrylamide containing polymers" and "polyacrylamide containing polymers" are used interchangeable and means that the polymers include acrylamide as a major monomer making up the polymer backbone. Generally, the term major in this setting means the polymers include at least 30% acrylamide, at least 40% acrylamide, at least 40% acrylamide, at least 50% acrylamide, at least 60% acrylamide, at least 70% acrylamide, at least 80% acrylamide, at least 90% acrylamide, or 100% acrylamide. It should be recognized that these ranges include all subranges such as 30% to 100% or any other range or any other at least percentage.

DETAILED DESCRIPTION OF THE DISCLOSURE

The inventors have found that fracturing fluids for fracturing subterranean formations may be formulated based on polymer compositions including a mixture of one or more water-soluble cationic polymers and one or more anionic polymers, wherein the polymer compositions are formulated to be hydrated in a water composition having an effective amount of ions or dissolved solids sufficient to reduce gelling interactions of the oppositely charged polymers or formed into water-in-oil emulsions. The inventors have also found that by optimizing properties of the polymer composition and the water composition, fracturing fluids may be formulated that have a similar percent drag reduction compared to a fracturing fluid in the absence of the one or more anionic polymers at a reduced rate. The properties subject to being optimized include: (a) an amount of each of the one or more cationic polymers, (b) an amount of each of the one or more anionic polymers, (c) a ratio of the total amount of the one or more cationic polymers to the total amounts of the one or more anionic polymers, (d) a cation charge on each of the one or more cationic polymers, (e) an anionic charge on each of the one or more anionic polymers, (f) a ratio of the total cationic charges to the total anionic charges, (g) total amount of dissolved solids in the water, (h) types of the dissolved solids in the water, and (i) a ratio of monovalent ions to polyvalent ions in the water. In certain embodiments, the water is selected from the group consisting of fresh water, brackish water, salt water, sea water, produced water, flowback water, or combinations thereof; provided the selected water includes the effective amount of TDS sufficient to reduce gelling interactions between the oppositely charged polymers. The inventors have also found that the polymer compositions may comprise collectively or individually dry particulate cationic and anionic polymers which are added to a water source, collectively or individually water-in-oil emulsions including the cationic and anionic polymers, collectively or individually oil-based slurries including the particulate cationic and anionic polymers, or any combination thereof.

The inventors have also found the present compositions may provide alternative delivery systems for water-soluble polymers including: (1) an oil based slurry including an oil based carrier, a first amount of one or more particulate hydratable cationic polymers and a second amount of one or more particulate hydratable anionic polymers, (2) an oil based slurry including an oil based carrier and a first amount of one or more particulate hydratable cationic polymers, (3) an oil based slurry including an oil based carrier and a second amount of one or more particulate hydratable anionic polymers, (4) a water-in-oil emulsion including: (a) a discrete water or aqueous phase comprising a first amount of one or more hydratable cationic polymers, a second amount of one or more hydratable anionic polymers, and about 0.3 wt. % to about 2.0 wt. % dissolved solids, and (b) a continuous oil phase comprising one or more hydrocarbon solvents, (5) a water-in-oil emulsion including: (a) a discrete water or aqueous phase comprising a first amount of one or more hydratable cationic polymers, and (b) a continuous oil phase comprising one or more hydrocarbon solvents, and, (6) a water-in-oil emulsion including: (a) a discrete water or aqueous phase comprising a second amount of one or more hydratable anionic polymers and (b) an oil phase comprising one or more hydrocarbon solvents, (7) a dry composition including a mixture of a first amount of one or more particulate hydratable cationic polymers and a second amount of one or more particulate hydratable anionic polymers, (8) a dry composition including a first amount of one or more particulate hydratable cationic polymers, or (9) a dry composition including a second amount of one or more particulate hydratable anionic polymers.

The inventors have also found that an oil-based suspension of a water-soluble polymer creates superior stability, and improved performance as compared to aqueous emulsions and other known forms of water-soluble polymers. In certain embodiments, the mixtures of oppositely charged particulate water-soluble polymers are in the form of dry granular particles. In certain embodiments, the polymer comprising the mixture are polyacrylamide containing polymers and copolymers. Drag reduction and proppant delivery are the two primary functions of a friction reducer carrier fluid. Using particle size to increase polymer loading also increases the hydration viscosity and the downhole viscosity creating better proppant carrying properties.

The inventors have found that slurrying mixtures of one or more oppositely charged polymers and/or copolymers such as oppositely charged acrylamide polymers and/or copolymers in an oil-based carrier including one or more hydrocarbon solvents, one or more surfactants and one or more polymeric suspension agents that provide a readily soluble source of polymer with superior shelf life and resistance to ambient moisture. In certain embodiments, the one or move suspension agents including one or more synthetic polymeric suspending agents and one or more synthetic polymeric suspending agents and one or more organophilic clay suspending agents. In other embodiments, the polymeric agent include linear diblock copolymers based on styrene and ethylene/propylene. The styrene ethylene/propylene-(styrene) polymers are thermoplastic elastomers that are easy to manufacture and effective in helping keep the polyacrylamide containing polymers in suspension.

The inventors have also found that the dry powder polyacrylamide containing polymers are designed to be coated with an oil based carrier including one or more hydrocarbon solvents and one or more surfactants, wherein the hydrocarbon solvents and the surfactants reduce or eliminate inter-particle adhesion and aggregation and clumping of the polyacrylamide containing polymers and suspending by one or more polymeric suspending agents. The polymer granules coated by one or more hydrocarbon solvents and one or more surfactants forming a barrier preventing particle-to-particle cohesion. The oil-based carrier in the slurry also insulates the polyacrylamide containing polymers from moisture exposure in the environment to prevent premature hydration, which may degrade and destabilize the fluid. Providing the polyacrylamide containing polymers in a pre-suspended rather than dry form also promotes rapid dispersion of the polyacrylamide containing polymers into the carrier fluid on site. When the slurry is added to water having a sufficient ion concentration to prevent gelling interactions between the oppositely charged polyacrylamide containing polymers to form a proppant carrier fluid, the slurried polyacrylamide containing polymers disperse with minimal particle clumping (sometimes referred to as "fish eyes"). Promoting dispersal maximizes particle hydration, which, in turn, enhances overall performance by reducing the drag caused by particle aggregation. In flow loop tests, the slurry of the present disclosure out-performs dry polyacrylamide containing polymer powders in terms of enhanced drag reduction by preventing fish eye formation.

Known compositions are formed from polymerized emulsions including water, monomers, and surfactants. Upon combination, the monomers, initiators, and dispersion media (and optionally a colloid stabilizer) form a non-homogeneous mixture. The components then form colloidal particles containing the formed polymer. For oil and gas field applications, emulsion polymerization is typically carried out through a batch process in which all ingredients are staged in a vessel before polymerization can occur.

In contrast to known compositions, the present compositions include a slurry comprising an oil-based carrier and a mixture of oppositely charged, water soluble polymers, wherein the oil-based carrier includes one or more hydrocarbon solvents, one or more surfactants, and one or more suspending agents. In certain embodiments, the one or more surfactants include one or more nonionic surfactants. In other embodiments, the one or more suspending agents include one or more carrier soluble polymeric suspending agents or one or more carrier soluble polymeric suspending agents and one or more organophilic clays. It should be recognized that the present compositions do not require traditional emulsion polymerization polymers at all. Eliminating the need for traditional polymerization reactions, in turn, eliminates the demands of temperature control and the need for equipment such as reactionary vessels. As such, the present compositions have improved environmental impact. Additionally, the oil-based carriers of this disclosure make the present compositions easier to manufacture and less resource intensive.

Another advantage of the present compositions is that they are capable of using a wide range of surfactants, as compared to traditional polymer emulsions that will only tolerate a narrow range of surfactants. Unlike fracturing fluid compositions that include concentrated polymer solutions, the fracturing fluid compositions of the present disclosure provide a two-phase heterogeneous system comprising an oil-based polymer slurry designed to be hydrated in a water having an effective amount of ions sufficient to reduce gelling interactions of the oppositely charged polymers, i.e., reduces or eliminates precipitates. In certain, embodiments, the two-phase fracturing fluid systems include between about 20 wt. % and about 40 wt. % of the slurry to form a proppant carrier fluid, while the one or more surfactants are designed not only to assist in polymer hydration, but also to create a stable emulsion as the polymers hydrate, i.e., one or more surfactants stabilize and maintain the water-in-oil or oil-in-water emulsion of the proppant carrier fluid. The one or more surfactants are also designed to invert helping to emulsify the oil phase in the water helping to dissolve and hydrate the oppositely charged, water soluble polyacrylamide containing polymers.

The inventors have also found that particle size influences inversion rates: large particles yield longer inversion times; and smaller particles yield faster inversion times. By creating slurries with smaller particles, the polymers in the slurries may also act as friction reducers causing comparable or better inversion rates as compared to traditional emulsions, powder, or aqueous suspension based fracturing fluids. The inventors have also found that smaller particles also allow for faster hydration, and provide better overall drag reduction.

Another aspect of the present compositions is that they may be customized in polymer loading. Changing particle sizes influence the active solids in the end products, in order to decrease or increase certain attributes of the product's performance. For instance, decreasing or increasing particle size allows more or less active polymers to be added to the oil-based slurry by changing the viscosity and flow characteristics of the fracturing fluids. Specifically, decreasing particle size allows a higher polymer loading, as it is easier to suspend and improve pumpability of the slurry compared to larger particles at similar loadings. By combining the influences of particle size and polymer loading, the end products may be further customized to different applications and preferences.

In other embodiments, the present slurries have between about 30% and about 50% greater hydration capacity per loading than traditional emulsions and imparts the resulting proppant carrier fluids with accordingly better proppant carrying capacity. By controlling the slurry viscosity and the hydration viscosity, a user may create a customized proppant carrier fluid that fits a particular manufacturing, storage, transport, pump rate, well depth, or other scenario.

Increasing the polymer loading also allows the oppositely charged, water soluble, polyacrylamide containing polymer slurries of the present disclosure to utilize lower relative volumes while achieving the same performance as traditional emulsions. To illustrate, traditional emulsions are typically used at loadings between about 0.50 gpt and about 1.0 gpt in water. Aqueous concentrates require large volumes up to about 8 gpt as well as they comprise mostly water. Slurries of the present disclosure may be used at much lower concentration such as between about 0.1 gpt and about 0.5 gpt, while still providing improved drag reduction performance as compared to traditional emulsions, dry powders, and aqueous liquid concentrates.

Additionally, known emulsions are based on high molecular weight polymers, for example polymers having molecular weight of 24 million or higher. Slurries of the present disclosure may utilize lower molecular weight polymers, yet still give comparable drag reduction performance, even at lower loadings. Drag reduction and proppant delivery are the two primary functions of a friction reducer carrier fluid. Using particle size to increase polymer loading also increases the hydration viscosity and the downhole viscosity creating better proppant carrying properties.

The slurries of the present disclosure may also be modified to reduce free fluid in the final manufactured product by adding one or more synthetic polymeric suspending agents to oil-based carriers. In other embodiments, the oil-based carriers may include one or more organophilic clays. Traditional emulsions cannot be modified in this way. The addition of the one or more one or more synthetic polymeric suspending agents overcomes potential problems with free fluid and settling, resulting in a more stable product than a traditional emulsion. Alternatively, additional surfactants or adjustments in particle size may be used to reduce free fluid and settling. The reader is referred to United States Published Application 20170313930A1 for additional information on slurries that may be used to formulate the compositions of this disclosure.

The present disclosure broadly relates to a composition for treatment of subterranean well formations comprising the slurry of as set forth above and a water source selected from the group consisting of fresh water, brackish water, salt water, sea water, produced water, flowback water, or combinations thereof; provided the selected water includes a sufficient concentration of ions to reduce gelling interactions of the oppositely charged polymers. In certain embodiments, the composition further comprising a proppant. In certain embodiments, the proppant is sand.

The present disclosure broadly relates to a method of treating a subterranean formation comprising hydrating an oil-based slurry and a water source selected from the group consisting of fresh water, brackish water, salt water, sea water, produced water, flowback water, or combinations thereof; provided the selected water includes a sufficient concentration of ions to reduce gelling interactions of the oppositely charged polymers to form a proppant carrier fluid; adding a proppant to the water source; and delivering the carrier fluid and proppant to the subterranean formation.

Embodiments of this disclosure broadly relates to slurry compositions including a mixture of oppositely charged, particulate, water-soluble polymers and an oil-based vehicle or carrier including one or more hydrocarbon solvents, one or more suspending agents, and one or more surfactants.

Cationic and Anionic Polymer Emulsions

Embodiments of this disclosure include water-in-oil emulsions (sometimes known as inverse emulsion as opposed to normal oil-in-water emulsions) may be formulated from a water or aqueous phase comprising about 0.3 wt. % to about 2.0 wt. % dissolved solids, hydratable cationic polymers, hydratable anionic polymers or a mixture of hydratable cationic polymers and hydratable anionic polymers dispersed in a continuous oil phase comprising one or more hydrocarbon solvents. The water-in-oil emulsions may be formed by an acceptable emulsion preparation method. As the polymers are in the water or aqueous phase of the water-in-oil emulsions or inverse emulsions, the hydratable polymers are either in fully hydrated state or partially a hydrated state.

Embodiments of this disclosure include emulsion formed by emulsion polymerization of mixtures comprising a cationic monomer (e.g., AMPS –2-acrylamido-2-methylpropane sulfonic acid) and/or a co-monomer (e.g., acrylic acid) initiated by an appropriate initiator. When the majority of cationic monomer is incorporated in the polymer chain, an anionic monomer (e.g., acrylamide) is added to the propagating emulsion and reacted till all of the monomers are consumed or the reaction is terminated.

Embodiments of this disclosure include emulsion formed by emulsion polymerization of mixtures comprising an anionic monomer (e.g., acrylamide) and/or other co-monomer (e.g., acrylic acid) are initiated by an appropriate initiator. When the majority of anionic monomer is incorporated in the polymer chain, a cationic monomer (e.g., AMPS –2-acrylamido-2-methylpropane sulfonic acid) is added to the propagating emulsion and reacted till all of the monomers are consumed or the reaction is terminated.

In other embodiments, a stable emulsion may be formulated by blending, mixing or combining two separate emulsions, a first emulsion including one or more cationic PAM polymers, and a second emulsion including one or more anionic PAM polymers.

In other embodiments, a water-in-oil emulsion including a first oil phase and a first aqueous phase including one or more anionic PAM polymers, a second oil phase and a second aqueous phase including one or more cationic PAM polymers, wherein the two oil phases combine to from a continuous oil phase and wherein the two aqueous phases form separate discontinuous aqueous phases.

In other embodiments, the cationic polymers and anionic polymers may be mixed together from two different emulsion streams. One emulsion including the cationic polymers and the other emulsion including the anionic polymers. The percent of each emulsion in the final emulsion may vary from about 5% to about 95% cationic emulsion with the other percent made up of anionic emulsion. In other embodiments, additives like surfactants and/or salts are used to fortify and stabilize the new mixed inverse emulsions.

The compositions of the present disclosure relate broadly to the transport and safety advantages of a dry powder with the ease-of-use of an oil-based emulsion. The present composition may be easily and quickly hydrated onsite at a well formation, in an on-the-fly application, therefore, overcoming the disadvantages of a dry powder. The present compositions are not manufactured using a reactor or particularly toxic reagents, and, therefore, overcome the environmental and safety disadvantages associated with known oil-based emulsions. The environmental impact is of the present compositions are improved over known friction reducers, and is available as a concentrate with minimal packaging. The efficient delivery, improved safety profile of the components, and ease of hydration thus reduces the environmental impact of manufacture, transport, use, and disposal of the presently disclosed friction reducer and associated carrier fluid.

Polymers for Use in Emulsion, Slurry, or Dry Compositions

Polymer granules may have different particle sizes. Different particle sizes impart different characteristics to the final product. By choosing a particle size, or a particular ratio of different particle sizes, a user may customize the performance of the slurry or create a product that has varying properties.

In certain embodiments, the water-soluble anionic polymers individually have (number average or weight average) molecular weights between about 10 million and 40 million and all sub-ranges. In other embodiments, the anionic polymers have a molecular weight between about 15 million and 30 million and all sub-ranges. In other embodiments, the anionic polymers have a molecular weight between about 20 million and 30 and all sub-ranges. In other embodiments, the anionic polymers have a molecular weight greater than 22 million and molecular weights greater than 22, e.g., 25, 30, 35, 40, 45, etc.

In certain embodiments, the water-soluble cationic polymers individually have (number average or weight average) molecular weights between about 5 million and 20 million and all sub-ranges. In other embodiments, the cationic polymers have a molecular weight between about 10 million and 15 million and all sub-ranges. In other embodiments, the cationic polymers have a molecular weight between about 11 million and 14 million and all sub-ranges.

In certain embodiments, the particles or particle size distributions of the oppositely charged, particulate, water-soluble polymers individually may be between about 500 microns and about 20 micron or between mesh 35 and mesh 635. In other embodiments, the sizes or particle size distributions are between about 400 microns and about 40 micron or between mesh 40 and mesh 400. In other embodiments, the sizes or particle size distributions are between about 300 microns and about 50 micron or between mesh 50 and mesh 400. The particle size is between about 20 mesh and about 400 mesh, between about 50 mesh and about 300 mesh, or between about 75 and between about 200 mesh.

Properties To Be Optimized

The properties subject to being optimized for the formulation of the fracturing fluid compositions of this disclosure include: (a) an amount of each of the one or more cationic polymers, (b) an amount of each of the one or more anionic polymers, (c) a ratio of the total amount of the one or more cationic polymers to the total amounts of the one or more anionic polymers, (d) a cation charge on each of the one or more cationic polymers, (e) an anionic charge on each of the one or more anionic polymers, (f) a ratio of the total cationic charges to the total anionic charges, (g) total amount of dissolved solids in the water, (h) types of the dissolved solids in the water, and (i) a ratio of monovalent ions to polyvalent ions in the water.

Generally, the higher the number of cationic charged in polyacrylamide polymers, the more expensive the polymer are. For example, the pricing for one source of cationic polyacrylamide polymers are set forth in the following table:

TABLE 1

Cost per Pound verus Percent Cations in Polymer

| Product | Cost per Pound | Percent Cations (%) |
| --- | --- | --- |
| Fine Mesh Cationic PAM | $1.32 | 0-5 |
| Fine Mesh Cationic PAM | $1.40 | 5-10 |
| Fine Mesh Cationic PAM | $1.44 | 10-15 |
| Fine Mesh Cationic PAM | $1.45 | 15-20 |
| Fine Mesh Cationic PAM | $1.48 | 25-30 |
| Fine Mesh Cationic PAM | $1.62 | 32-35 |
| Fine Mesh Cationic PAM | $1.72 | 40-45 |
| Fine Mesh Cationic PAM | $1.643 | 53-58 |

From the data set forth in the Examples, the percent drag reduction of a mixture of cationic and anionic particulate hydratable polymers increased with increasing TDS and TDS type. Thus, in tap water, the mixture performed worse than the cationic polymer or the anionic polymer alone and at the high cost. In a 2 wt. % KCl brine (20K ppm KCl brine), the mixture still performed worse than the cationic polymer or the anionic polymer alone and again at the highest cost, but the cost is much more competitive. In a 55K ppm TDS synthetic brine, the mixture performed similarly to the cationic polymer with the anionic polymer performing worse and the cost of the mixture was similar to the cost of the anionic polymer, both less than the cost of the cationic polymer by about $0.1/% drag reduction. In a 110K ppm TDS synthetic brine, the mixture performed similarly to the cationic polymer with the anionic polymer performing worse and the cost of the mixture was similar to the cost of the anionic polymer, both less than the cost of the cationic polymer, again by about $0.1/% drag reduction. In a 250K ppm TDS synthetic brine, the mixture performed similarly to the cationic polymer with the anionic polymer performing worse and the cost of the mixture was $0.020 less than either the anionic polymer or the cationic polymer.

The data also show that the as the number of cations on the cationic polymer increase, the % drag reduction increases, but at higher cost. Thus, by adjusting the number of cations on the cationic polymers, the amount of cationic polymers, the number of anions on the anionic polymers, amount, the amount of anionic polymers, amount of TDS in the water, and the type of TDS components in the water.

The following table set forth the properties and the ranges for optimizing the fracturing fluid components for the best performance at the lowest cost compared to a fracturing fluid including only cationic polymers or anionic polymers.

TABLE 2

Properties and Ranges

| Property | Ranges |
| --- | --- |
| amount of cationic polymers | 0.1 gpt to 10 gpt (slurry) |
| | 0.1 ppt to 5 ppt (dry) |
| amount of anionic polymers | 0.1 gpt to 10 gpt (slurry) |
| | 0.1 ppt to 5 ppt (dry) |
| a ratio cationic polymers to anionic polymers | 10:1 to 1:10 |
| cation charges on cationic polymers | 0% to 80% |
| anionic charges on anionic polymers | 0% to 80% |
| ratio of the cation charges to anion charges | 10:1 to 1:10 |
| amount of TDS | >20K ppm |
| types of TDS | monovalent and/or divalent ions |
| ratio of monovalent ions to polyvalent ions | 50:1 to 1:50 |

A weight ratio of the one or more anionic polymers to the one or more cationic polymers is between about 50:1 to about 1:50, between about 25:1 to about 1:25, between about 15:1 to about 1:15, between about 10:1 to about 1:10, between about 5:1 to about 1:5, between about 1:20 and about 1:1, or about 1:1, and/or a charge ratio of the one or more anionic polymers to the one or more cationic polymers is between about 50:1 to about 1:50, between about 25:1 to about 1:25, between about 15:1 to about 1:15, between about 10:1 to about 1:10, between about 5:1 to about 1:5, between about 1:5 and about 1:1, or about 1:1.

The one or more anionic polymers individually have molecular weights between about 10 million and 40 million, between about 15 million and 30 million, between about 20 million and 30, or greater than 22 million.

The one or more cationic polymers individually have molecular weights between about 5 million and 20 million, between about 10 million and 15 million, or between about 11 million and 14 million.

The water composition is selected from the group consisting of fresh water, brackish water, salt water, sea water, produced water, flowback water, or combinations thereof; provided the selected water composition includes a sufficient concentration of ions to reduce gelling interactions between the oppositely charged polymers.

The following table sets forth specific examples of water compositions and different mixtures of anionic and cationic polymers at a constant 1:1 cation to anion ratio.

TABLE 3

Specific Examples of Water Compositions and Polymer Mixtures at a Constant 1:1 Cation to Anion Ratio

| Example | TDS | Anionic Polymers (wt. %)/(%) | Cationic Polymers (wt. %)/(%) |
| --- | --- | --- | --- |
| C1 | >20K ppm | 50.00/80.00 | 50.00/80.00 |
| C2 | >20K ppm | 57.14/60.00 | 42.86/80.00 |
| C3 | >20K ppm | 66.67/40.00 | 33.33/80.00 |
| C4 | >20K ppm | 80.00/20.00 | 20.00/80.00 |
| C5 | >20K ppm | 50.00/60.00 | 50.00/60.00 |
| C6 | >20K ppm | 60.00/40.00 | 40.00/60.00 |
| C7 | >20K ppm | 66.67/30.00 | 33.33/60.00 |
| C8 | >20K ppm | 75.00/20.00 | 25.00/60.00 |
| C9 | >20K ppm | 50.00/40.00 | 50.00/40.00 |
| C10 | >20K ppm | 57.14/30.00 | 42.86/40.00 |
| C11 | >20K ppm | 66.67/20.00 | 33.33/40.00 |
| C12 | >20K ppm | 80.00/10.00 | 20.00/40.00 |

In certain embodiments, the water composition includes greater than or equal to a 55K ppm TDS brine. In certain embodiments, the water composition includes greater than or equal to a 110K ppm TDS brine. In certain embodiments, the water composition includes greater than or equal to a 250K ppm TDS brine. In other embodiments, the water composition includes only monovalent ions. In other embodiments, the water compositions only polyvalent ions. In other embodiments, the water compositions a mixture of monovalent and polyvalent ions, wherein the ratios are between about 1:10 and 10:1.

The above table sets forth the broadest ranges for each property and its should be recognized that the values of each of the properties may be any value with in their ranges so that the resulting fracturing fluid is optimized for the desired water composition. It should also be recognized that the fracturing fluid may also include a salt composition to adjust the total dissolved solids and solid types in the water composition used to form the fracturing fluid.

The following table sets forth specific examples of water compositions and different mixtures of anionic and cationic polymers at a constant 1:1 cationic polymer to anionic polymer weight ratio.

TABLE 4

Specific Examples of Water Compositions and Polymer Mixtures at a Constant 1:1 Cationic Polymer to Anionic Polymer Weight Ratio

| Example | TDS | Anionic Polymers (wt. %)/(%) | Cationic Polymers (wt. %)/(%) |
| --- | --- | --- | --- |
| C13 | >20K ppm | 50.00/40.00 | 50.00/80.00 |
| C14 | >20K ppm | 50.00/40.00 | 50.00/75.00 |
| C15 | >20K ppm | 50.00/40.00 | 50.00/70.00 |
| C16 | >20K ppm | 50.00/40.00 | 50.00/65.00 |
| C17 | >20K ppm | 50.00/40.00 | 50.00/60.00 |
| C18 | >20K ppm | 50.00/40.00 | 50.00/55.00 |
| C19 | >20K ppm | 50.00/40.00 | 50.00/50.00 |

In certain embodiments, the water composition includes greater than or equal to a 55K ppm TDS brine. In certain embodiments, the water composition includes greater than or equal to a 110K ppm TDS brine. In certain embodiments, the water composition includes greater than or equal to a 250K ppm TDS brine. In other embodiments, the water composition includes only monovalent ions. In other embodiments, the water compositions only polyvalent ions. In other embodiments, the water compositions a mixture of monovalent and polyvalent ions, wherein the ratios are between about 1:10 and 10:1.

The above table sets forth the broadest ranges for each property and its should be recognized that the values of each of the properties may be any value with in their ranges so that the resulting fracturing fluid is optimized for the desired water composition. It should also be recognized that the fracturing fluid may also include a salt composition to adjust the total dissolved solids and solid types in the water composition used to form the fracturing fluid.

In certain embodiments, the waters for use in this disclosure include at least one 15,000 ppm (1.5 wt. %) of monovalent ions including anionic monovalent ions such as hydroxide, halides (e.g., fluoride, chloride, bromide, and iodide), nitrite, nitrate, carboxylates (e.g., formate, acetate, propinate, etc.), and/or dihydrogen phosphate, and cationic monovalent cations such as ammonium, sodium, potassium, rubidium, and/or cesium. In other embodiments, the monovalent ion concentration in is at least one 17,500 ppm (1.75 wt. %). In other embodiments, the monovalent ion concentration is at least one 20,000 ppm (2.0 wt. %). In other embodiments, the monovalent ion concentration is at least one 25,000 ppm (2.5 wt. %). In other embodiments, the monovalent ion concentration water is at least one 30,000 ppm (3.0 wt.). In other embodiments, the monovalent metal cation concentration is between about 15,000 ppm (1.5 wt. %) and 250,000 ppm (25 wt. %). All monovalent ion concentrations include all subranges as well.

In certain embodiments, the waters for use in this disclosure include a polyvalent ion concentration of at least one 10,000 ppm (1.0 wt. %), where the polyvalent ion include polyvalent anions such as borate, sulfate, thiosulfate, carbonate, hydrogen phosphate, and/or phosphate and polyvalent cations such as magnesium, calcium, barium, strontium, and/zinc. In other embodiments, the polyvalent ion concentration is at least one 12,500 ppm (1.25 wt. %). In other embodiments, the polyvalent ion concentration is at least one 15,000 ppm (1.5 wt. %). In other embodiments, the polyvalent ion concentration is at least one 20,000 ppm (2.0 wt. %). In other embodiments, the polyvalent ion concentration is at least one 25,000 ppm (2.5 wt. %). In other embodiments, the polyvalent ion concentration is at least one 30,000 ppm (3.0 wt. %). In other embodiments, the polyvalent ion concentration is at least one 40,000 ppm (4.0 wt. %). In other embodiments, the polyvalent concentration in the water is at least one 50,000 ppm (5.0 wt. %). In other embodiments, the polyvalent metal cation concentration in the water is at least one 60,000 ppm (6.0 wt. %). In other embodiments, the monovalent metal cation concentration is between about 10,000 ppm (1.0 wt. %) and 250,000 ppm (25 wt. %). All monovalent ion concentrations include all subranges as well.

In certain embodiments, the waters for use in this disclosure include a ratio of monovalent ions to polyvalent ions is between about 100:1 and about 1:100. In other embodiments, the ratio is between about 75:1 and about 1:75. In other embodiments, the ratio is between about 50:1 and about 1:50. In other embodiments, the ratio is between about 25:1 and about 1:25. In other embodiments, the ratio is between about 15:1 and about 1:15. In other embodiments, the ratio is between about 10:1 and about 1:10. In other embodiments, the ratio is between about 5:1 and about 1:5. In other embodiments, the ratio is between about 1:1. In other embodiments, the ratio is between about 1:1 to about 1:100. The ratios include all subratios.

Slurry Compositions

In certain embodiments, the slurry compositions include between about 5 wt. % and about 60 wt. % of the polymer compositions and between about 95 wt. % and about 40 wt. % of the oil based carrier. In other embodiments, the slurry compositions include between about 10 wt. % and about 60 wt. % of the polymer compositions and between about 90 wt. % and about 40 wt. % of the oil based carrier. In other embodiments, the slurry compositions include between about 20 wt. % and about 60 wt. % of the polymer compositions and between about 80 wt. % and about 40 wt. % of the oil based carrier. In other embodiments, the slurry compositions include between about 30 wt. % and about 60 wt. % of the polymer compositions and between about 70 wt. % and about 40 wt. % of the oil based carrier. In other embodiments, the slurry compositions include between about 40 wt. % and about 60 wt. % of the polymer compositions and between about 60 wt. % and about 40 wt. % of the oil based carrier. The oil based carrier includes between 98 wt. % and about 80 wt. % of one or more hydrocarbon solvents, between about 1 wt. % and about 10 wt. % of one or more surfactants, and between about 1 wt. % and about 10 wt. % of one or more carrier soluble suspending agents. In certain embodiments, the one or more hydrocarbon solvent comprise one or more petroleum distillates; the one or more surfactants comprise one or more nonionic surfactants; and the one or more suspending agents comprise polymeric suspending agents such as linear block copolymers, lipophilic clays, or mixtures thereof.

The slurry compositions of the present disclosure have about 30% to about 50% greater hydration capacity per loading than traditional emulsions depending on water-soluble polymer qualities and water type, which imparts to carrier fluid including the slurry compositions of this disclosure with improved proppant carrying capacity. By controlling the slurry viscosity and the hydration viscosity, a user may be able to create a customized proppant carrier fluid that fits a particular manufacturing, storage, transport, pump rate, well depth, or other scenarios.

Again, increasing the polymer loading in the present fluids allows the polymer slurries to utilize lower relative volumes, while achieving the same performance as traditional emulsions. To illustrate, traditional emulsions are typically used at loadings between about 0.50 gpt and about 1.0 gpt in water. Aqueous concentrates require large volumes up to about 8 gpt as well as they comprise mostly water. Slurries of the present disclosure may be used at much lower concentration such as between about 0.1 gpt and about 0.5 gpt, while still providing improved drag reduction performance as compared to traditional emulsions, dry powders, and aqueous liquid concentrate. In other embodiments, the slurry concentration is between about 0.1 gpt and about 0.4 gpt. In other embodiments, the slurry concentration is between about 0.1 gpt and about 0.3 gpt. In other embodiments, the slurry concentration is between about 0.1 gpt and about 0.2 gpt.

In certain embodiments, the slurry comprises between about 5% and about 55% of the polymer composition and between about 95% and about 45% of the oil-based vehicle or carrier, wherein the oil based carrier includes one or more hydrocarbon solvents, one or more surfactants, and one or more suspension agents. In other embodiments, the one or more surfactants comprise one or more ethoxylated nonionic surfactants, propoxylated nonionic surfactants, ethoxylated and propoxylated nonionic surfactants. In other embodiments, the approximate size of the particulate water-soluble polymer is between about 20 and about 400 mesh. In other embodiments, the suspension agents comprise polymeric suspending agents such as linear block copolymers, lipophilic clays, or mixtures thereof.

In certain embodiments, the oil-based carriers comprise polymer compositions including an effective amount of oppositely charged, water soluble, acrylamide containing polymers. In other embodiments, the polymer compositions include at least one cationic acrylamide containing polymer and at least on anionic acrylamide containing polymer. In other embodiments, the polymer compositions include one or more cationic acrylamide containing polymers and one or more anionic acrylamide containing polymers.

In certain embodiments, a weight ratio of cationic acrylamide containing polymers to anionic acrylamide containing polymers is between about 50:1 to about 1:50. In other embodiments, the ratio is between about 25:1 to about 1:25. In other embodiments, the ratio is between about 15:1 to about 1:15. In other embodiments, the ratio is between about 10:1 to about 1:10. In other embodiments, the ratio is between about 5:1 to about 1:5. In other embodiments, the ratio is about 1:1. In other embodiments, the ratio is between about 1:20 and about 1:1. Again, all subranges are included.

In certain embodiments, a charge equivalent ratio of cationic charges in the cationic acrylamide containing polymers to anionic charges in the anionic acrylamide containing polymers is between about 50:1 to about 1:50. In other embodiments, the ratio is between about 25:1 to about 1:25. In other embodiments, the ratio is between about 15:1 to about 1:15. In other embodiments, the ratio is between about 10:1 to about 1:10. In other embodiments, the ratio is between about 5:1 to about 1:5. In other embodiments, the ratio is about 1:1. In other embodiments, the ratio is between about 1:20 and about 1:1. Again, all subranges are included. It should be recognized, that increasing the number of cations in the cationic polymers may be used to decrease the amount of cationic polymers required in the slurries resulting in a significant cost reduction of the slurries, while maintaining equivalent performance properties and characteristics.

In certain embodiments, the polymer compositions may also include one or more neutral acrylamide containing polymers and/or zwitterionic acrylamide containing polymers. The neutral and/or zwitterionic acrylamide containing polymer to cationic/anionic acrylamide containing polymer ratio is between about 10:1 and about 1:10, about 5:1 and about 1:5, and about 1:1. All ratios include all permitted subratios.

Suitable Components for Use in the Disclosure

Suitable hydrocarbon solvents include, without limitation, paraffin containing hydrocarbons, isoparaffin containing hydrocarbons, olefin containing hydrocarbons, cyclic paraffin containing hydrocarbons, cyclic isoparaffin containing hydrocarbons, cyclic olefin containing hydrocarbons, paraffinic naphthenlic solvents, and mixtures thereof. In certain embodiments, the hydrocarbon solvents include one or more petroleum distillates. Petroleum distillates are products distilled from petroleum crude oil having different CAS number identifiers depending upon the molecular weight distribution and processing technology used. Exemplary examples of petroleum distillates include, without limitation, a hydrotreated light petroleum distillate having the CAS No. 64742-47-8. Additionally, the hydrocarbon solvents of this disclosure are not white medicinal oils or other highly refined oils, making the present compositions easier to manufacture and less resource intensive and less expensive. In certain embodiments, oil-based vehicle is petroleum distillate. Petroleum distillates are products distilled from petroleum crude oil and use different Cas #identifiers depending upon the molecular weight distribution and processing technology used. A petroleum distillate suitable for the present composition can be, for example, CAS #64742-47-8. Exemplary examples of the hydrocarbon solvents used in formulating the water-in-oil emulsion of this disclosure include, without limitation, paraffin containing hydrocarbons, naphthenlic solvents, and mixtures thereof, such as ODC® Drilling Fluid Base Oil, a registered trademark of Sasol and available from Sasol.

Suitable surfactants include, without limitation, anionic surfactants, cationic surfactants, nonionic surfactant, zwitterionic surfactants, and mixtures or combinations thereof. In certain embodiments, the surfactants include, without limitation, a nonionic surfactant, a mixture of nonionic surfactants, a mixture of nonionic surfactants and zwitterionic surfactants, a mixture of nonionic surfactants and cationic surfactants, a mixture of nonionic surfactants and anionic surfactants, a mixture of nonionic surfactants, cationic surfactants, and zwitterionic surfactants, a mixture of nonionic surfactants, anionic surfactants, and zwitterionic surfactants, or a mixture of nonionic surfactants, cationic surfactants, anionic surfactants, and zwitterionic surfactants. Exemplary examples of nonionic surfactants include, without limitation, ethoxylated and/or propoxylated ($C_8$-$C_{20}$) fatty acids, ethoxylated, propoxylated ($C_8$-$C_{20}$) fatty alcohols, and/or oxylated propoxy copolymer. Specific exemplary examples include, without limitation, T-Det® A 1058, an ethoxylated alcohol (alkoxylated isodecyl alcohol), alcohol ethoxylates in the form of Harcos TDET 1058 and alternative supplier of Sasol Novel 23E4, Lecithin, and PGPR (Polyglycerol polyricinoleate). The hydrophile-lipophile balance (HLB), is the balance of the size and strength of the hydrophilic and lipophilic groups of a surfactant. A surfactant with an HLB number below that of 9 is considered lipophilic, while an HLB above 11 is considered hydrophilic. HLB values between 9-11 are intermediate. The present polyacrylamide slurry only requires inclusion of a surfactant for desired properties such as stability, inversion, and/or slurry viscosity, which may correspond to anything from 3-16 in HLB value. An emulsion, in contrast, requires specific surfactants for initiation, stability, and dispersion each surfactant having a much narrower HLB range. In certain embodiments, the surfactants may be one or more ethoxylated nonionic surfactants. In other embodiments, the surfactants may be one or more fatty chain EO/PO (ethylene oxide propylene oxide) surfactants and/or one or more oxalate propoxy copolymer surfactants.

Suitable suspending agents include, without limitation, any polymeric suspending agent capable of suspending or dispersing the polymer particles and reducing particle settling. In certain embodiments, the carrier soluble polymeric suspension agents include, without limitation, styrene containing polymers, styrene containing copolymers, styrene containing block copolymers, styrene/ethylene block copolymers, styrene/propylene block copolymers, styrene/ethylene/propylene block copolymers, styrene/acrylic acid block copolymers, styrene/methacrylic acid block copolymers, styrene/acrylate block copolymers, styrene/methacrylate block copolymers, styrene/isoprene copolymers, styrene/butadiene copolymers, styrene/butadiene/isoprene copolymers, styrene/acrylic acid/ethylene block copolymers, styrene/methacrylic acid/ethylene block copolymers, styrene/acrylate/ethylene block copolymers, styrene/methacrylate/ethylene block copolymers, styrene/isoprene/ethylene copolymers, styrene/butadiene/ethylene copolymers, styrene/butadiene/isoprene/ethylene copolymers, styrene/acrylic acid/propylene block copolymers, styrene/methacrylic acid/propylene block copolymers, styrene/acrylate/propylene block copolymers, styrene/methacrylate/ propylene block copolymers, styrene/isoprene/propylene copolymers, styrene/butadiene/propylene copolymers, styrene/butadiene/isoprene/propylene copolymers, styrene/acrylic acid/ethylene/propylene block copolymers, styrene/methacrylic acid/ethylene/propylene block copolymers, styrene/acrylate/ethylene/propylene block copolymers, styrene/methacrylate/ethylene/propylene block copolymers, styrene/isoprene/ethylene/propylene copolymers, styrene/butadiene/ethylene/propylene copolymers, styrene/butadiene/isoprene/ethylene/propylene copolymers, and mixtures thereof. In certain embodiments, the block copolymers are linear block copolymers. Exemplary examples of suspending agents include, without limitation, linear diblock copolymers based on styrene and ethylene/propylene, or mixtures thereof. Exemplary examples of linear diblock copolymer based on styrene and ethylene/propylene include, without limitation, KRATON resins such as G 1701 having a polystyrene content of 37%. A styrene/ethylene/propylene-(styrene) polymer is a thermoplastic elastomer that is easy to manufacture and effective in helping keep the particular water-soluble polymer in suspension. In certain embodiments, the suspending agents may also further include one or more organophilic clay. In other embodiments, the organophilic clays include, without limitation, bentonite clays, hectorite clays, attapulgite clays, ant/or sepiolite clays, which may be treated with organic materials to render the clays organophilic. Exemplary examples of polymer is suspension agents include, without limitation, Kraton G 1701, a clear, linear di block copolymer based on styrene and ethylene/propylene with a polystyrene content of 37 wt. %. The suspension aid is any variation of diblock copolymers based on styrene and ethylene/propylene. The composition may also contain a dispersant such as organophilic clay or a synthetic alternative as the suspension agent.

Suitable oppositely charged, hydratable polymers include, without limitation, anionic acrylamide polymers such as sodium, potassium, rubidium, and/or cesium anionic polyacrylamide (APAM) polymers of formula —(—[$CH_2CH(CONH_2)$]$_m$—[$CH_2CH(COONa)$]$_n$—)—, neutral polyacrylamide (PAM) polymers of formula —($CH_2CH(CONH_2)$)$_m$—, cationic polyacrylamide (CPAM) polymers of formula —(—[$CH_2CH(CONH_2)$]$_m$—[$CH_2CH(COORN^+(R')_3Cl^-)$]$_n$—)—, zwitterionic acrylamide copolymers of acrylamide and 3-dimethyl (methacryloyloxyethyl) ammonium propane sulfonate (DMAPS), mixtures of anionic acrylamide polymers and cationic acrylamide polymers, mixtures anionic acrylamide polymers and zwitterionic acrylamide copolymers, mixtures of cationic acrylamide polymers and zwitterionic acrylamide copolymers, mixtures of anionic acrylamide polymers, neutral acrylamide polymers, and cationic acrylamide polymers, mixtures of anionic acrylamide polymers, zwitterionic acrylamide copolymers, and cationic acrylamide polymers, and mixtures of anionic acrylamide polymers, zwitterionic acrylamide copolymers, neutral acrylamide polymers, and cationic acrylamide polymers. In other embodiments, the acrylamide polymers include synthetic polymers and copolymers such as vinyl alcohol containing polymers and copolymers, acrylamide containing polymers and copolymers, 2-amino-2-methyl propane sulfonic acid containing polymers and copolymers, other synthetic polymers and copolymers, and mixtures or combinations thereof. In other embodiments, the copolymers may include other ethylenically unsaturated monomers including, without limitation, ethylene, propylene, acrylic acid, methacrylic acid, other similar monomers and mixtures or combinations thereof.

Polyacrylamide is a hydrophilic, water-soluble polymer that can comprise nonionic, cationic, anionic, or zwitterionic charge. Hydrated polyacrylamide of powder origins can reduce friction and turbulence in a system allowing faster pump rates and reducing pumping pressures all while carrying sufficient proppant for typical oil and gas well applications. Dry powder polyacrylamide can be hard to utilize as it absorbs ambient moisture and is prone to aggregation and clump formation. Decreasing the particle size of the powder enhances the hydration and inversion rate of the polyacrylamide, but exacerbates the powder's absorption of moisture.

The polymer particles may have sizes or particle size distributions between about 500 microns and about 20 micron or between mesh 35 and mesh 635. In other embodiments, the sizes or particle size distributions are between about 400 microns and about 40 micron or between mesh and mesh 400. In other embodiments, the sizes or particle size distributions are between about 300 microns and about 50 micron or between mesh 50 and mesh 400.

| US Mesh Size | Microns | Inches | Millimeters |
|---|---|---|---|
| 35 | 500 | 0.0197 | 0.5 |
| 40 | 400 | 0.0165 | 0.4 |
| 45 | 354 | 0.0138 | 0.354 |
| 50 | 297 | 0.0117 | 0.297 |
| 60 | 250 | 0.0098 | 0.25 |
| 70 | 210 | 0.0083 | 0.21 |
| 80 | 177 | 0.007 | 0.177 |
| 100 | 149 | 0.0059 | 0.149 |
| 120 | 125 | 0.0049 | 0.125 |
| 140 | 105 | 0.0041 | 0.105 |
| 170 | 88 | 0.0035 | 0.088 |
| 200 | 74 | 0.0029 | 0.074 |
| 230 | 63 | 0.0025 | 0.063 |
| 270 | 53 | 0.0021 | 0.053 |
| 325 | 44 | 0.0017 | 0.044 |
| 400 | 37 | 0.0015 | 0.037 |
| 450 | 32 | 0.0013 | 0.032 |
| 500 | 25 | 0.001 | 0.025 |
| 635 | 20 | 0.0008 | 0.002 |

Suitable proppants for use in this disclosure include, without limitation, particulate metal oxides, particulate ceramics, particulate natural solids such as sand, particulate synthetic solids, particulate metals, particulate plastics, particulate polymers, particulate plant materials, any other solid material that may find use in downhole fluids or mixtures and combinations thereof. Metal oxides include, without limitation, any solid oxide of a metallic element of the periodic table of elements. Exemplary examples of metal oxides and ceramics include actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, ceramic structures prepared from one or more of these oxides and mixed metal oxides including two or more of the above listed metal oxides. Exemplary examples of plant materials include, without limitation, shells of seed bearing plants such as walnut shells, pecan shells, peanut shells, shells for other hard shelled seed forming plants, ground wood or other fibrous cellulosic materials, or mixtures or combinations thereof.

EXPERIMENTS OF THE DISCLOSURE

Example 1

This example illustrates the preparation of 110K TDS synthetic brine.

The 110K TDS synthetic brine was prepared by adding sodium chloride and calcium chloride to water resulting in 33418.80 ppm of $Na^+$, 9,023.40 ppm of $Ca^{2+}$, and 67,557.79 ppm of $Cl^-$.

Example 2

This example illustrates the preparation of 110K TDS synthetic brine.

The 250K TDS synthetic brine was prepared by adding sodium chloride, calcium chloride, and magnesium chloride to water resulting in 70769.23 ppm of $Na^+$, 19851.49 ppm of $Ca^{2+}$, 3824.76 ppm of $Mg^{2+}$, and 155554.52 ppm of $Cl^-$.

Example 3

This example illustrates the preparation of Fluid A1, Fluid B1, and Fluid C1 and drag reduction testing of the three fluids.

Fluid A1 was prepared by adding 0.25 gpt of POLYgluide Xcel-800, an anionic product available from PfP Industries to tap water.

Fluid B1 was prepared by adding 0.25 gpt POLYglide ProCharge-200, a cationic PAM product available from PfP Industries to tap water.

Fluid C1 was prepared by adding 0.25 gpt of POLYgluide Xcel-200 Plus, a 1:1 mixture of an anionic PAM and a cationic PAM product available from PfP Industries to tap water.

The three fluids were then tested for. Percent drag reduction (% Drag Reduction) as used here is the reduction in drag compared to water. For example, if the % Drag Reduction is 0.75, the value means that the additive reduced the friction pressure by 75% as compared to water without the additive pumped at the same flow rate. The results of the testing are shown in FIG. 1, showing that the Fluid A1 and Fluid B1 had similar % Drag Reduction, while Fluid C1 had a significantly lower % Drag Reduction and a different time dependent profile.

Example 4

This example illustrates the preparation of Fluid A2, Fluid B2, and Fluid C2 and drag reduction testing of the three fluids.

Fluid A2 was prepared by adding 0.25 gpt of POLYgluide Xcel-800, anionic product available from PP Industries to a 2 wt. % KCl brine.

Fluid B2 was prepared by adding 0.25 gpt POLYglide ProCharge-200, a cationic PAM product available from PP Industries to a 2 wt. % KCl brine.

Fluid C2 was prepared by adding 0.25 gpt of POLYgluide Xcel-200 Plus, a 1:1 mixture of an anionic PAM and a cationic PAM product available from PP Industries to a 2 wt. % KCl brine.

Figure 2:
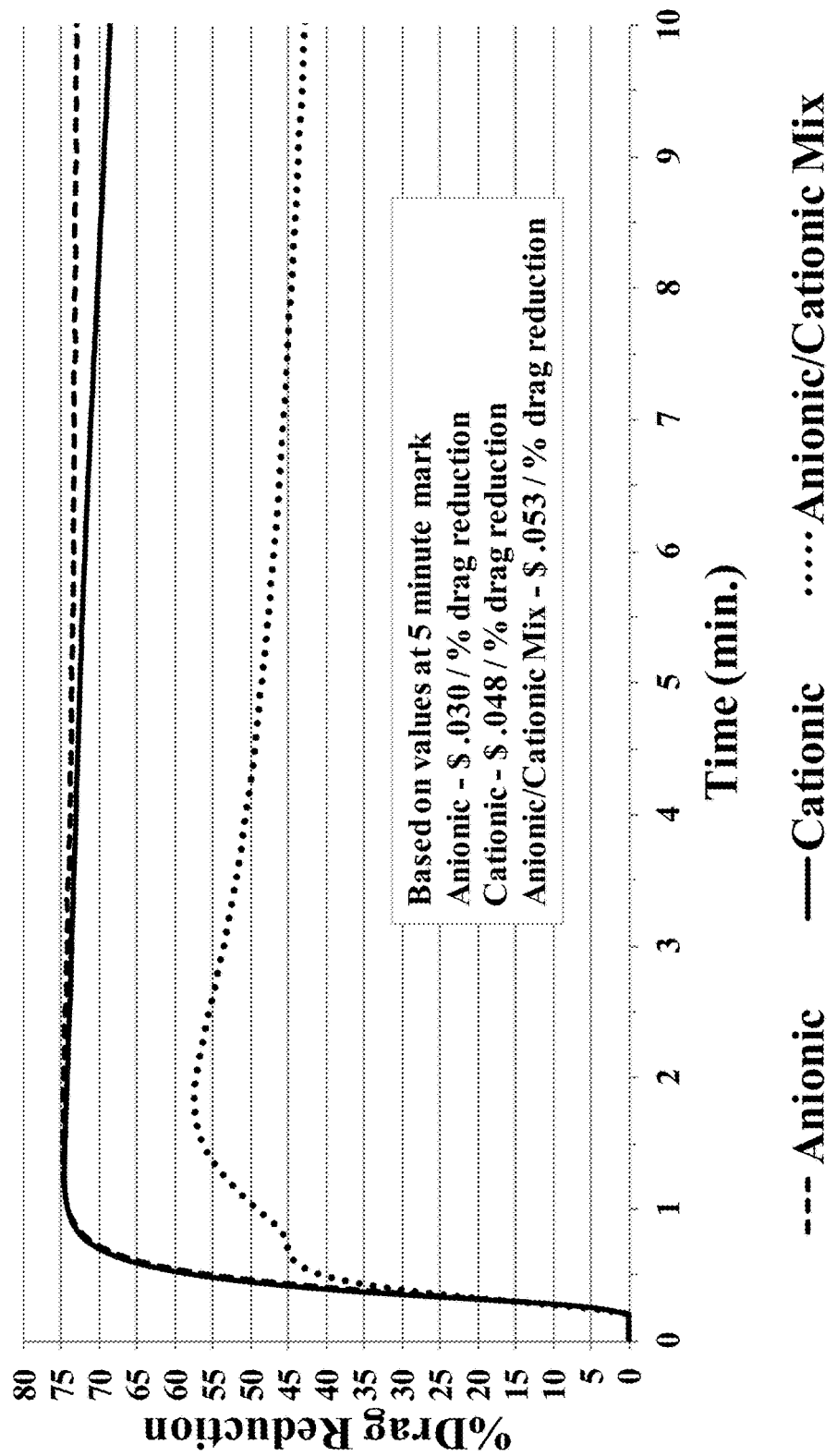
FIG. 2 depicts a plot comparing % Drag Reduction versus time for 0.25 gpt of three fluids: Fluid A, Fluid B and Fluid C in 2 wt. % KCl brine.

The three fluids were then tested for % drag reduction. The results of the testing is shown in FIG. 2, showing that the Fluid A2 and Fluid B2 had similar % Drag Reduction, while Fluid C2 had a little lower % Drag Reduction and again, a different time dependent profile. Fluid A2 had the lowest cost, while Fluid C2 has the highest cost, with Fluid B2 in the middle.

Example 5

This example illustrates the preparation of Fluid A3, Fluid B3, and Fluid C3 and drag reduction testing of the three fluids.

Fluid A3 was prepared by adding 0.25 gpt of POLYgluide Xcel-800, anionic product available from PfP Industries to a 55K ppm TDS synthetic brine.

Fluid B3 was prepared by adding 0.25 gpt POLYglide ProCharge-200, a cationic PAM product available from PfP Industries to a 55K ppm TDS synthetic brine.

Fluid C3 was prepared by adding 0.25 gpt of POLYgluide Xcel-200 Plus, a 1:1 mixture of an anionic PAM and a cationic PAM product available from PfP Industries to a 55K ppm TDS synthetic brine.

Figure 3:
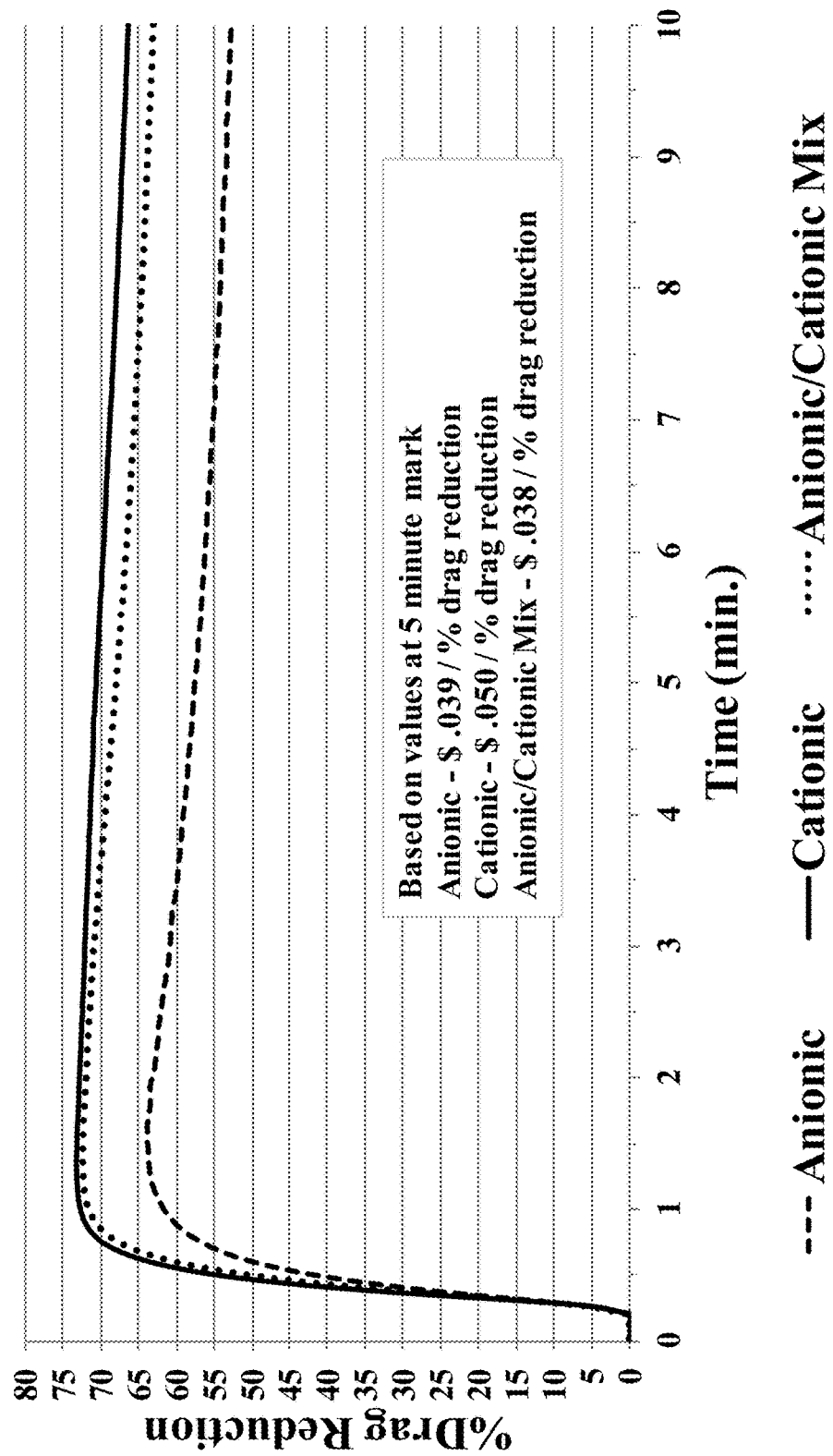
FIG. 3 depicts a plot comparing % Drag Reduction versus time for 0.25 gpt of three fluids: Fluid A, Fluid B and Fluid C in a 55K ppm TDS synthetic brine.

The three fluids were then tested for % drag reduction. The results of the testing are shown in FIG. 3, showing that the Fluid B3 and Fluid C3 had similar % Drag Reduction, while Fluid A3 had a lower % Drag Reduction. All three fluids has similar % Drag Reduction profiles. Unlike the results of Example 5, Fluid C3 had a slightly lower cost than Fluid A3, both lower than Fluid B3. Thus, as the total solids increase in the water, Fluid C3, the mixture of anionic and cationic polymers, becomes economically more attractive with % Drag Reduction very similar to Fluid B3, the cation anionic polymer slurry.

Example 6

This example illustrates the preparation of Fluid A4, Fluid B4, and Fluid C4 and drag reduction testing of the three fluids.

Fluid A4 was prepared by adding 0.25 gpt of POLYgluide Xcel-800, anionic product available from PfP Industries to a 110K ppm TDS synthetic brine.

Fluid B4 was prepared by adding 0.25 gpt POLYglide ProCharge-200, a cationic PAM product available from PfP Industries to a 110K ppm TDS synthetic brine.

Fluid C4 was prepared by adding 0.25 gpt of POLYgluide Xcel-200 Plus, a 1:1 mixture of an anionic PAM and a cationic PAM product available from PfP Industries to a 110K ppm TDS synthetic brine.

Figure 4:
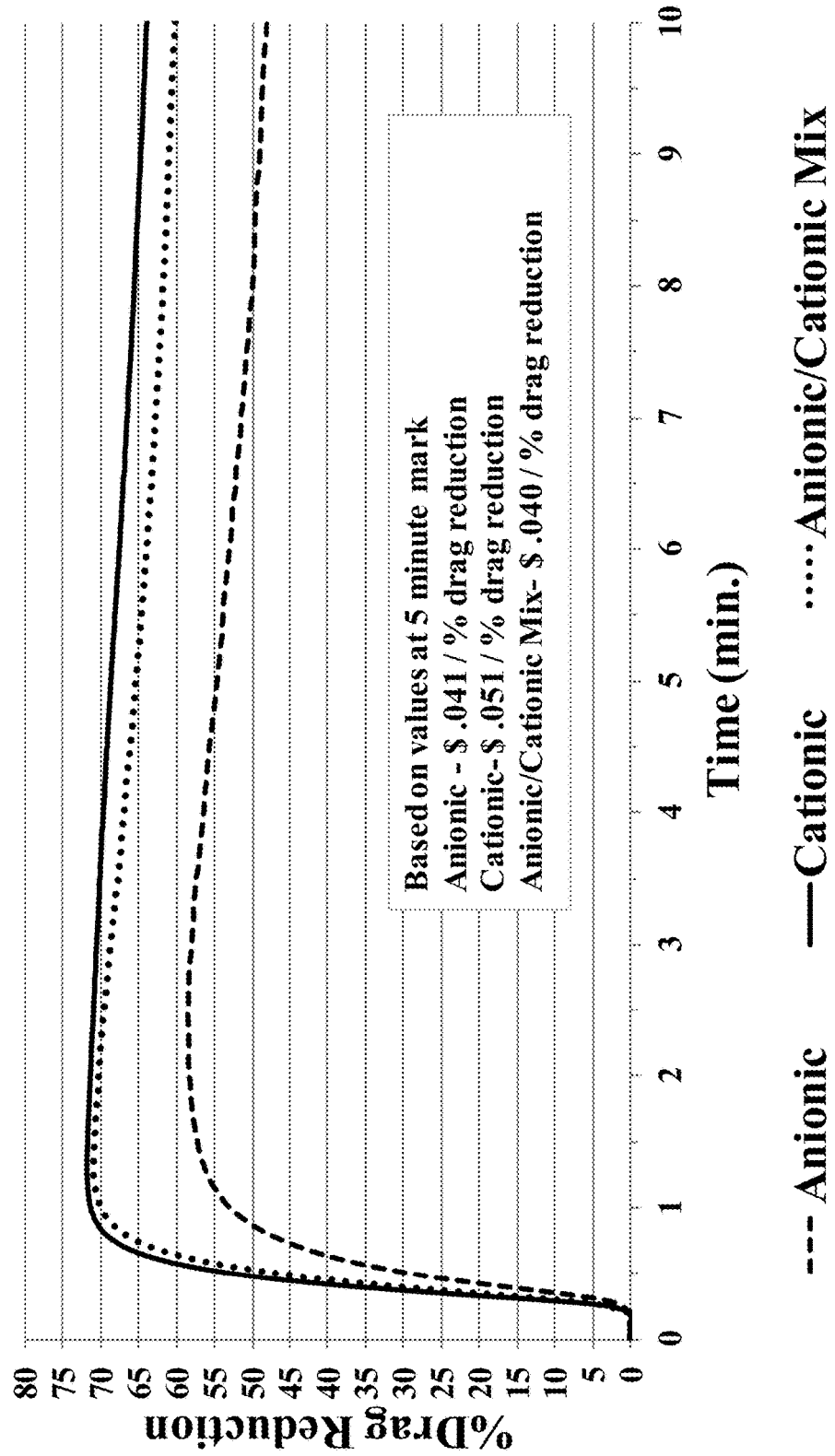
FIG. 4 depicts a plot comparing % Drag Reduction versus time for 0.25 gpt of three fluids: Fluid A, Fluid B and Fluid C in a 110K ppm TDS synthetic brine.

The three fluids were then tested for % drag reduction. The results of the testing are shown in FIG. 4, showing that the Fluid B4 and Fluid C4 had similar % Drag Reduction, while Fluid A4 had a lower % Drag Reduction. All three fluids has similar % Drag Reduction profiles. Unlike the results of Example 5, Fluid C4 had a slightly lower cost than Fluid A4, both lower than Fluid B4. Thus, in a 110K ppm TDS brine, Fluid C4, the mixture of anionic and cationic polymers, is economically more attractive with a % Drag Reduction very similar to Fluid B4, the cation anionic polymer slurry.

Example 7

This example illustrates the preparation of Fluid A5, Fluid B5, and Fluid C5 and drag reduction testing of the three fluids.

Fluid A5 was prepared by adding 0.50 gpt of POLYgluide Xce1-800, anionic product available from PfP Industries to a 250K ppm TDS synthetic brine.

Fluid B5 was prepared by adding 0.50 gpt POLYgluide ProCharge-200, a cationic PAM product available from NP Industries to a 250K ppm TDS synthetic brine.

Fluid C5 was prepared by adding 0.50 gpt of POLYgluide Xcel-200 Plus, a 1:1 mixture of an anionic PAM and a cationic PAM product available from PfP Industries to a 250K ppm TDS synthetic brine.

Figure 5:
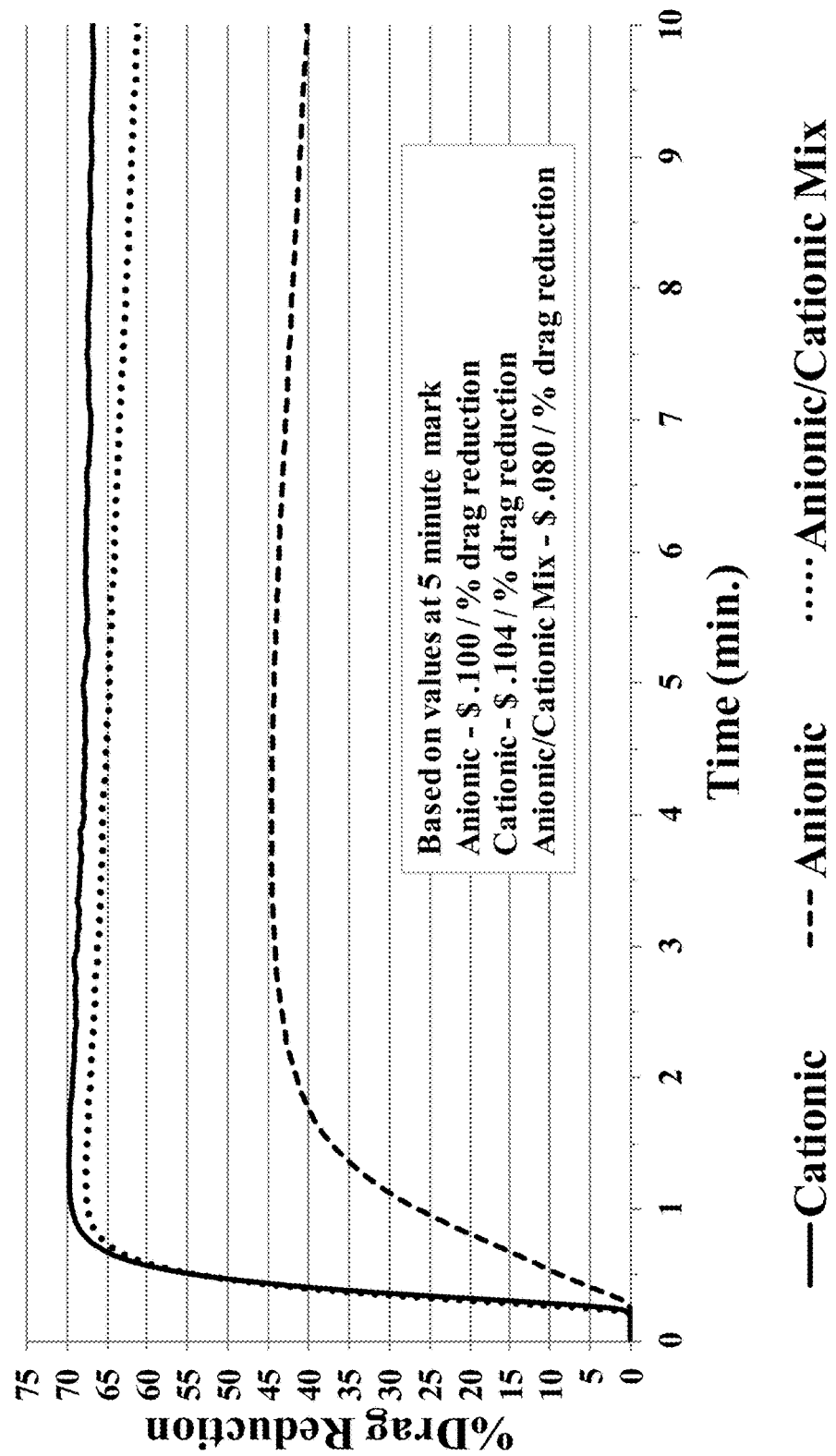
FIG. 5 depicts a plot comparing % Drag Reduction versus time for 0.50 gpt of three fluids: Fluid A, Fluid B and Fluid C in a 250K ppm TDS synthetic brine.

The three fluids were then tested for % drag reduction. The results of the testing are shown in FIG. 5, showing that the Fluid B5 and Fluid C5 had similar % Drag Reduction, while Fluid A5 had a significantly lower % Drag Reduction. Unlike the results of the other Examples, Fluid C5 had a significant lower cost than either Fluid A5 or Fluid B5. Thus, in a 250K ppm TDS brine, Fluid C5, the mixture of anionic and cationic polymers, is economically much more attractive with a % Drag Reduction very similar to Fluid B5, the cation anionic polymer slurry.

Example 8

This example illustrates the preparation of four fluids containing four different PAM slurries and drag reduction testing of four fluids.

Fluid D was prepared by adding 0.25 gpt of POLYgluide Xcel-800, anionic PAM slurry product available from NP Industries to a 110K ppm TDS synthetic brine.

Fluid E was prepared by adding 0.25 gpt an AMPS (2-Acrylamido-2-methylpropane sulfonic acid) PAM slurry product available from PfP Industries to a 110K ppm TDS synthetic brine.

Fluid F was prepared by adding 0.25 gpt of a 1:1 mixtures of POLYgluide Xcel-800 and an AMPS PAM slurry product available from PfP Industries to a 110K ppm TDS synthetic brine.

Fluid G was prepared by adding 0.25 gpt of POLYgluide Xcel-200 Plus, a 1:1 mixture of an anionic PAM and a cationic PAM slurry product available from PfP Industries to a 110K ppm TDS synthetic brine.

Figure 6:
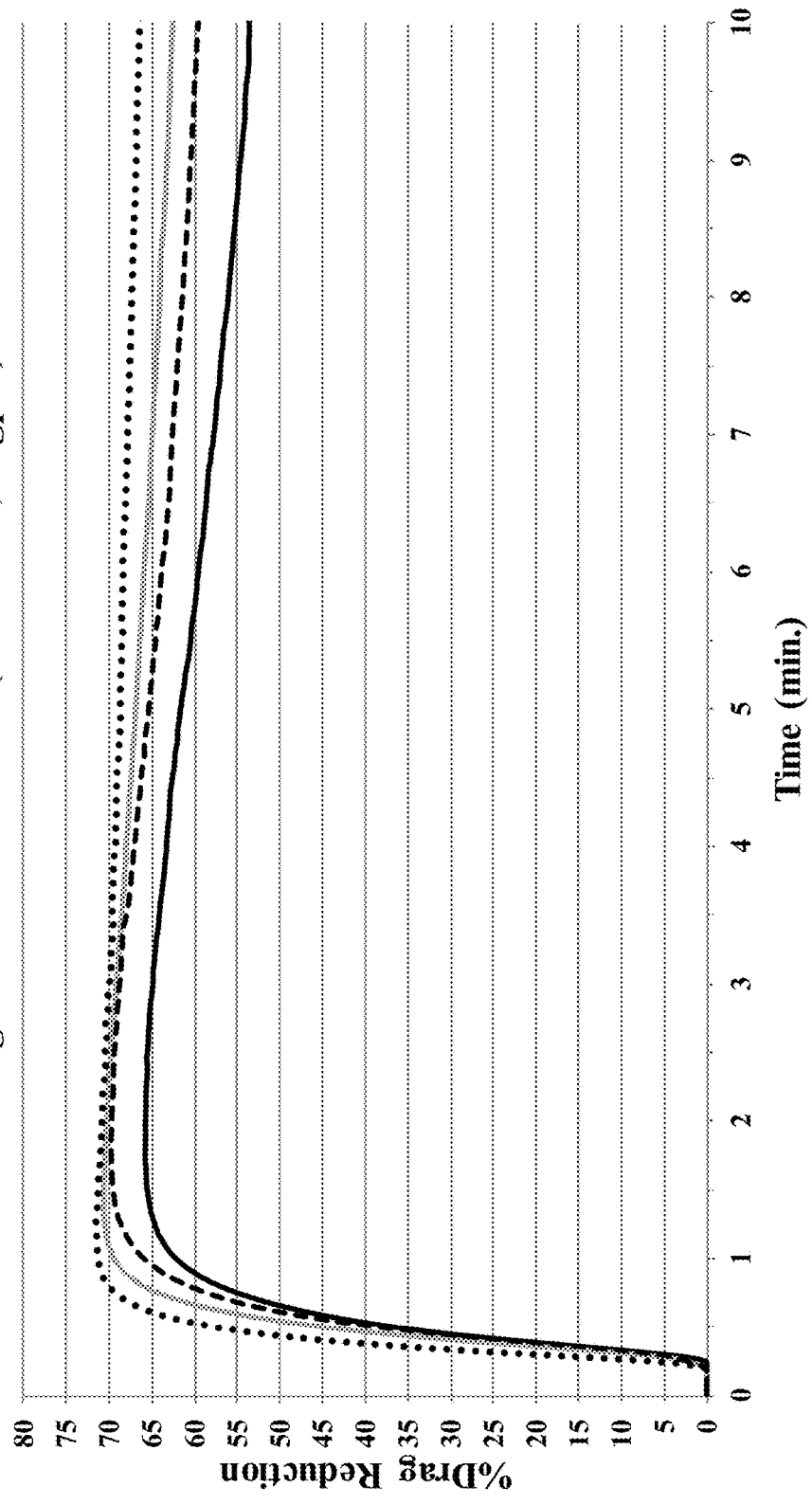
FIG. 6 depicts a plot comparing % Drag Reduction versus time for 0.25 gpt of four fluids: Fluid D, Fluid E, Fluid F, and Fluid G in a 110K ppm TDS synthetic brine.

The four fluids were then tested for % drag reduction. The results of the testing are shown in FIG. 6. Fluid G showed superior % Drag Reduction compared any of the other fluids. Of interest, is the fact that Fluid F, the 1:1 mixture of anionic and AMPS PAM slurry, showed lower % Drag Reduction compared to Fluid E, the AMPS PAM slurry, and better % Drag Reduction compared to Fluid D, the anionic PAM slurry.

Example 9

This example illustrates a comparison of the percent drag reduction for four fluids including 1 ppt of four dry cationic polymers having different percentages of charged residues in the polymers in a 110K ppm TDS synthetic brine.

The first fluid included 1 ppt of a PAM polymer including 0-5% charged residues available from PfP Industries added as a dry powder to the 110K ppm TDS synthetic brine.

The second fluid included 1 ppt of a PAM polymer including 15-20% charged residues available from PfP Industries added as a dry powder to the 110K ppm TDS synthetic brine.

The third fluid included 1 ppt of a PAM polymer including 32-35% charged residues available from NP Industries added as a dry powder to the 110K ppm TDS synthetic brine.

The fourth fluid included 1 ppt of a PAM polymer including 53-58% charged residues available from PfP Industries added as a dry powder to the 110K ppm TDS synthetic brine.

Figure 7:
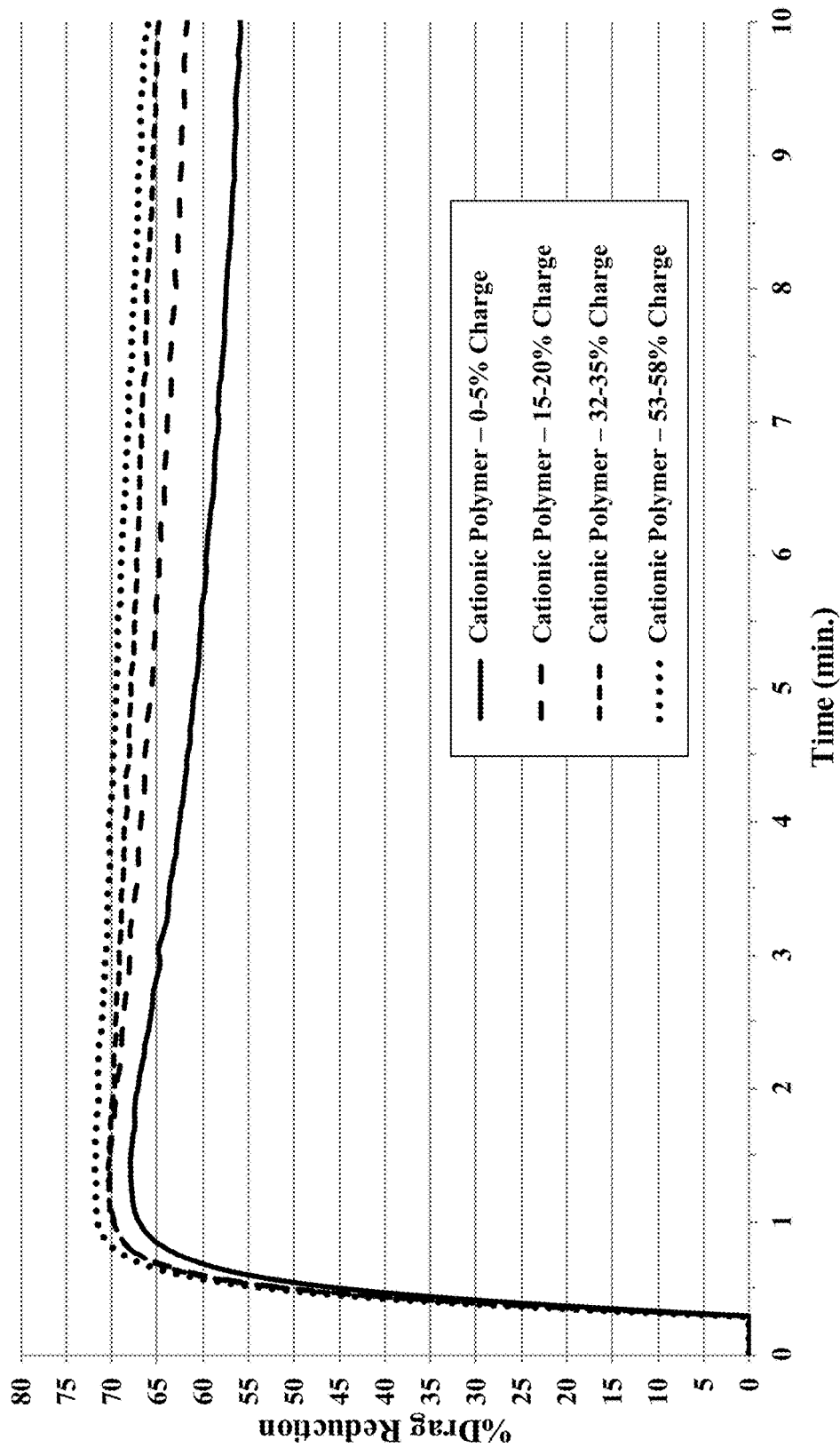
FIG. 7 depicts a plot comparing % Drag Reduction versus time for four fluids including 1.0 ppt of dry powdered cationic PAM polymers with different number of charged residues in a 110K ppm TDS synthetic brine.

The four fluids were then tested for % drag reduction. The results of the testing are shown in FIG. 7. The results indicated that as the percent of charged residues in the PAM polymers increased, the percent drag reduction increased. As shown above, as the percent of charged residues in the cationic PAM polymers increased, the cost per percent drag reduction also increased. Thus, by blending an amount of anionic PAM polymer with the cationic PAM polymer, regardless of the percent of charged residues in the cationic PAM polymer, fluids may be prepared that have similar % drag reduction compared to fluids including only the same cationic PAM polymers at an equivalent amount.

Example 10

This example illustrates a comparison of the hydration viscosities and relative cost per cP of gpt of three fluids in a 110K ppm TDS synthetic brine: Fluid A6, Fluid B6, and Fluid C6.

Fluid A6 was prepared by adding 10 gpt of POLYgluide Xcel-800 containing slurry, an anionic slurry product available from PfP Industries, to the 110K ppm TDS synthetic brine.

Fluid B6 was prepared by adding 10 gpt POLYglide ProCharge-200 containing slurry, a cationic PAM product available from PfP Industries, to the 110K ppm TDS synthetic brine.

Fluid C6 was prepared by adding 10 gpt of POLYgluide Xcel-200 Plus containing slurry, a 1:1 mixture of an anionic PAM and a cationic PAM product available from PfP Industries, to the 110K ppm TDS synthetic brine.

Figure 8:
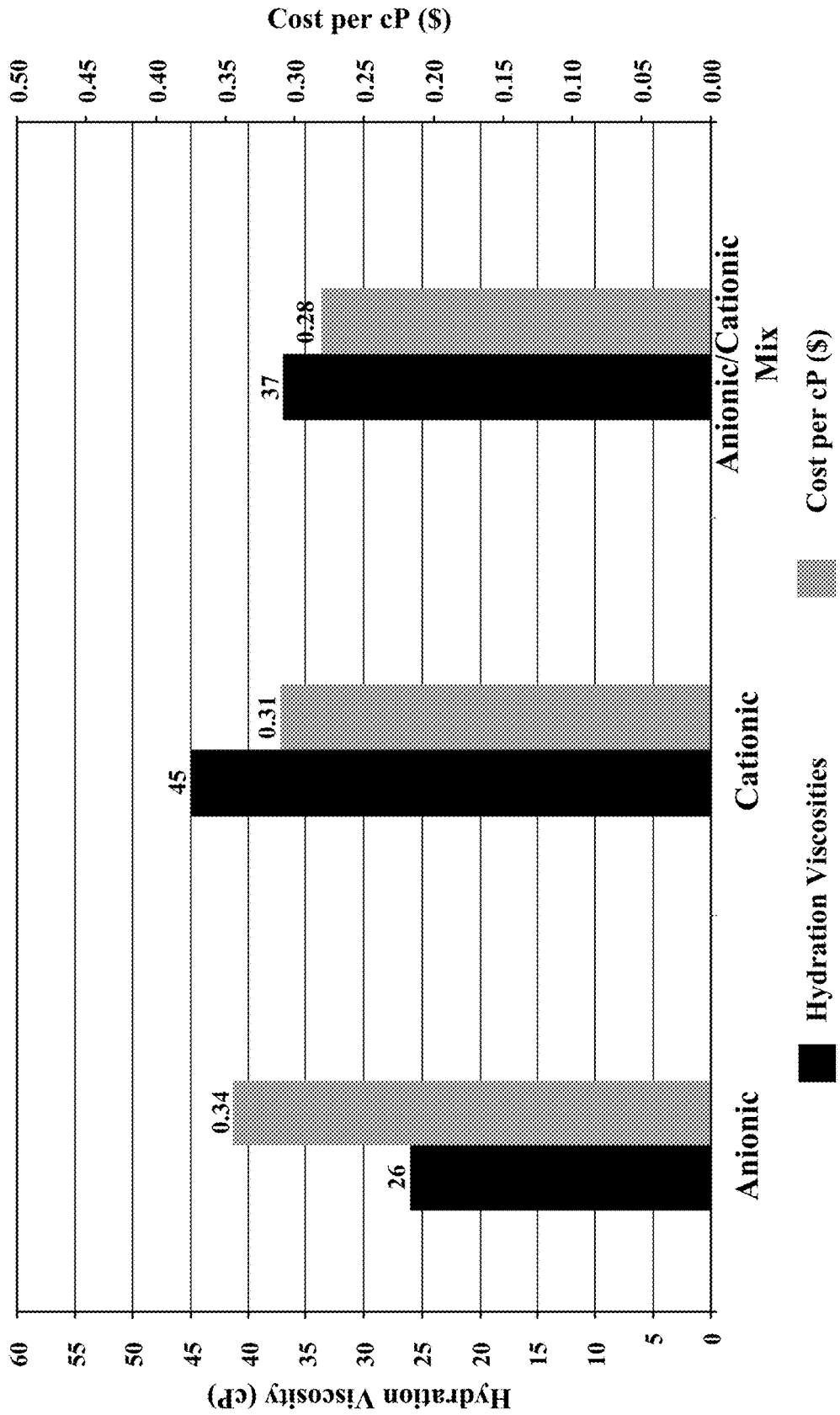
FIG. 8 depicts a plot of Brookfield hydration viscosities (cP) spindle #1 @ 60 R for Fluid A, Fluid B, and Fluid C @ 10 gpt in a 110K ppm TDS synthetic brine.

The three fluids were then tested for hydration viscosities and cost per cP. The results of the testing are shown in FIG. 8. Fluid A6 had the lowest hydration viscosity and the highest cost per cP. Fluid B6 had the highest hydration viscosity and lowest cost per cP. Fluid C6 had an intermediate hydration viscosity and just a slight higher cost per cP.

Example 11

This example illustrates a comparison of the hydration viscosities and relative cost per cP of gpt of three fluids in a 250K ppm TDS synthetic brine: Fluid A, Fluid B, and Fluid C.

Fluid A7 was prepared by adding 10 gpt of POLYgluide Xcel-800 containing slurry, an anionic slurry product available from PfP Industries, to the 250K ppm TDS synthetic brine.

Fluid B7 was prepared by adding 10 gpt POLYglide ProCharge-200 containing slurry, a cationic PAM product available from PfP Industries, to the 250K ppm TDS synthetic brine.

Figure 9:
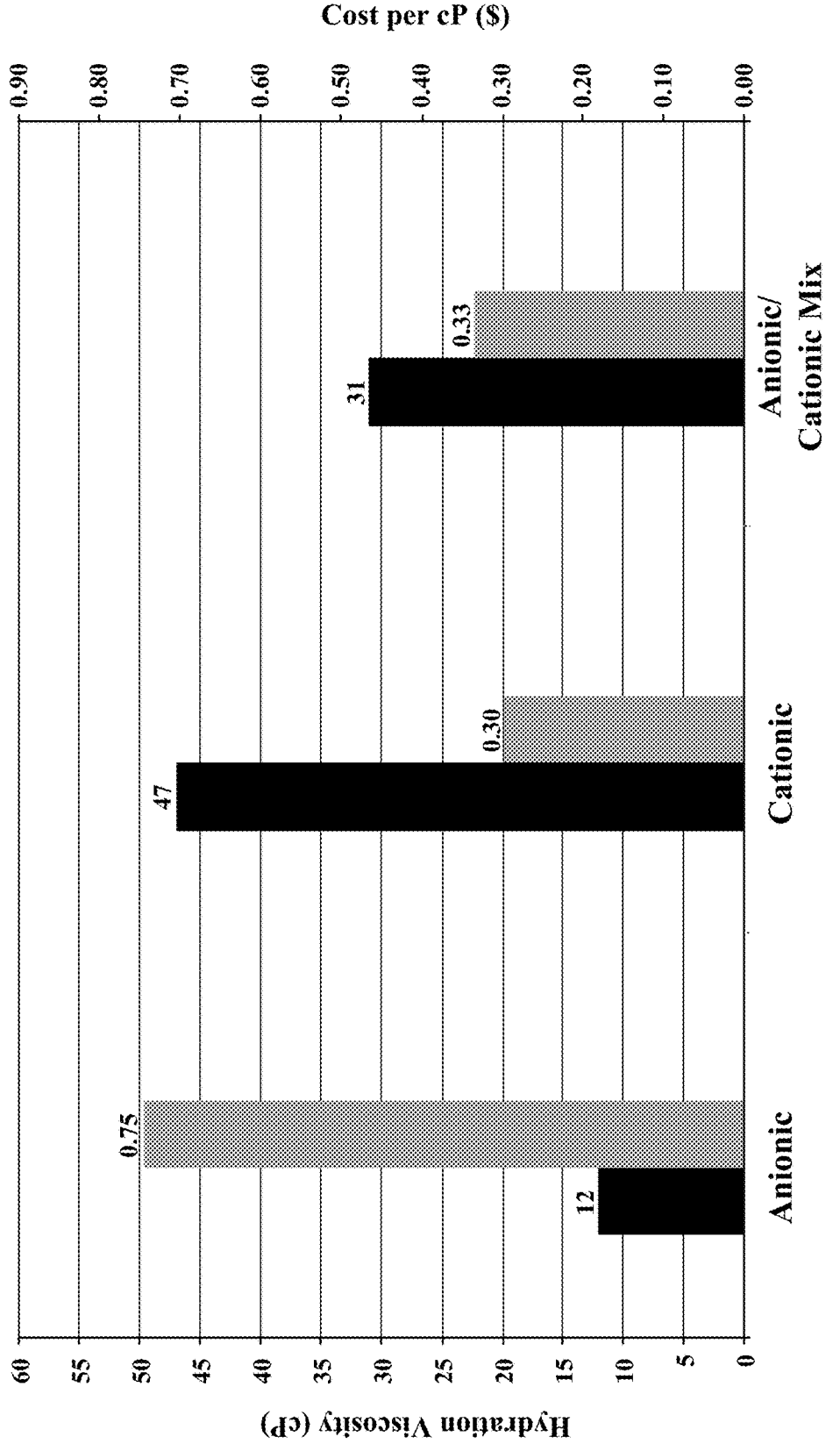
FIG. 9 depicts a plot of Brookfield hydration viscosities (cP) spindle #1 @ 60 R for Fluid A, Fluid B, and Fluid C @ 10 gpt in a 250K ppm TDS synthetic brine.

Fluid C7 was prepared by adding 10 gpt of POLYgluide Xcel-200 Plus containing slurry, a 1:1 mixture of an anionic PAM and a cationic PAM product available from PfP Industries, to the 250K ppm TDS synthetic brine.

were then tested for hydration viscosities and cost per cP. The results of the testing are shown in FIG. 9. Fluid A7 had the lowest hydration viscosity and the highest cost per cP. Fluid B7 had the highest hydration viscosity and lowest cost per cP. Fluid C7 had an intermediate hydration viscosity and just a slight higher cost per cP.

Example 12

This example illustrates the hydration of 0.5 gpt POLYgluide Xcel-200 PLUS slurries in different KCl brines.

Brine Preparation

The required amount of potassium chloride (KCl) salt was weighed into a plastic cup and added to fresh water (Katy laboratory water) with stirring using an overhead stirrer at 700 rpm to dissolve the KCl to form 0 wt. %, 1.0 wt %, 1.5 wt. %, 2.0 wt. %, 3.0 wt. %, 4.0 wt. %, and 5.0 wt. % KCl brines.

Hydration Procedure 0.5 gpt of POLYgluide Xcel 200 PLUS slurry was injected into each of the KCl brines using a syringe and the resulting fluid was stirred at the same rpm for 3 minutes.

As potassium chloride concentration increased from 1.0 wt. % to 5 wt. %, the slurries hydrated to form a clear solution. In 1.0 wt. % KCl to 1.5 wt. % KCl brines, chunks or precipitates were still present as compared to 2.0 wt. % to 5 wt. % KCl brines, which gave clear solutions.

Conclusions

POLYgluide Xcel 200 PLUS slurries hydrated better in 2.0 wt. % KCl to 5 wt. % of KCl brines.

Example 13

This example illustrates the hydration of 0.5 gpt POLYgluide Xcel 200 PLUS slurries in 55K and diluted 55K brines.

Brine Preparation 159.6 g of sodium chloride, 38.0 g of anhydrous calcium chloride, and 24.3 g of magnesium chloride hexahydrate were dissolved in 1 gallon of fresh water to form a 55K brine. The 55K ppm TDS brine was diluted by mixing with fresh water in following ratios: 1:1, 1:2, 1:3 and 3:1 to form diluted 55K ppm TDS brines.

Hydration Procedure 200.0 mL of the 55K ppm TDS brine was transferred to a plastic cup. The brine solution was stirred using overhead stirrer at 700 rpm. 0.5 gpt of POLYgluide Xcel 200 PLUS slurry were injected into the 55K ppm TDS brine using a syringe and stirred or sheared at same rpm for 3 minutes.

Repeat above procedure for the diluted 55K ppm TDS brines.

The 55K ppm TDS brine and the diluted 55K ppm TDS brines show hydration of slurry with no noticeable chunks or precipitates like the higher KCl concentration brines. Stirring at bottom of cup shows polymer, which dissolve easily with stirring.

Conclusions

POLYgluide Xcel 200 PLUS slurries hydrated easily in 55K brine and diluted 55K brines.

Example 14

This example illustrates the hydration of 0.5 gpt POLYgluide Xcel 200 PLUS slurries in 3600 ppm Ca brine, a 1800 ppm Ca brine, and 2700 ppm Ca brine.

Brine Preparation 9.5 g anhydrous calcium chloride was dissolved in 946 mL of fresh water and dissolved with stirring using overhead stirrer to form a 3600 ppm Ca brine. The 3600 ppm Ca brine was diluted with water to form the 1800 ppm Ca brine and the 2700 ppm Ca brine.

Hydration Procedure 200.0 mL of 3600 ppm Ca brine was transferred to a plastic cup, and 3600 ppm Ca brine stirred using overhead stirrer at 700 rpm. 0.5 gpt of a POLYgluide Xcel 200 PLUS slurry was injected into the 3600 ppm Ca brine using a syringe and stirred or sheared at same rpm for 3 minutes. The procedure was repeated for the 1800 ppm Ca brine and the 2700 ppm Ca brine.

Conclusions

With decreased calcium chloride concentration from 3600 ppm to 1800 ppm, hydration of POLYgluide Xcel 200 PLUS slurry decreased slightly as evidenced by a precipitate or chunks of the slurry. The POLYgluide Xcel 200 PLUS slurry dissolves easily in brines with higher concentration of divalent cations compared to lower concentration (3600 ppm Ca brine v. 1800 ppm Ca brine).

Example 15

This example illustrates the hydration of 0.5 gpt of POLYgluide Xcel 200 PLUS slurries in a 2 wt. % potassium chloride brine and a 2 wt. % sodium chloride brine.

The POLYgluide Xcel 200 PLUS slurries were hydrated according to the procedure of EXAMPLE 6.

Slurry hydration in the 2 wt. % potassium chloride brine resulted in a cloudy fluid, while slurry hydration in the 2 wt. % sodium chloride brined resulted in no slurry chunks or slurry precipitate.

Conclusions

The POLYgluide Xcel 200 PLUS slurries hydrated better in the 2 wt. % sodium chloride brine compared to the 2 wt. % potassium chloride brine.

Example 16

This example illustrates the hydration of 0.5 gpt of POLYgluide Xcel 200 PLUS slurries in a 1 wt. % KCl brine using overhead stirring compared to using a Waring blender.

Slurry Hydration Using Overhead Stirrer

Slurry hydration studies were carried out using overhead stirring according to the procedure of EXAMPLE 6.

Slurry Hydration Using Warring Blender 250 mL of fresh water was transferred into Warring blender. 2.5 g KCl was added and the resulting solution stirred at 1500 rpm to dissolve the KCl. 0.125 mL of a POLYgluide Xcel 200 PLUS slurry was added to the brine using a syringe and the fluid was stirred at same rpm for 10 seconds. The solution was then sheared at 4500 rpm for 5 minutes.

Conclusions

High shear with Waring blender help to break up slurry with minimal hydration. Hydration using overhead stirring resulted in a clear solution with some slurry chunks or precipitate compared to mixing in the Warring blender, which showed no slurry precipitate, but was cloudy.

Conductivity and Permeability Testing Procedure

Samples of Fluid A8, Fluid B8, and Fluid C8 were tested in a Prop Tester, Inc. laboratory conductivity and permeability tester. Regain conductivity tested the effects of fracturing fluid conductivity through an apparatus including two cells comprising a proppant pack disposed between two Ohio Sandstone wafers under elevated pressure and temperature. The tests were performed at a temperature of 180° F. in a 2 wt. % KCl brine with the cells loaded at 2 lb/ft$^2$ of proppant between Ohio Sandstone cores wafers American Petroleum Institute, API Recommended Practice 19D "Procedures for measuring the long term conductivity of proppants" was used to obtain baseline values. Standard base line testing is 50 hours at each stress level starting at a pressure of 2,000 psi.

The samples tested included 30/50 baseline, Fluid A8, Fluid B8, and Fluid C8. Fluid A8 was prepared by adding 4 gpt of POLYglide Xcel-200 Plus to the 2 wt. % KCl brine. Fluid B8 was prepared by adding 4pgt of POLYglide Xcel-800 Plus to the 2 wt. % KCl brine. Fluid C8 was prepared by adding 4gpt POLYglide ProCharge-200 to the 2 wt. % KCl brine.

The following procedure was used for conductivity and permeability of the 30/50 baseline, Fluid A8, Fluid B8, and Fluid C8:

1. A pre-sieve analysis was performed using the ISO 13503-2:2006/API RP-19C "Measurements of proppants used in hydraulic fracturing and gravel pack operations." Standard US Mesh screens were used to separate the samples by size. Based on the recommended sieve stack for a given proppant size, not more than 0.1% should be greater than the first specified sieve and not more than 1% should be retained in the pan. There should be at least 90% retained between the specified screens.
2. Zero width of the proppant pack was determined by assembling the conductivity cell with shims and without the proppant sample. The distance between the width bars that are attached to each end of the conductivity cell were measured at each of the four corners and recorded. The cells were then disassembled and reassembled with the proppant samples. The measurements were made again at the beginning and ending of each stress period. Width was determined by subtracting the average of the zero width from the average of each of the width values measured at each stress loading.
3. Conductivity cells were loaded with the specified proppant with 2.0 lb/ft2 loading between Ohio Sandstone Cores. One cell will remain the baseline for the test, while the other three cells will have fluid system injected into each. The stack was then loaded onto the press and the closure stress was increased to 500 psi and vacuum saturated to remove any air from the system.
4. A 2,000 psi closure stress was applied across a test unit for 12-24 hours at temperature to allow the proppant sample bed to reach a semi-steady state condition.
5. The 25 pore volumes of fluid was injected through the proppant pack with the leak-off ports closed at 2,000 psi, allowing the fluid to concentrate on the Ohio Sandstone cores. The cells were shut-in for a 24 hours. The fluid was allowed to break with a 400-psi back pressure maintained with 2% KCl.
6. After the shut-in period was complete, the cells were opened and fluid flow began at 0.5 ml/min. During this period the maximum differential pressure to initiate flow was measured and recorded. The fluid rate was then returned to 2 mL/min for the duration of the test.
7. the fluid was forced through the proppant pack, the pack width, differential pressure, temperature, and flow rates were measured and recorded at each stress. Proppant pack permeability and conductivity were then calculated. This serves as the 0 hour Regain reading. Readings after the 0 hour were taken at the 24 hour mark and the 50 hour mark. Percent regain was calculated by comparing the baseline permeability with the fluid sample permeability.
8. Multiple flow rates were used to verify the performance of the transducers and to determine Darcy flow regime at each stress; an average of the data at these flow rates was reported. The test fluid was a KCl substitute solution and it was filtered to 3 μm absolute. The initial conductivity, permeability and width was measured and compared to the final conductivity, permeability, and width after each stress period. Stress was applied and maintained using an Isco 260D. Stress was applied at 100 psi/minute.
9. Pictures were taken of the proppant sample between the cores and of the proppant sample on top of the cores after the cores have been taken out of the conductivity cell and separated.
10. A post-sieve analysis was performed using the procedure found in ISO 13503-2:2006/APIRP-19C "Measurements of proppants used in hydraulic fracturing and gravel pack operations". Standard US mesh screens are used to separate the samples by size. Based on the recommended sieve stack for a given proppant size, not more than 0.1% should be greater than the first specified sieve and not more than 1% should be retained in the pan. There should be at least 90% retained between the specified screens for an ISO graded proppant.

The conductivity and permeability of the 30/50 baseline, Fluid A8, Fluid B8, and Fluid C8 were measured in a PropTester apparatus which comprises two cells. Each of the cells includes a proppant pack interposed between two Ohio Sandstone core wafers. Each cell also includes a fluid inlet, a fluid outlet, a lower pressure port, a higher pressure port, and a thermocouple. The apparatus is used to measure conductivity and permeability of fluids.

The conductivity and permeability are calculated using a Conductivity Equation (1):

$$kW_f = 26.78\mu Q/(\Delta P) \qquad (1)$$

The conductivity and permeability are calculated using a Premeability Equation (2):

$$k = 321.4\ \mu Q/[(\Delta P)W_f] \qquad (2)$$

In Equation (1) and Equation (2), the terms are defined as follows:
- k is the proppant pack permeability, expressed in Darcy (D);
- kWf is the proppant pack conductivity, expressed in millidarcy-feet (mD-ft);
- μ is the viscosity of the test liquid at test temperature, expressed in centipoises (cP);
- Q is the flow rate, expressed in cubic centimeters per minute;
- ΔP is the differential pressure, expressed in psi; and
- Wf is proppant pack width, expressed in inches.

Example 17

This example illustrates the conductivity and permeability testing of the 30/50 baseline sample.

Figure 10A:
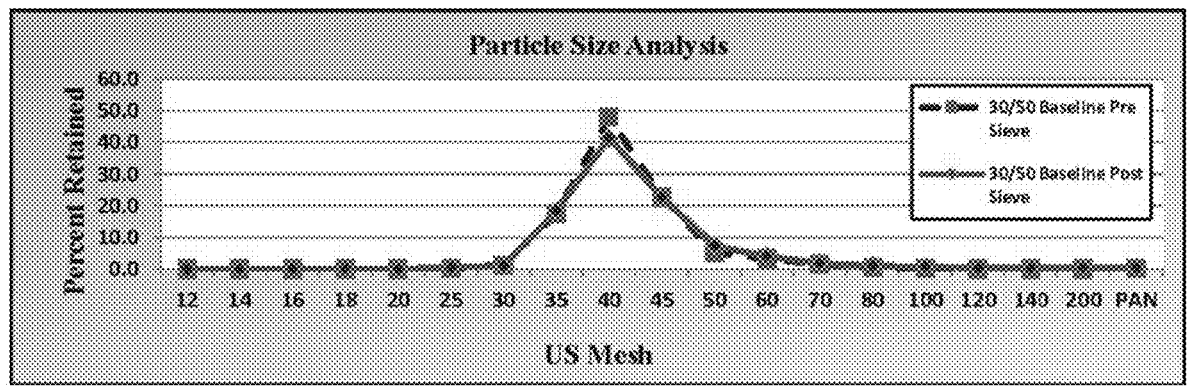
FIG. 10A depicts a plot of particle size distributions of pre-sieved and post sieved 30/50 base fluid proppants.

A proppant sample for use in the 30/50 baseline was prepared by sieving a proppant having a pre-sieving particle size distribution to form a post sieving proppant sample for a post sieving particle size distribution for use in the cell apparatus is shown in Table 5 and FIG. 10A.

TABLE 5

SIEVE ANALYSIS OF 30/50 BASELINE SAMPLE

| Quick Check ✓ (mm) | API mesh size | 30/50 Baseline RP 19C | 30/50 Baseline Pre Sieve | 30/50 Baseline Post Sieve |
|---|---|---|---|---|
| 1.700 | 12 | ≤0.1% | 0.0 | 0.0 |
| 1.400 | 14 | | 0.0 | 0.0 |

TABLE 5-continued

SIEVE ANALYSIS OF 30/50 BASELINE SAMPLE

| (mm) | mesh size | API RP 19C | Pre Sieve | Post Sieve |
|---|---|---|---|---|
| 1.180 | 16 | | 0.0 | 0.0 |
| 1.000 | 18 | | 0.0 | 0.0 |
| 0.850 | 20 | | 0.0 | 0.0 |
| 0.710 | 25 | | 0.1 | 0.5 |
| 0.600 | 30 | | 1.3 | 1.0 |
| 0.500 | 35 | | <u>17.5</u> | <u>18.2</u> |
| 0.425 | 45 | | <u>48.1</u> | <u>41.4</u> |
| 0.355 | 40 | | <u>22.7</u> | <u>22.7</u> |
| 0.300 | 50 | | <u>5.1</u> | <u>7.2</u> |
| 0.250 | 60 | | 3.1 | 4.0 |
| 0.212 | 70 | | 1.5 | 1.7 |
| 0.180 | 80 | | 0.5 | 1.1 |
| 0.150 | 100 | | 0.1 | 0.7 |
| 0.125 | 120 | | 0.0 | 0.3 |
| 0.106 | 140 | | 0.0 | 0.2 |
| 0.075 | 200 | | 0.0 | 0.3 |
| <0.075 | PAN | ≤1.0% | 0.1 | 0.4 |
| Total | | | 100.0 | 100.0 |
| In-size (%) (−30 + 50) sieves | | ≥90% | 93.3 | 89.6 |
| Median Particle Diameter (MPD, mm)/(MPD, inches) | | 0.437 | 0.017 | 0.418 | 0.016 |
| Median Particle Diameter (MPD, mm)/(MPD, inches) | | 0.446 | 0.018 | 0.435 | 0.017 |
| ΔMPD: | | | 0.018 | 8.9% (−50 mesh) | bold ISO designated sieves
<u>bold underline</u> (−30 + 50) sieves

The Zero Pack Width was measured to be 0.255 inches and the bulk density was measured to be 1.49 g/cm³.

Figure 10B:
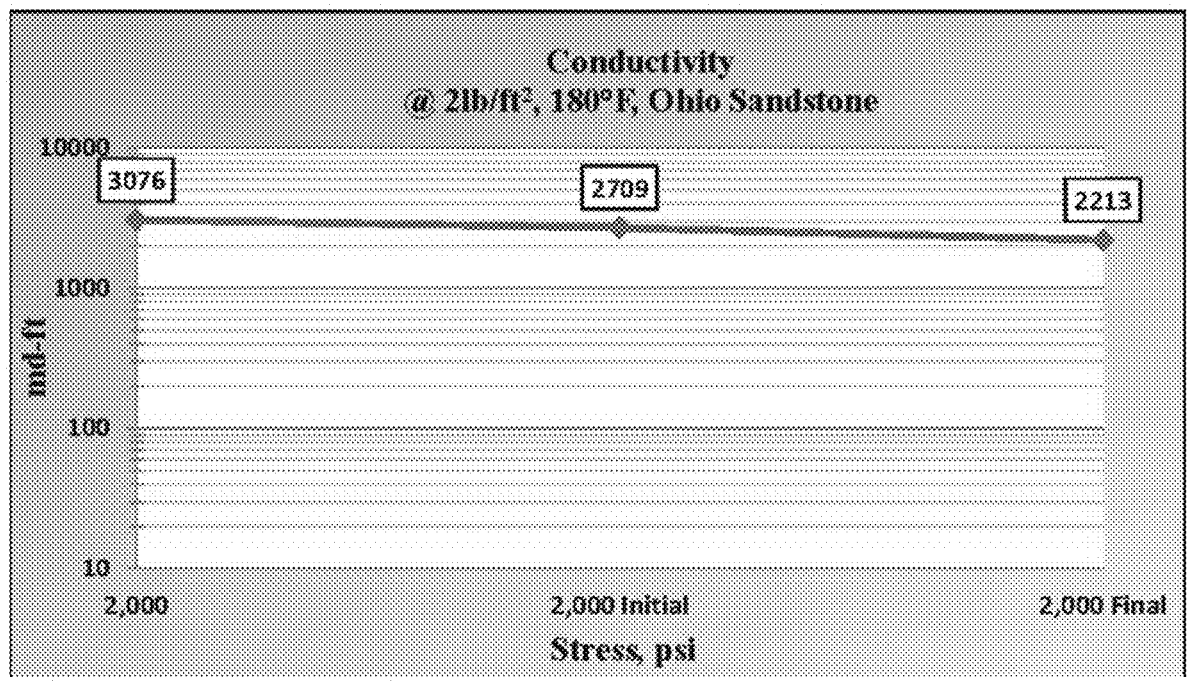
FIG. 10B depicts a plot of conductivity of the 30/50 control fluid through the post sieved proppant packed between two Ohio Sandstone wafer at 180° C.
Figure 10C:
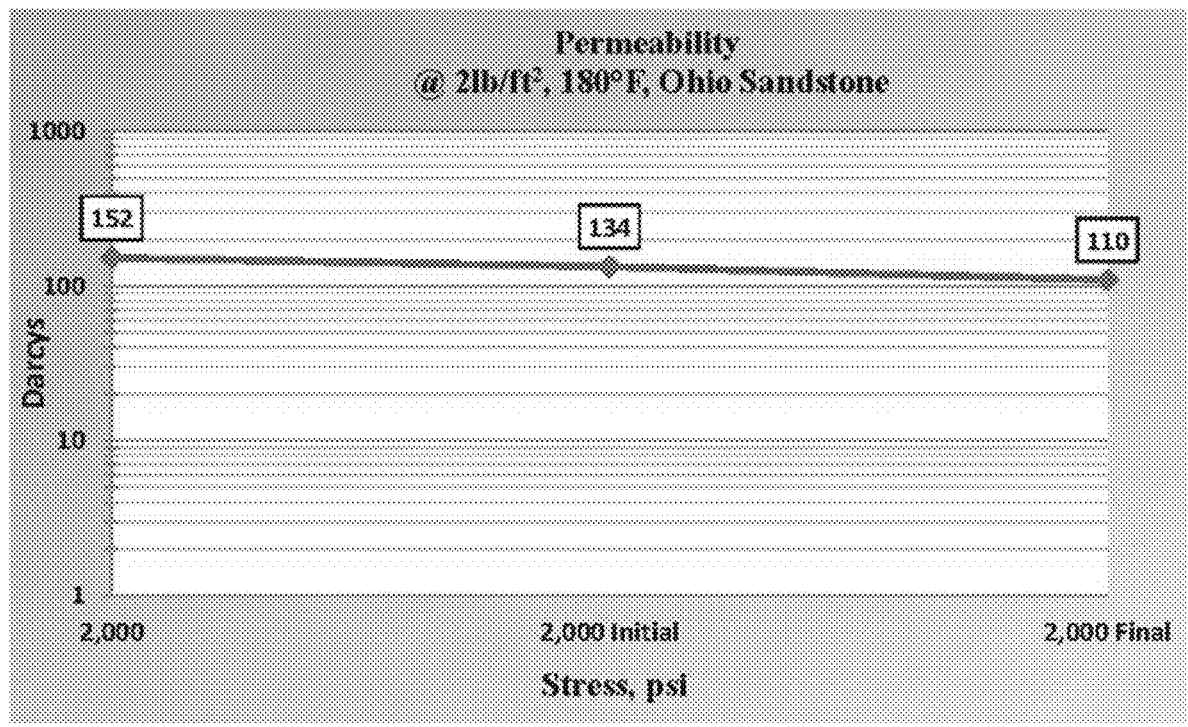
FIG. 10C depicts a plot of permeability of the 30/50 control fluid through the post sieved proppant packed between two Ohio Sandstone wafer at 180° C.

The post sieved proppant was placed between the Ohio Sandstone wafers in the cells and conductivity and permeability tested yielding the results tabulated in Table 6 and shown in FIGS. 10B&C.

TABLE 6

TABULAR DATA FOR 30/50 BASELINE SAMPLE

| Stress (psi) | Time @ stress | Time (Total) | Conductivity (md-ft) | Permeability (Darcy) | Width (in) |
|---|---|---|---|---|---|
| 2,000 | 24 hrs. | 24 hrs. | 3076 | 152 | 0.243 |
| 2,000 | 0 hrs. | 0 hrs. | 2709 | 134 | 0.243 |
| 2,000 | 24 hrs. | 48 hrs. | 2399 | 119 | 0.242 |
| 2,000 | 24 hrs. | 98 hrs. | 2213 | 110 | 0.241 |

Figure 10D:
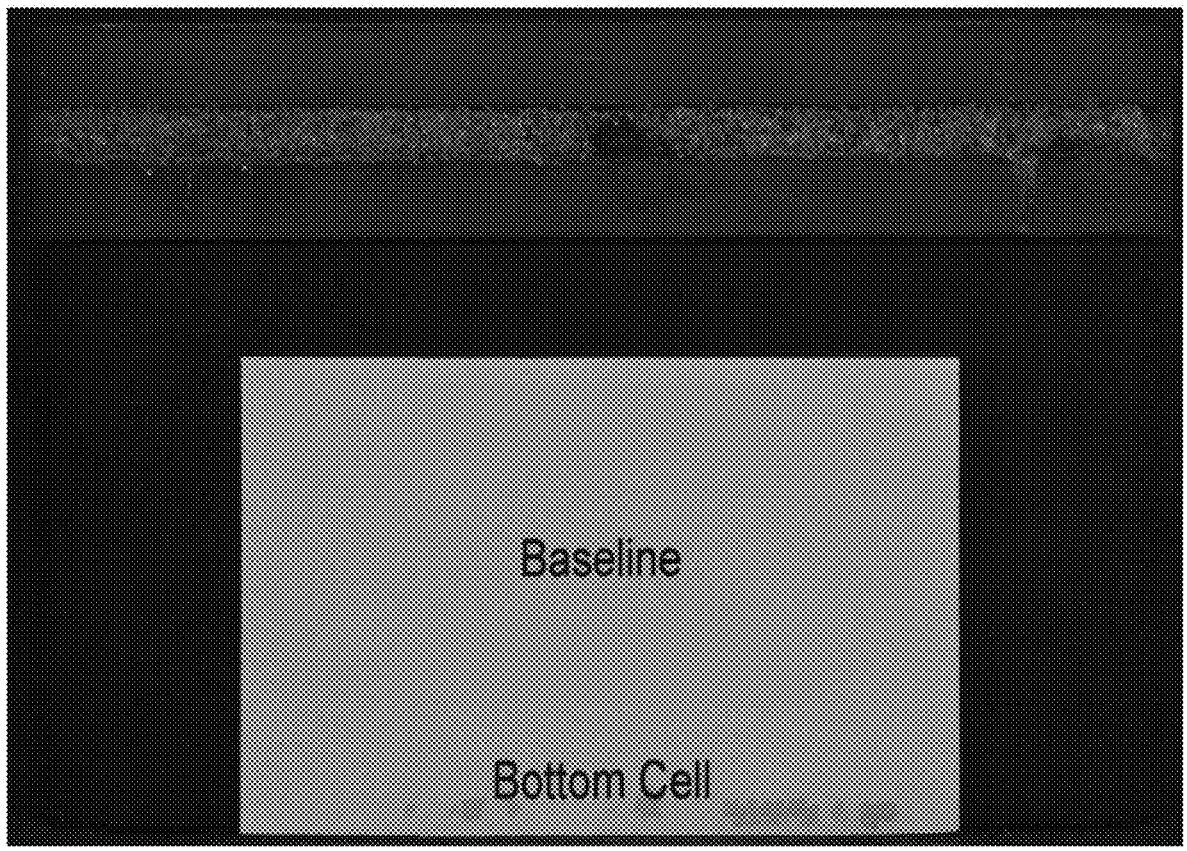
FIG. 10D depicts a photograph of the bottom cell for the 30/50 baseline or control fluid.
Figure 10E:
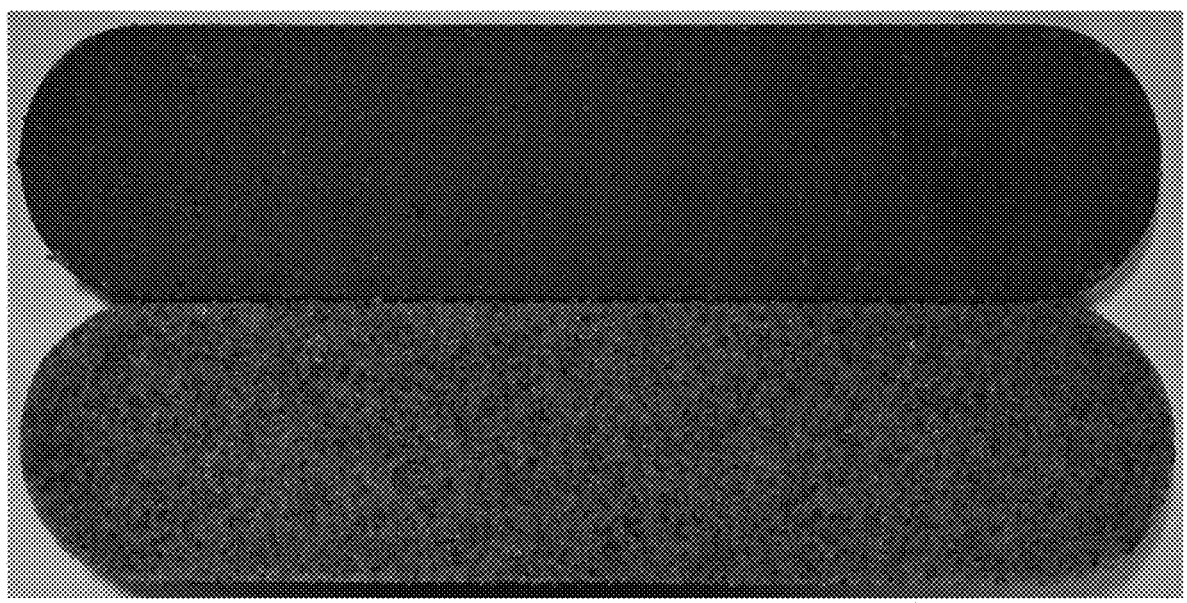
FIG. 10E depicts a photograph of the bottom cell Ohio Sandstone wafer and the post sieved proppant pack for the 30/50 baseline or control fluid.

A photograph of the 30/50 bottom cell is shown in FIG. 10D and the upper Ohio Sandstone wafer and proppant pack is shown in FIG. 10E.

Example 18

This example illustrates the conductivity and permeability testing of the Fluid A.

Figure 11A:
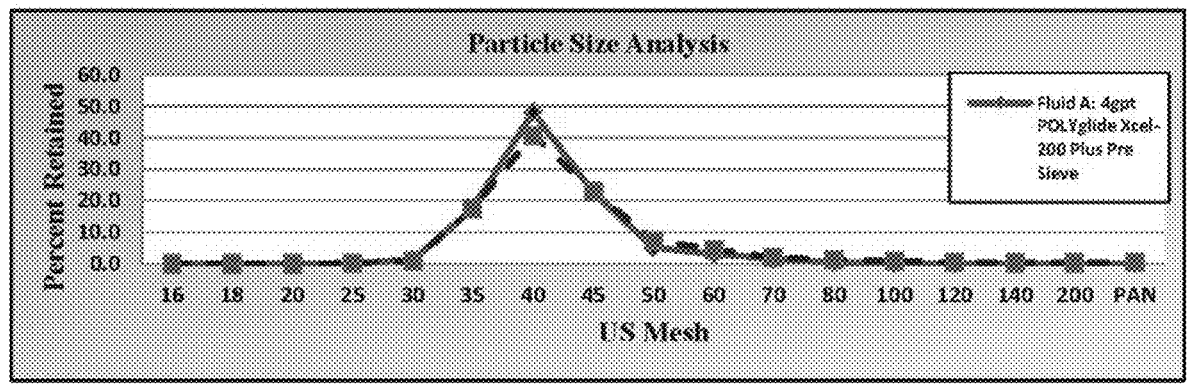
FIG. 11A depicts a plot of particle size distributions of pre-sieved and post sieved Fluid A proppants.

A proppant sample for use in Fluid A testing was prepared by sieving a proppant having a pre-sieving particle size distribution to form a post sieving proppant sample for a post sieving particle size distribution for use in the cell apparatus is shown in Table 7 and FIG. 11A.

TABLE 7

SIEVE ANALYSIS OF FLUID A: 4GPT POLYGLIDE XCEL-200 PLUS SAMPLE

| Quick Check ✓ | | | Fluid A | Fluid A |
|---|---|---|---|---|
| (mm) | mesh size | API RP 19C | Pre Sieve | Post Sieve |
| 1.700 | 12 | ≤0.1% | 0.0 | 0.0 |
| 1.400 | 14 | | 0.0 | 0.0 |
| 1.180 | 16 | | 0.0 | 0.0 |
| 1.000 | 18 | | 0.0 | 0.0 |
| 0.850 | 20 | | 0.0 | 0.0 |
| 0.710 | 25 | | 0.1 | 0.2 |
| 0.600 | 30 | | 1.3 | 0.9 |
| 0.500 | 35 | | <u>17.5</u> | <u>17.5</u> |
| 0.425 | 45 | | <u>48.1</u> | <u>40.8</u> |
| 0.355 | 40 | | <u>22.7</u> | <u>22.9</u> |
| 0.300 | 50 | | <u>5.1</u> | <u>7.4</u> |
| 0.250 | 60 | | 3.1 | 4.5 |
| 0.212 | 70 | | 1.5 | 2.0 |
| 0.180 | 80 | | 0.5 | 1.3 |
| 0.150 | 100 | | 0.1 | 0.9 |
| 0.125 | 120 | | 0.0 | 0.4 |
| 0.106 | 140 | | 0.0 | 0.3 |
| 0.075 | 200 | | 0.0 | 0.4 |
| <0.075 | PAN | ≤1.0% | 0.1 | 0.5 |
| Total | | | 100.0 | 100.0 |
| In-size (%) (−30 + 50) sieves | | ≥90% | 93.3 | 88.6 |
| Median Particle Diameter (MPD, mm)/(MPD, inches) | | 0.437 | 0.017 | 0.411 | 0.016 |
| Median Particle Diameter (MPD, mm)/(MPD, inches) | | 0.446 | 0.018 | 0.429 | 0.017 |
| ΔMPD: | | | 0.025 | 10.3% (−50 mesh) | bold ISO designated sieves
<u>bold underline</u> (−30 + 50) sieves

The Zero Pack Width was measured to be 0.256 inches and the bulk density was measured to be 1.49 g/cm³.

Figure 11B:
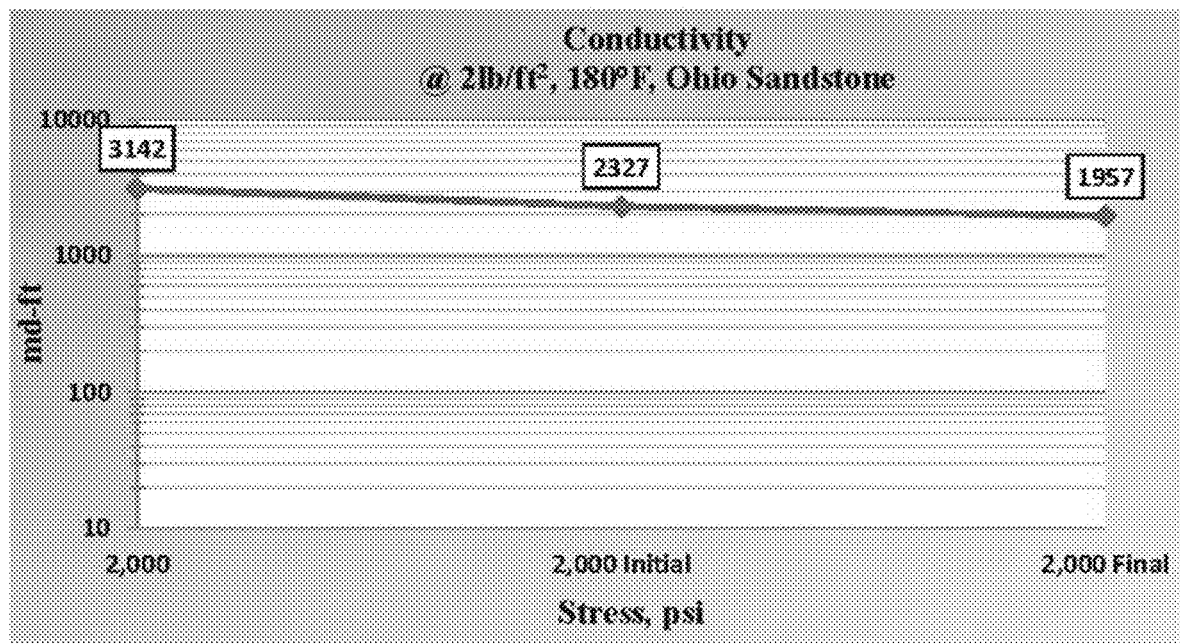
FIG. 11B depicts a plot of conductivity of Fluid A through the post sieved proppant packed between two Ohio Sandstone wafer at 180° C.
Figure 11C:
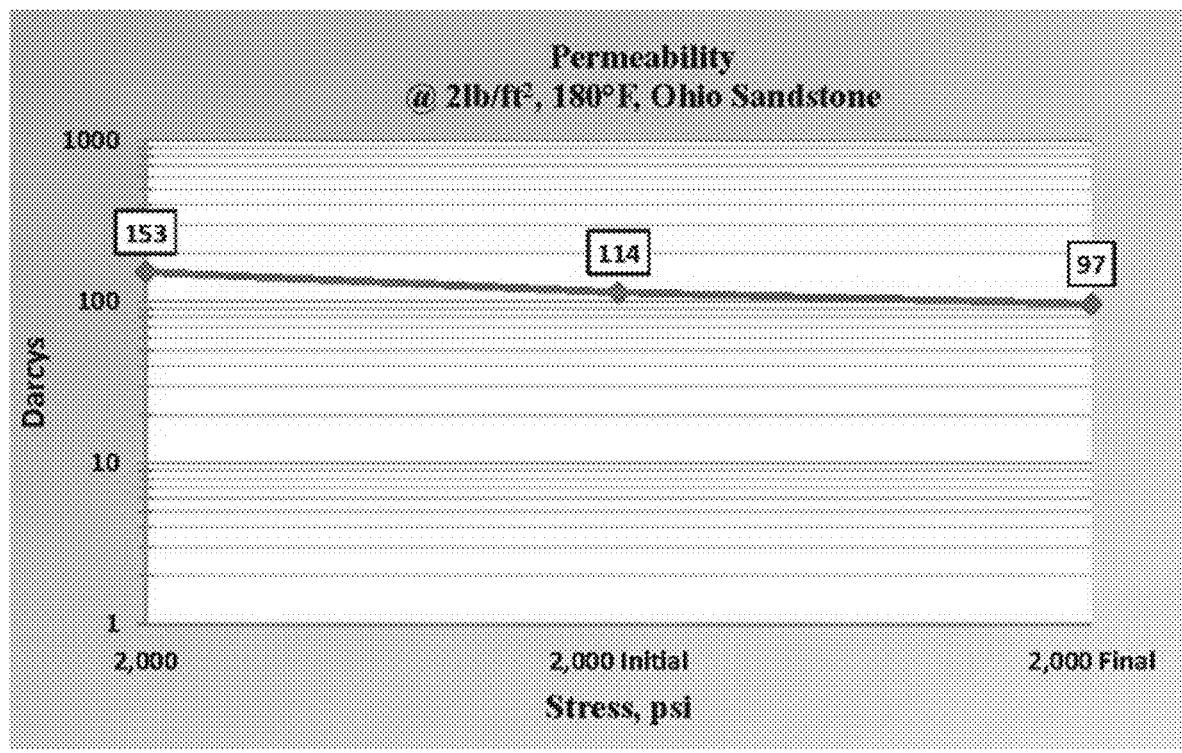
FIG. 11C depicts a plot of permeability of Fluid A through the post sieved proppant packed between two Ohio Sandstone wafer at 180° C.

The post sieved proppant was placed between the Ohio Sandstone wafers in the cells and conductivity and permeability tested yielding the results tabulated in Table 8 and shown in FIGS. 11B&C.

TABLE 8

TABULAR DATA FOR FLUID A: 4GPT POLYGLIDE XCEL-200 PLUS SAMPLE

| Stress (psi) | Time @ stress | Time (Total) | Conductivity (md-ft) | Permeability (Darcy) | Width (in) | Regain (%) |
|---|---|---|---|---|---|---|
| 2,000 | 24 hrs. | 24 hrs. | 3142 | 153 | 0.243 | — |
| 2,000 | 0 hrs. | 0 hrs. | 2327 | 114 | 0.243 | 85 |
| 2,000 | 24 hrs. | 48 hrs. | 1768 | 87 | 0.242 | 73 |
| 2,000 | 24 hrs. | 98 hrs. | 1957 | 97 | 0.241 | 88 |

The differential pressure to initial flow of inches in water was measured at 1.04.

Figure 11D:
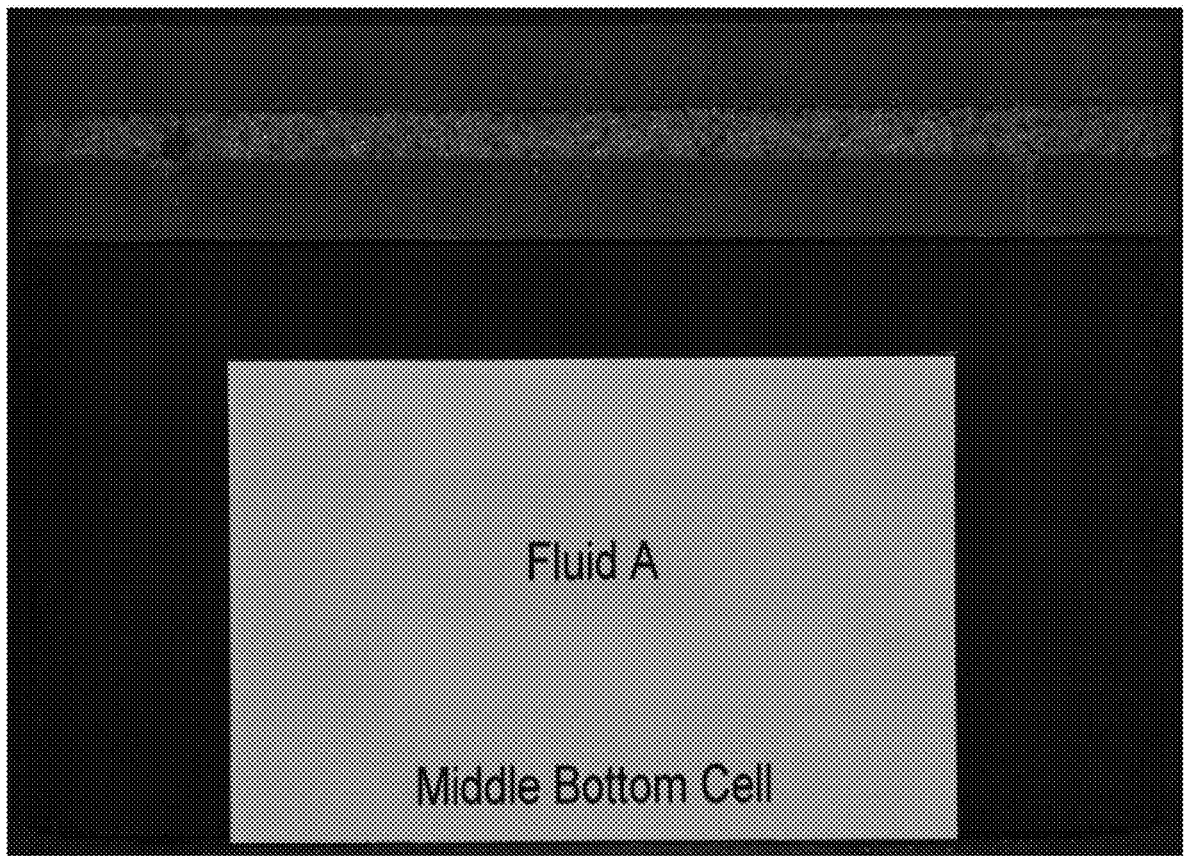
FIG. 11D depicts a photograph of the bottom cell for Fluid A.
Figure 11E:
FIG. 11E depicts a photograph of the bottom cell Ohio Sandstone wafer and the post sieved proppant pack for Fluid A.

A photograph of the Fluid A bottom cell is shown in FIG. 11D and the upper Ohio Sandstone wafer and proppant pack is shown in FIG. 11E.

Example 19

This example illustrates the conductivity and permeability testing of the Fluid B.

Figure 12A:
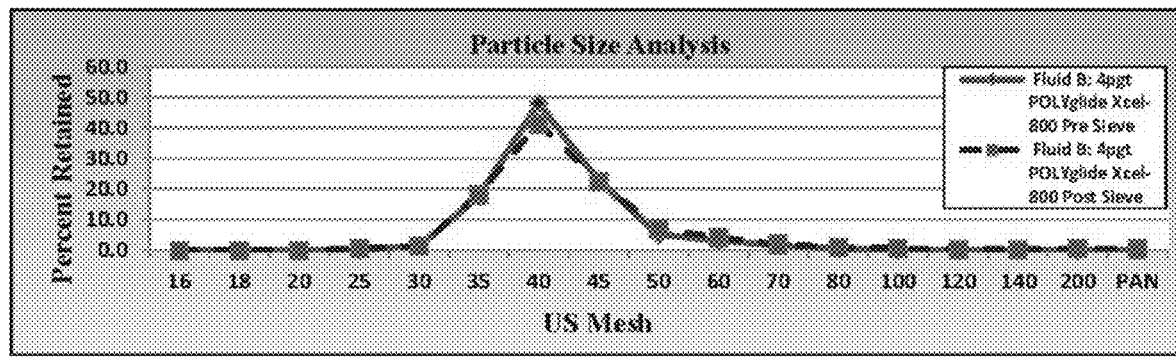
FIG. 12A depicts a plot of particle size distributions of pre-sieved and post sieved Fluid B proppants.

A proppant sample for use in Fluid B testing was prepared by sieving a proppant having a pre-sieving particle size distribution to form a post sieving proppant sample for a post sieving particle size distribution for use in the cell apparatus is shown in Table 9 and FIG. 12A.

TABLE 9

SIEVE ANALYSIS OF FLUID B SAMPLE

| Quick Check ✓ (mm) | API mesh size | API RP 19C | Fluid B Pre Sieve | Fluid B Post Sieve |
|---|---|---|---|---|
| 1.700 | 12 | ≤0.1% | 0.0 | 0.0 |
| 1.400 | 14 | | 0.0 | 0.0 |
| 1.180 | 16 | | 0.0 | 0.0 |
| 1.000 | 18 | | 0.0 | 0.0 |
| 0.850 | 20 | | 0.0 | 0.0 |
| 0.710 | 25 | | 0.1 | 0.5 |
| 0.600 | 30 | | 1.3 | 1.0 |
| 0.500 | 35 | | <u>17.5</u> | <u>18.2</u> |
| 0.425 | 45 | | <u>48.1</u> | <u>41.4</u> |
| 0.355 | 40 | | <u>22.7</u> | <u>22.4</u> |
| 0.300 | 50 | | <u>5.1</u> | <u>7.1</u> |
| 0.250 | 60 | | 3.1 | 4.1 |
| 0.212 | 70 | | 1.5 | 1.9 |
| 0.180 | 80 | | 0.5 | 0.9 |
| 0.150 | 100 | | 0.1 | 0.6 |
| 0.125 | 120 | | 0.0 | 0.3 |
| 0.106 | 140 | | 0.0 | 0.3 |
| 0.075 | 200 | | 0.0 | 0.7 |
| <0.075 | PAN | ≤1.0% | 0.1 | 0.4 |
| Total | | | 100.0 | 100.0 |
| In-size (%) (−30 + 50) sieves | | ≥90% | 93.3 | 89.1 |
| Median Particle Diameter (MPD, mm)/(MPD, inches) | | 0.437 | 0.017 | 0.417 | 0.016 |
| Median Particle Diameter (MPD, mm)/(MPD, inches) | | 0.446 | 0.018 | 0.435 | 0.017 |
| | | ΔMPD: | 0.020 | 0.0 % (−50 mesh) | bold ISO designated sieves
<u>bold underline</u> (−30 + 50) sieves

The Zero Pack Width was measured to be 0.252 inches and the bulk density was measure to be 1.49 g/cm³.

Figure 12B:
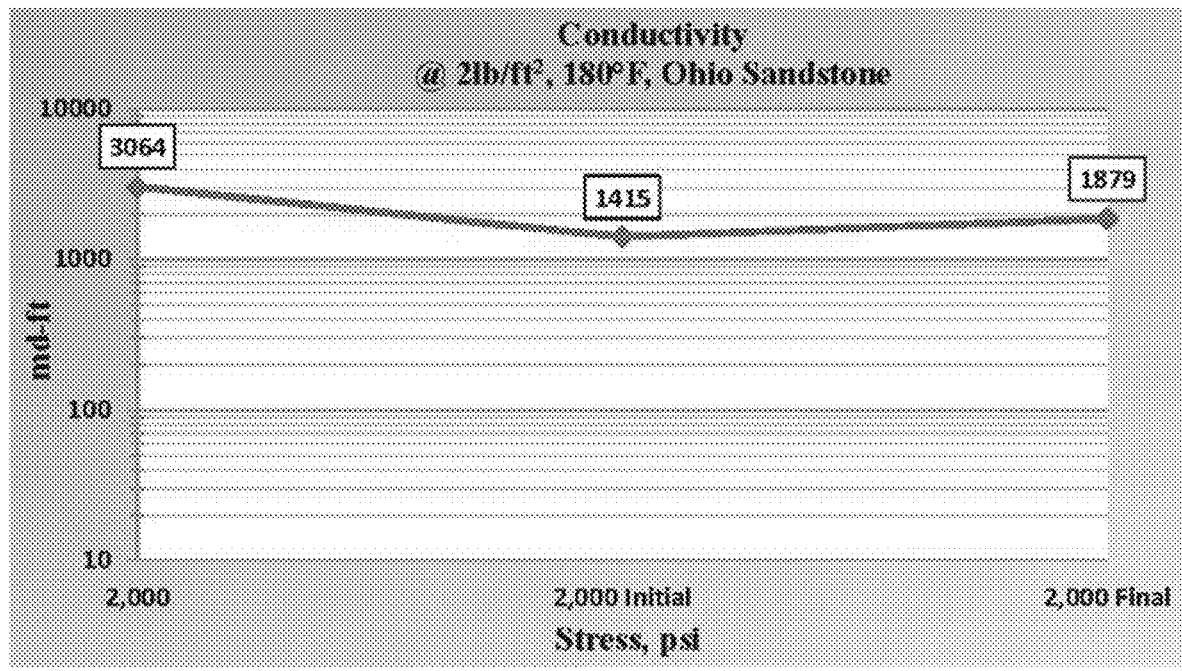
FIG. 12B depicts a plot of conductivity of Fluid B through the post sieved proppant packed between two Ohio Sandstone wafer at 180° C.
Figure 12C:
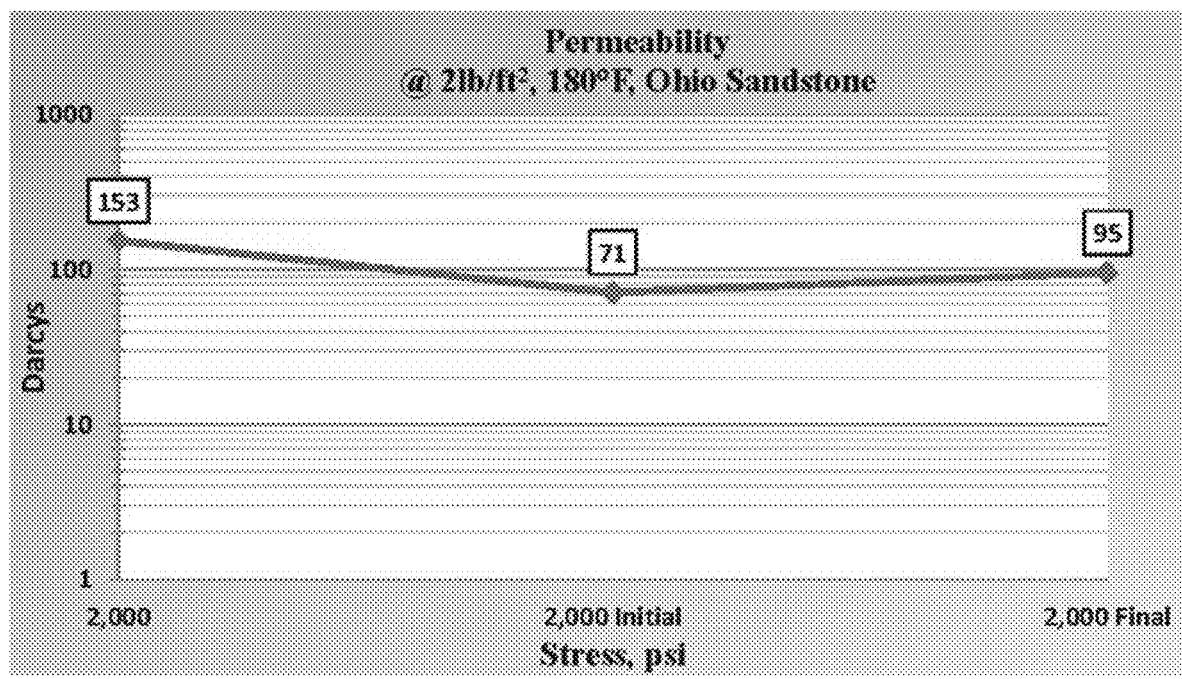
FIG. 12C depicts a plot of permeability of Fluid B through the post sieved proppant packed between two Ohio Sandstone wafer at 180° C.

The post sieved proppant was placed between the Ohio Sandstone wafers in the cells and conductivity and permeability tested yielding the results tabulated in Table 10 and shown in FIGS. 12B&C.

TABLE 10

TABULAR DATA FOR FLUID B: 4PGT POLYGLIDE XCEL-800 SAMPLE

| Stress (psi) | Time @ stress | Time (Total) | Conductivity (md-ft) | Permeability (Darcy) | Width (in) | Regain (%) |
|---|---|---|---|---|---|---|
| 2,000 | 24 hrs. | 24 hrs. | 3064 | 153 | 0.240 | — |
| 2,000 | 0 hrs. | 0 hrs. | 1415 | 71 | 0.240 | 53 |
| 2,000 | 24 hrs. | 48 hrs. | 1272 | 64 | 0.239 | 54 |
| 2,000 | 24 hrs. | 98 hrs. | 1879 | 95 | 0.238 | 86 |

The differential pressure to initial flow of inches in water was measured at 3.005.

Figure 12D:
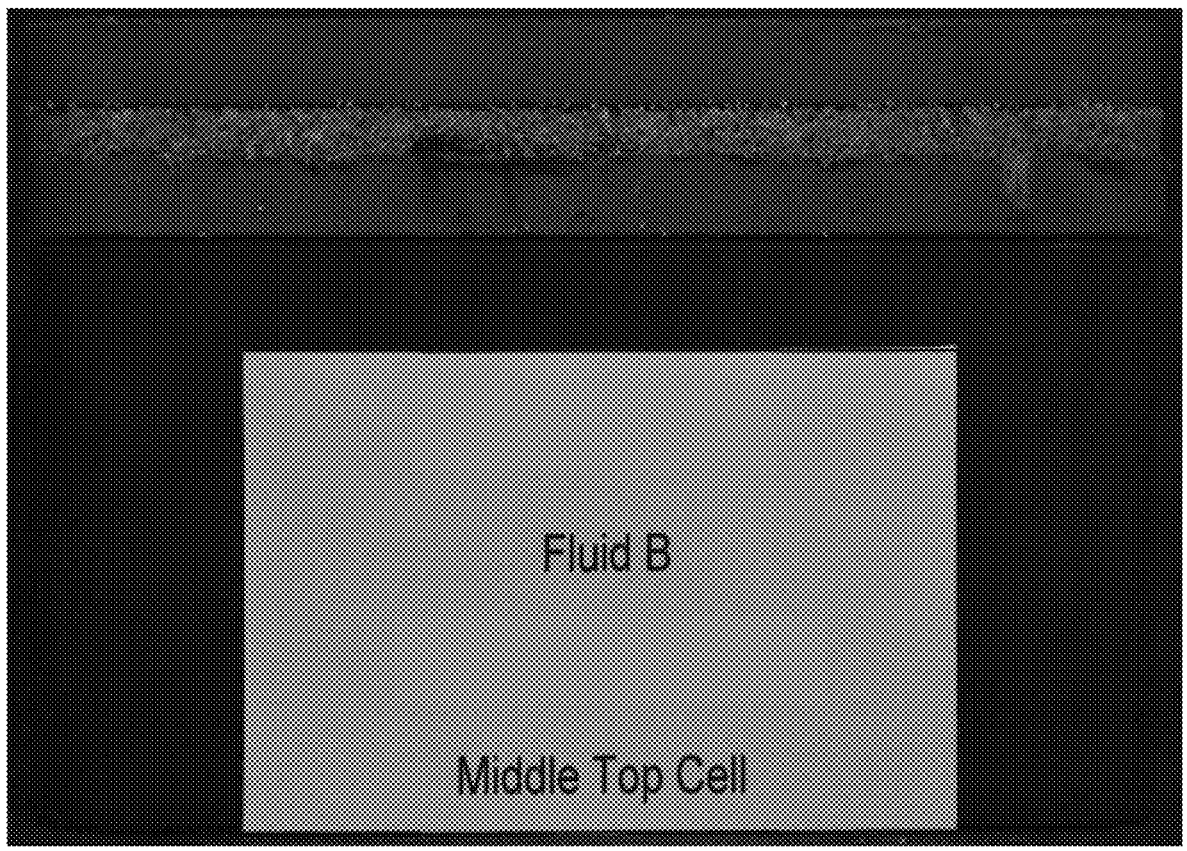
FIG. 12D depicts a photograph of the bottom cell for Fluid B.
Figure 12E:
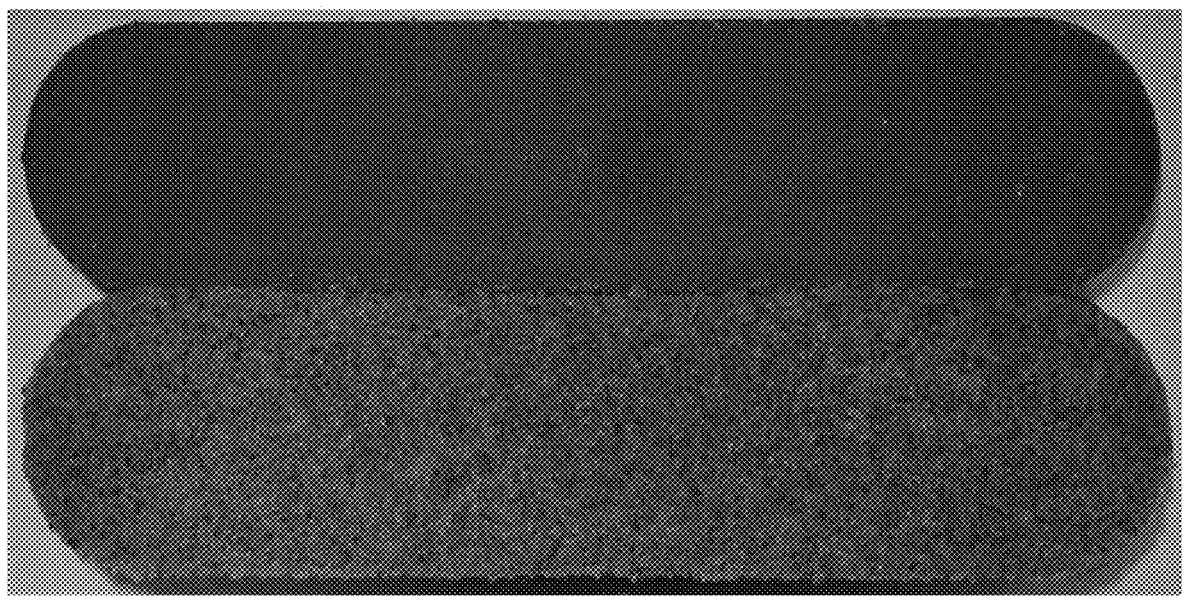
FIG. 12E depicts a photograph of the bottom cell Ohio Sandstone wafer and the post sieved proppant pack for Fluid B.

A photograph of the Fluid B bottom cell is shown in FIG. 12D and the upper Ohio Sandstone wafer and proppant pack is shown in FIG. 12E.

Example 20

This example illustrates conductivity and permeability testing of the Fluid C.

Figure 13A:
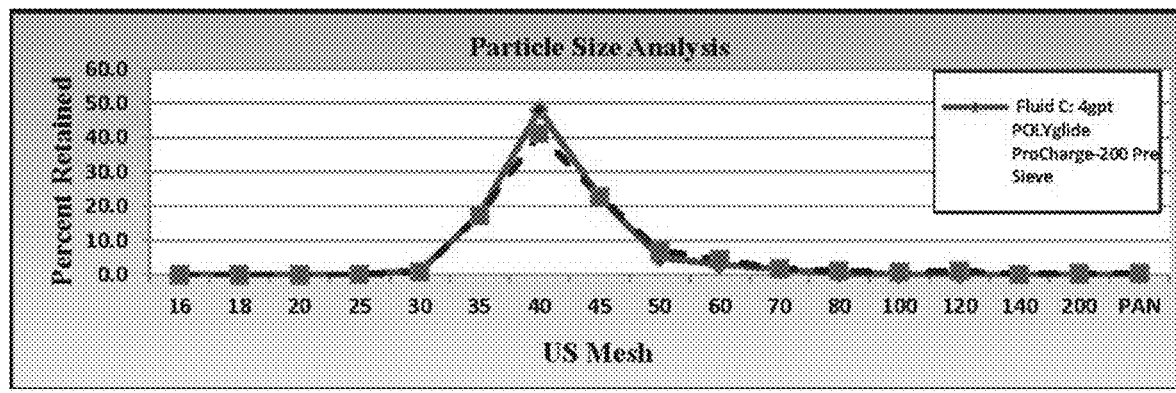
FIG. 13A depicts a plot of particle size distributions of pre-sieved and post sieved Fluid C proppants.

A proppant sample for use in Fluid C testing was prepared by sieving a proppant having a pre-sieving particle size distribution to form a post sieving proppant sample for a post sieving particle size distribution for use in the cell apparatus is shown in Table 11 and FIG. 13A.

TABLE 11

SIEVE ANALYSIS OF 30/50 BASELINE SAMPLE

| Quick Check ✓ (mm) | API mesh size | API RP 19C | 30/50 Baseline Pre Sieve | 30/50 Baseline Post Sieve |
|---|---|---|---|---|
| 1.700 | 12 | ≤0.1% | 0.0 | 0.0 |
| 1.400 | 14 | | 0.0 | 0.0 |
| 1.180 | 16 | | 0.0 | 0.0 |
| 1.000 | 18 | | 0.0 | 0.0 |
| 0.850 | 20 | | 0.0 | 0.0 |
| 0.710 | 25 | | 0.1 | 0.1 |
| 0.600 | 30 | | 1.3 | 1.0 |
| 0.500 | 35 | | <u>17.5</u> | <u>17.3</u> |
| 0.425 | 45 | | <u>48.1</u> | <u>41.2</u> |
| 0.355 | 40 | | <u>22.7</u> | <u>22.8</u> |
| 0.300 | 50 | | <u>5.1</u> | <u>7.2</u> |
| 0.250 | 60 | | 3.1 | 4.3 |
| 0.212 | 70 | | 1.5 | 1.8 |
| 0.180 | 80 | | 0.5 | 1.2 |
| 0.150 | 100 | | 0.1 | 0.8 |
| 0.125 | 120 | | 0.0 | 1.1 |
| 0.106 | 140 | | 0.0 | 0.3 |
| 0.075 | 200 | | 0.0 | 0.4 |
| <0.075 | PAN | ≤1.0% | 0.1 | 0.5 |
| Total | | | 100.0 | 100.0 |
| In-size (%) (−30 + 50) sieves | | ≥90% | 93.3 | 88.4 |
| Median Particle Diameter (MPD, mm)/(MPD, inches) | | 0.437 | 0.0017 | 0.410 | 0.016 |
| Median Particle Diameter (MPD, mm)/(MPD, inches) | | 0.446 | 0.018 | 0.428 | 0.017 |
| | | ΔMPD: | 0.027 | 10.4% (−50 mesh) | bold ISO designated sieves
<u>bold underline</u> (−30 + 50) sieves

The Zero Pack Width was measured to be 0.254 inches and the bulk density was measured to be 1.49 g/cm³.

Figure 13B:
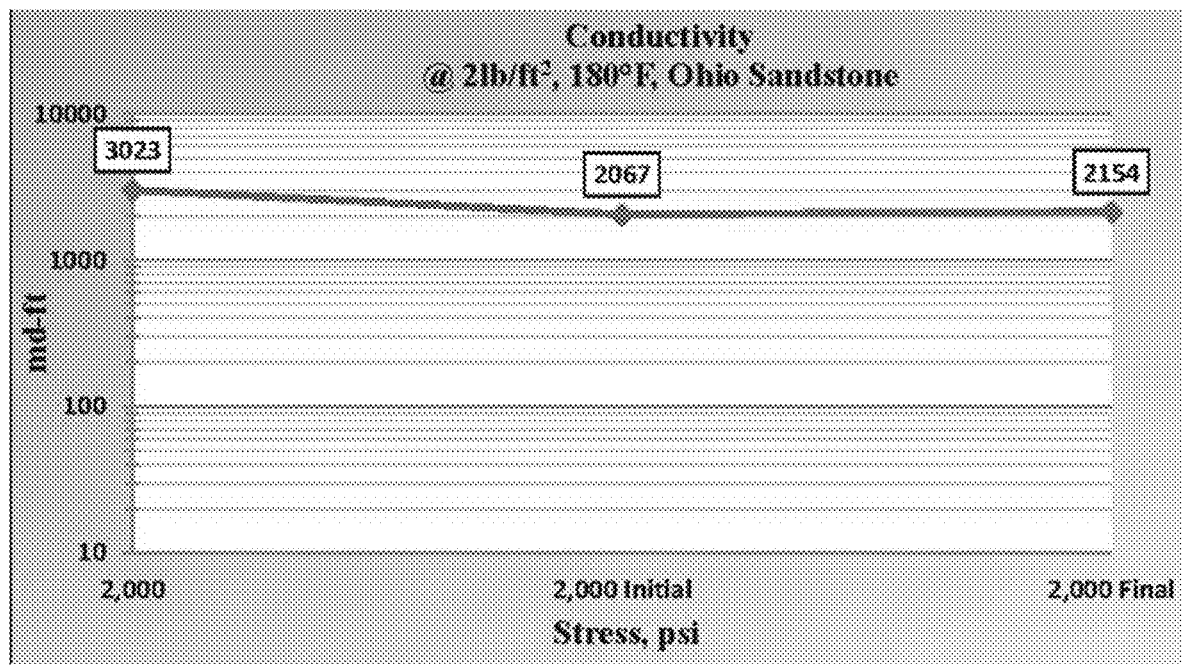
FIG. 13B depicts a plot of conductivity of Fluid C through the post sieved proppant packed between two Ohio Sandstone wafer at 180° C.
Figure 13C:
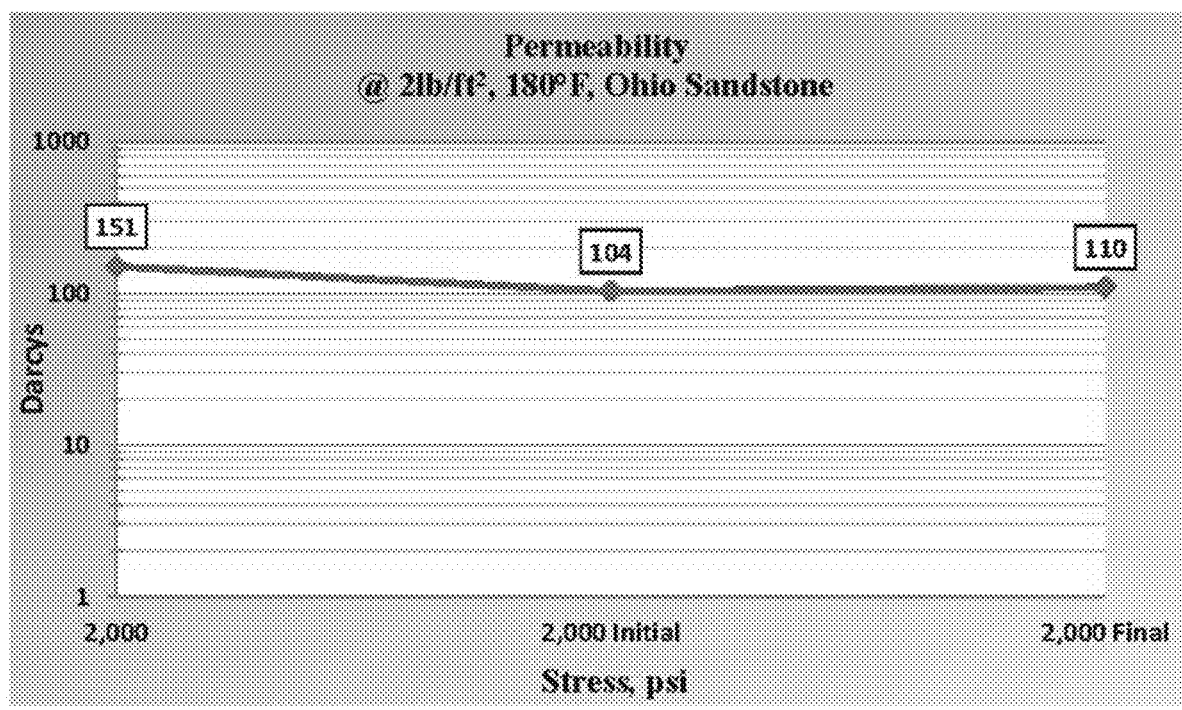
FIG. 13C depicts a plot of permeability of Fluid C through the post sieved proppant packed between two Ohio Sandstone wafer at 180° C.

The post sieved proppant was placed between the Ohio Sandstone wafers in the cells and conductivity and permeability tested yielding the results tabulated in Table 12 and shown in FIGS. 13B&C.

TABLE 12

Tabular Data for Fluid C: 4gpt POLYglide ProCharge-200 sample

| Stress (psi) | Time @ stress | Time (Total) | Conductivity (md-ft) | Permeability (Darcy) | Width (in) | Regain (%) |
|---|---|---|---|---|---|---|
| 2,000 | 24 hrs. | 24 hrs. | 3023 | 151 | 0.240 | — |
| 2,000 | 0 hrs. | 0 hrs. | 2067 | 104 | 0.239 | 78 |
| 2,000 | 24 hrs. | 48 hrs. | 1917 | 97 | 0.237 | 82 |
| 2,000 | 24 hrs. | 98 hrs. | 2154 | 110 | 0.236 | 100 |

The differential pressure to initial flow of inches in water was measured at 0.806.

Figure 13D:
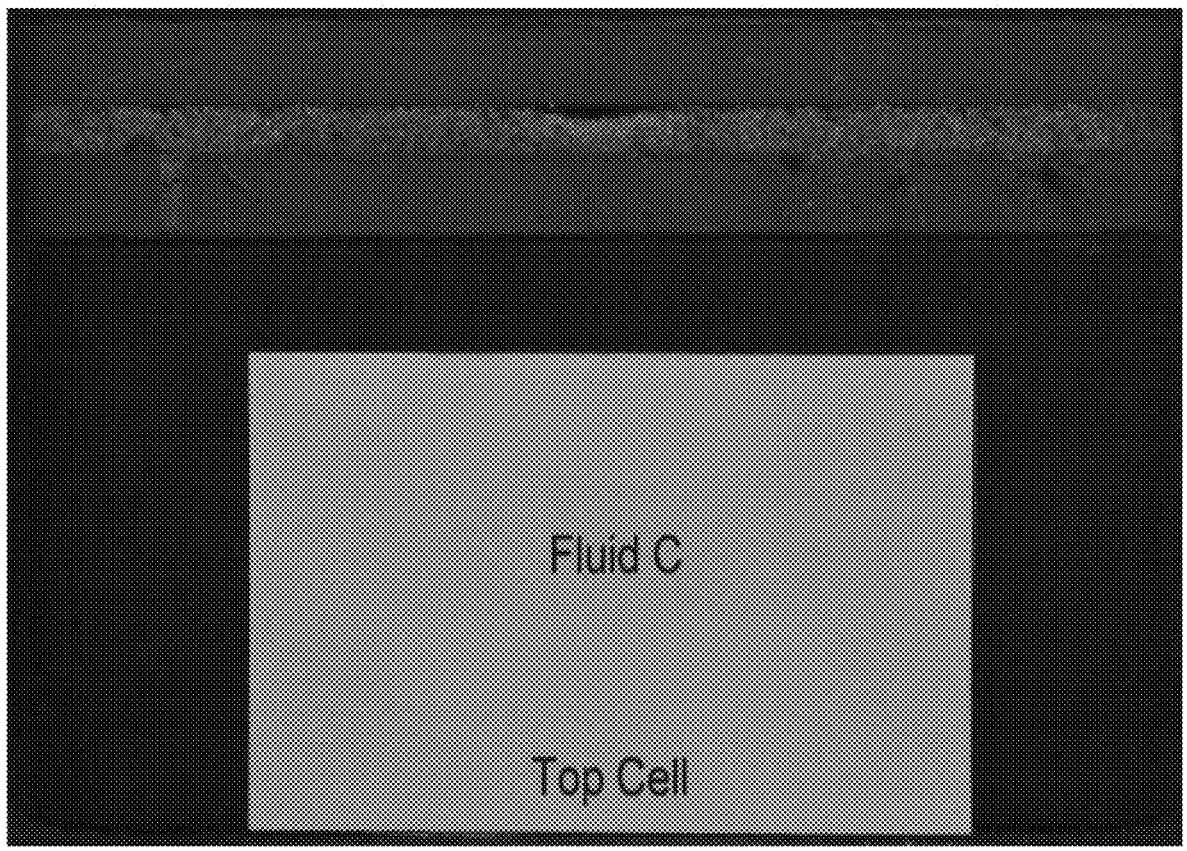
FIG. 13D depicts a photograph of the bottom cell for Fluid C.
Figure 13E:
FIG. 13E depicts a photograph of the bottom cell Ohio Sandstone wafer and the post sieved proppant pack for Fluid C.

A photograph of the Fluid C bottom cell is shown in FIG. 13D and the upper Ohio Sandstone wafer and proppant pack is shown in FIG. 13E.

Figure 14A:
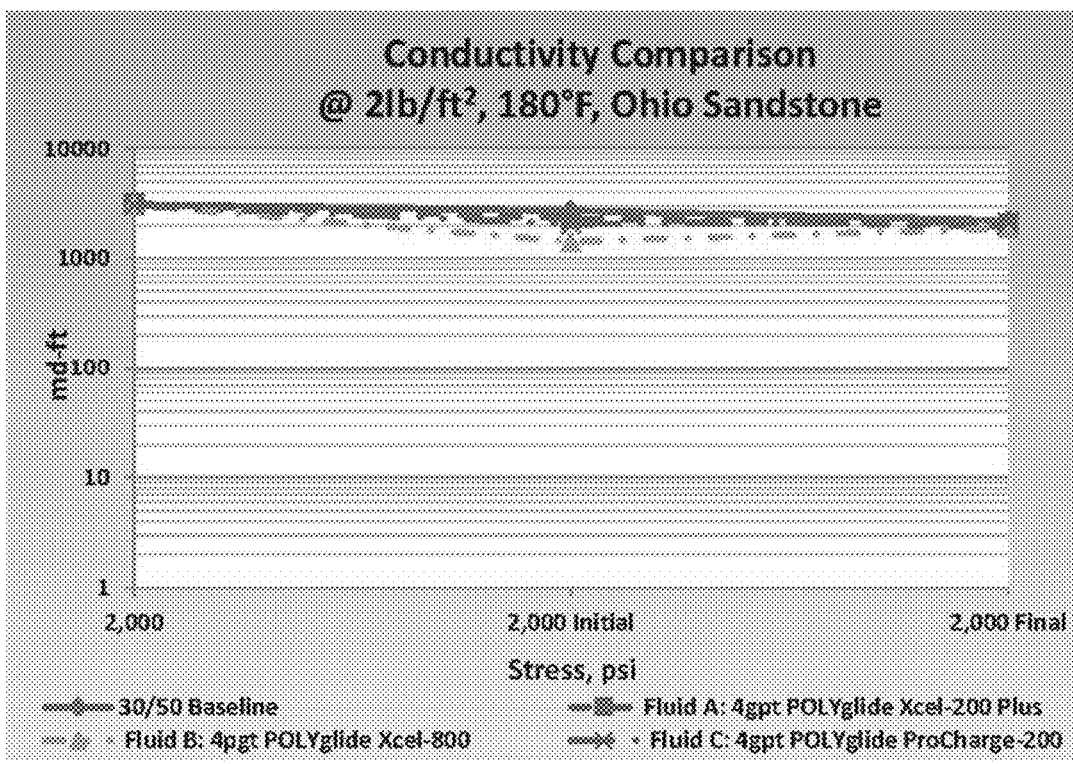
FIG. 14A depicts a plot comparing the conductivity of the 30/50 baseline fluid, Fluid A, Fluid B, and Fluid C.
Figure 14B:
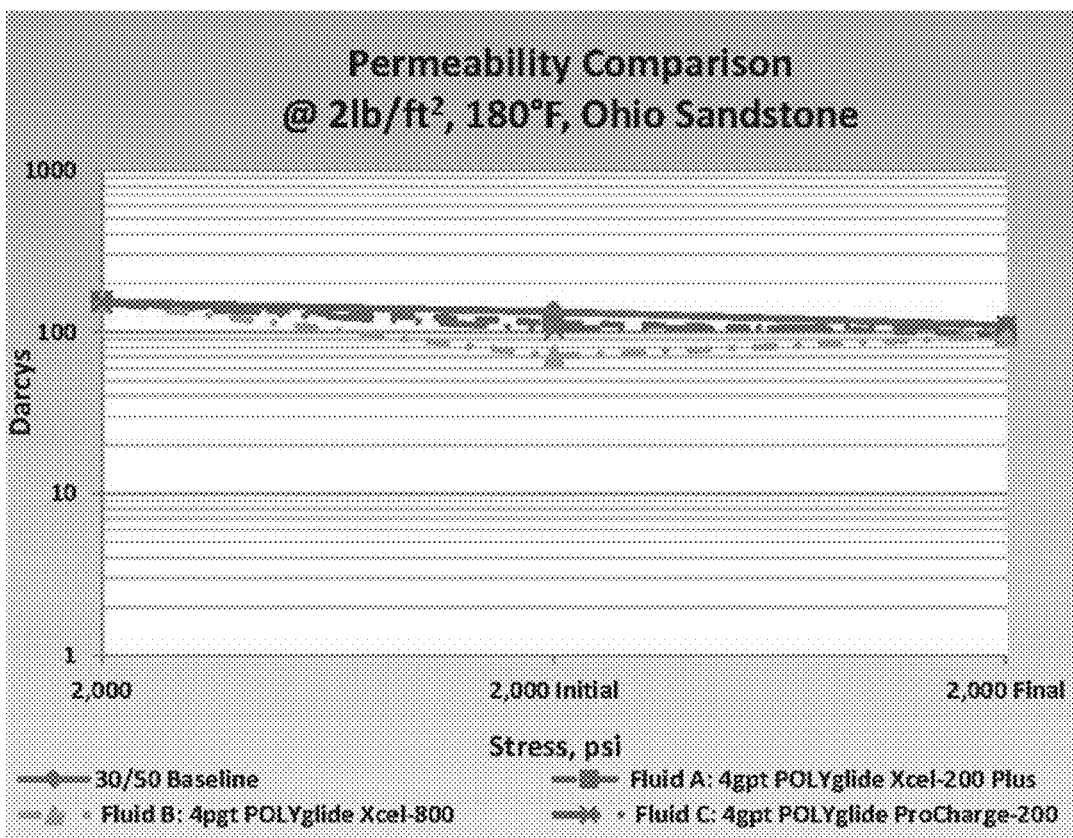
FIG. 14B depicts a photograph of the permeability of the 30/50 baseline fluid, Fluid A, Fluid B, and Fluid C.

A plot of the conductivity for the 30/50 baseline, Fluid A, Fluid B, and Fluid C are shown in FIG. 14A. A plot of the permeability for the 30/50 baseline, Fluid A, Fluid B, and Fluid C are shown in FIG. 14B.

GENERAL CONCLUSIONS

1. When POLYgluide Xcel 200 PLUS slurries were hydrated in 2% KCl, no precipitate was observed and the fluids containing the POLYgluide Xcel 200 PLUS slurries showed no significant conductivity damage in the regained conductivity tests.

2. If KCl concentration was dropped to 1.5 wt. %, a polymer precipitate was observed.

3. No difference was observed in high NaCl brines and high KCl brines.

4. In a 55K brine including 16,512 ppm Na$^+$, 3,609 ppm of Ca$^{2+}$, 765 ppm of Mg$^{2+}$, and 34,113 ppm of Cl$^-$, the 55K brine could be diluted to 3:1 with tap water with no precipitate observed.

5. No precipitate was observed in a 3600 ppm Ca brine, which was the concentration of Ca ion in the 55Kbrine. However, when the Ca ion concentration was cut in half to from a 1800 ppm Ca brine, a precipitate was observed.

CLOSING PARAGRAPH

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

We claim:

1. A composition comprising:
   (A) a slurry comprising:
      (i) between about 5 wt. % and about 60 wt. % of a mixture of oppositely charged acrylamide polymers consisting essentially of:
         (a) one or more dry particulate hydratable anionic acrylamide polymers, and
         (b) one or more dry particulate hydratable cationic acrylamide polymers, and
      (ii) between about 95 wt. % and about 40 wt. % of an oil based carrier, the oil based carrier comprising:
         (a) one or more hydrocarbon solvents, and
         (b) one or more suspending agents, and
   (B) a water composition comprising an effective ion concentration comprising:
      (i) between about 25,000 ppm (2.5 wt. %) and about 250,000 ppm (25 wt. %) of one or more monovalent ions, and
      (ii) between about 10,000 ppm (1.0 wt. %) and 30,000 ppm (3 wt. %) of one or more polyvalent ions, and
      (iii) having a ratio of monovalent ions to polyvalent ions between about 10:1 and about 2:1 to form a downhole fluid,
   wherein the effective ion concentration is sufficient to reduce gelling interactions between the one or more dry particulate hydratable anionic acrylamide polymers and the one or more dry particulate hydratable cationic acrylamide polymers during hydration by the water composition,
   wherein the mixture of the oppositely charged acrylamide polymers have % drag reduction values within 10% compared to % drag reduction values of compositions including only cationic acrylamide polymers over a 10 minute period of time,
   wherein the carrier insulates the one or more dry particulate hydratable cationic acrylamide polymers and/or the one or more dry particulate hydratable anionic acrylamide polymers from moisture, and
   wherein the slurry reduces clumping of the one or more dry particulate hydratable cationic acrylamide polymers and/or the one or more dry particulate hydratable anionic acrylamide polymers when added into the water composition.

2. The composition of claim 1, wherein the oil based carrier further comprising:
   (c) one or more surfactants.

3. The composition of claim 2, wherein the oil based carrier fluid further comprises:
   between about 98 wt. % and about 80 wt. % of the one or more hydrocarbon solvents,
   between about 1 wt. % and about 10 wt. % of the one or more surfactants, and
   between about 1 wt. % and about 10 wt. % of the one or more suspending agents.

4. The composition of claim 3, wherein:
   the one or more hydrocarbon solvents comprise paraffin containing hydrocarbons, isoparaffin containing hydrocarbons, olefin containing hydrocarbons, cyclic paraffin containing hydrocarbons, cyclic isoparaffin containing hydrocarbons, cyclic olefin containing hydrocarbons, naphthenlic solvents, or mixtures thereof,
   the one or more surfactants comprise one or more nonionic surfactants and
   the one or more suspending agents comprise polymeric suspending agent, organophilic clay suspending agents, or mixtures thereof.

5. The composition of claim 4, wherein:
   an amount of the one or more dry particulate hydratable anionic acrylamide polymers is between 0.1 gpt and 10 gpt,
   an amount of the one or more one or more dry particulate hydratable cationic acrylamide polymers is between 0.1 gpt and 10 gpt,
   a weight ratio of the one or more dry particulate hydratable anionic acrylamide polymers to the one or more dry particulate hydratable cationic acrylamide polymers is between about 50:1 to about 1:50,
   each of the one or more dry particulate hydratable anionic acrylamide polymers individually has a molecular weight between about 10 million and 40 million,
   each of the one or more dry particulate hydratable cationic acrylamide polymers individually has a molecular weight between about 5 million and 20 million, or
   the water composition is selected from the group consisting of fresh water, brackish water, salt water, sea water, produced water, flowback water, and combinations thereof.

6. The composition of claim 5, wherein:
   a particle size distribution of each of the particulate polymers independently comprises particles having sizes between about 20 mesh (841 μm) and about 400 mesh (37 μm).

7. The composition of claim 6, wherein the sizes are between about 50 mesh (297 μm) and about 300 mesh (40.6 μm).

8. The composition of claim 1, wherein:
   the effective ion concentration of the one or more monovalent ions is between 30,000 ppm (3.0 wt. %) and 250,000 ppm (25 wt. %),
   the effective ion concentration of the one or more polyvalent ions is between 15,000 ppm (1.5 wt. %) and 30,000 ppm (3.0 wt. %), and
   the ratio of monovalent ions to polyvalent ions is between about 10:1 and about 3.1.

9. The composition of claim 1, wherein:
   the one or more hydratable anionic acrylamide polymers comprise:
      (a) sodium anionic acrylamide polymers containing $CH_2CH(CONH_2)$ monomer units and $CH_2CH(COONa)$ monomer units;

(b) potassium anionic acrylamide polymers containing CH$_2$CH(CONH$_2$) monomer units and CH$_2$CH(COOK) monomer units;
(c) rubidium anionic acrylamide polymers containing CH$_2$CH(CONH$_2$) monomer units and CH$_2$CH(COORb) monomer units;
(d) cesium anionic acrylamide polymers containing CH$_2$CH(CONH$_2$) monomer units and CH$_2$CH(COOCs) monomer units;
(e) acrylamide copolymers containing (1) CH$_2$CH(CONH$_2$) monomer units, (2) anionic monomer units including CH$_2$CH(COONa) monomer units, CH$_2$CH(COOK) monomer units, CH$_2$CH(COORb) monomer units, CH$_2$CH(COOCs) monomer units, or mixtures thereof, and (3) ethylenically unsaturated monomer units; or
(f) mixtures thereof.

10. The composition of claim 1, further comprising:
(a) one or more neutral polyacrylamide homopolymers containing CH$_2$CH(CONH$_2$) monomer units;
(b) one or more neutral copolymer containing CH$_2$CH(CONH$_2$) monomer units and ethylenically unsaturated monomer units;
(c) one or more zwitterionic acrylamide containing (1) CH$_2$CH(CONH$_2$) monomer units, (2) 3-dimethyl (methacryloyloxyethyl) ammonium propane sulfonate monomer units;
(d) zwitterionic copolymers containing of (1) CH$_2$CH(CONH$_2$) monomer units, (2) 3-dimethyl (methacryloyloxyethyl) ammonium propane sulfonate monomer units, and (3) ethylenically unsaturated monomer units; or
(e) mixtures thereof,
wherein the ethylenically unsaturated monomer units comprise ethylene monomer units, propylene monomer units, acrylic acid monomer units, methacrylic acid monomer units, and/or vinyl alcohol monomer units.

11. A slurry composition comprising:
(A) a first slurry comprising:
(i) between about 5 wt. % and about 60 wt. % of one or more dry particulate hydratable anionic polymers, and
(ii) between about 95 wt. % and about 40 wt. % of a first oil based carrier, the first oil based carrier comprising:
(a) one or more hydrocarbon solvents, and
(b) one or more suspending agents,
(B) a second slurry comprising:
(i) between about 5 wt. % and about 60 wt. % of one or more dry particulate hydratable cationic polymers, and
(ii) between about 95 wt. % and about 40 wt. % of a second oil based carrier, the second oil based carrier comprising:
(a) one or more hydrocarbon solvents, and
(b) one or more suspending agents, and
(C) a water composition comprising an effective ion concentration comprising:
(i) between about 25,000 ppm (2.5 wt. %) and about 250,000 ppm (25 wt. %) of one or more monovalent ions, and
(ii) between about 10,000 ppm (1.0 wt. %) and 30,000 ppm (3 wt. %) of one or more polyvalent ions, and
(iii) having a ratio of monovalent ions to polyvalent ions between about 10:1 and about 2:1 to form a downhole fluid, wherein the one or more dry particulate hydratable anionic polymers and the one or more dry particulate hydratable cationic polymers consist essentially of one or more dry particulate hydratable anionic acrylamide polymers and one or more dry particulate hydratable cationic acrylamide polymers,
wherein the effective ion concentration is sufficient to reduce gelling interactions between the one or more dry particulate hydratable anionic acrylamide polymers and the one or more dry particulate hydratable cationic acrylamide polymers during hydration by the water composition,
wherein the one or more dry particulate hydratable anionic acrylamide polymers and the one or more dry particulate hydratable cationic acrylamide polymers have % drag reduction values within 10% compared to % drag reduction values of compositions including only cationic acrylamide polymers over a 10 minute period of time,
wherein the first and second oil based carriers insulate the one or more dry particulate hydratable cationic acrylamide polymers and/or the one or more dry particulate hydratable anionic acrylamide polymers from moisture, and
wherein the first slurry and the second slurry reduces clumping of the one or more dry particulate hydratable cationic acrylamide polymers and/or the one or more dry particulate hydratable anionic acrylamide polymers when added into the water composition.

12. The slurry composition of claim 11, wherein the first oil based carrier and second oil based carrier further independently comprise:
(c) one or more surfactants.

13. The slurry composition of claim 12, wherein the first oil based carrier and second oil based carrier further independently comprise:
between about 98 wt. % and about 80 wt. % of the one or more hydrocarbon solvents,
between about 1 wt. % and about 10 wt. % of the one or more surfactants, and
between about 1 wt. % and about 10 wt. % of the one or more suspending agents.

14. The slurry composition of claim 13, wherein:
the one or more hydrocarbon solvents comprise paraffin containing hydrocarbons, isoparaffin containing hydrocarbons, olefin containing hydrocarbons, cyclic paraffin containing hydrocarbons, cyclic isoparaffin containing hydrocarbons, cyclic olefin containing hydrocarbons, naphthenlic solvents, or mixtures thereof,
the one or more surfactants comprise one or more nonionic surfactants, and
the one or more suspending agents comprise polymeric suspending agent, organophilic clay suspending agents, or mixtures thereof.

15. The slurry composition of claim 14, wherein:
an amount of the one or more dry particulate hydratable anionic acrylamide polymers is between 0.1 gpt and 10 gpt,
an amount of the one or more one or more dry particulate hydratable cationic acrylamide polymers is between 0.1 gpt and 10 gpt,
a weight ratio of the one or more dry particulate hydratable anionic acrylamide polymers to the one or more dry particulate hydratable cationic acrylamide polymers is between about 50:1 to about 1:50, each of the one or more dry particulate hydratable anionic acrylamide polymers individually has a molecular weight between about 10 million and 40 million, each of the one or more dry particulate hydratable cationic acrylamide polymers individually has a molecular weight between about 5 million and 20 million, or the water composition is selected from the group consisting of fresh water, brackish water, salt water, sea water, produced water, flowback water, and combinations thereof.

16. The slurry composition of claim 15, wherein:
a particle size distribution of each of the particulate polymers independently comprises particles having sizes between about 20 mesh (841 μm) and about 400 mesh (37 μm).

17. The slurry composition of claim 16, wherein the sizes are between about 50 mesh (297 μm) and about 300 mesh (40.6 μm).

18. The slurry composition of claim 11, wherein:
the effective ion concentration of the one or more monovalent ions is between 30,000 ppm (3.0 wt. %) and 250,000 ppm (25 wt. %),
the effective ion concentration of the one or more polyvalent ions is between 15,000 ppm (1.5 wt. %) and 30,000 ppm (3.0 wt. %), and
the ratio of monovalent ions to polyvalent ions is between about 10:1 and about 3.1.

19. The slurry composition of claim 11, wherein:
the one or more hydratable anionic acrylamide polymers comprise:
  (a) sodium anionic acrylamide polymers containing $CH_2CH(CONH_2)$ monomer units and $CH_2CH(COONa)$ monomer units;
  (b) potassium anionic acrylamide polymers containing $CH_2CH(CONH_2)$ monomer units and $CH_2CH(COOK)$ monomer units;
  (c) rubidium anionic acrylamide polymers containing $CH_2CH(CONH_2)$ monomer units and $CH_2CH(COORb)$ monomer units;
  (d) cesium anionic acrylamide polymers containing $CH_2CH(CONH_2)$ monomer units and $CH_2CH(COOCs)$ monomer units;
  (e) acrylamide copolymers containing (1) $CH_2CH(CONH_2)$ monomer units, (2) anionic monomer units including $CH_2CH(COONa)$ monomer units, $CH_2CH(COOK)$ monomer units, $CH_2CH(COORb)$ monomer units, $CH_2CH(COOCs)$ monomer units, or mixtures thereof, and (3) ethylenically unsaturated monomer units; or
  (f) mixtures thereof.

20. The slurry composition of claim 11, further comprising:
  (a) one or more neutral polyacrylamide homopolymers containing $CH_2CH(CONH_2)$ monomer units;
  (b) one or more neutral copolymer containing $CH_2CH(CONH_2)$ monomer units and ethylenically unsaturated monomer units;
  (c) one or more zwitterionic acrylamide containing (1) $CH_2CH(CONH_2)$ monomer units, (2) 3-dimethyl (methacryloyloxyethyl) ammonium propane sulfonate monomer units;
  (d) zwitterionic copolymers containing of (1) $CH_2CH(CONH_2)$ monomer units, (2) 3-dimethyl (methacryloyloxyethyl) ammonium propane sulfonate monomer units, and (3) ethylenically unsaturated monomer units; or
  (e) mixtures thereof,
wherein the ethylenically unsaturated monomer units comprise ethylene monomer units, propylene monomer units, acrylic acid monomer units, methacrylic acid monomer units, and/or vinyl alcohol monomer units.

* * * * *